(12) United States Patent
Busch

(10) Patent No.: US 11,281,971 B2
(45) Date of Patent: Mar. 22, 2022

(54) DEVICES, SYSTEMS, AND METHODS THAT OBSERVE AND CLASSIFY REAL-WORLD ACTIVITY RELATING TO AN OBSERVED OBJECT, AND TRACK AND DISSEMINATE STATE RELATING THE OBSERVED OBJECT

(71) Applicant: James David Busch, Tempe, AZ (US)

(72) Inventor: James David Busch, Tempe, AZ (US)

(*) Notice: Subject to any disclaimer, the term of this patent is extended or adjusted under 35 U.S.C. 154(b) by 5 days.

(21) Appl. No.: 16/777,860

(22) Filed: Jan. 30, 2020

(65) Prior Publication Data

US 2020/0242471 A1 Jul. 30, 2020

Related U.S. Application Data

(60) Provisional application No. 62/799,004, filed on Jan. 30, 2019.

(51) Int. Cl.
*G06N 3/08* (2006.01)
*G06K 9/62* (2022.01)

(52) U.S. Cl.
CPC .............. *G06N 3/08* (2013.01); *G06K 9/6256* (2013.01)

(58) Field of Classification Search
CPC ........ G06N 3/08; G06N 3/0454; G06N 3/084; G06N 3/0445; G06N 7/005; G06N 3/0481; G06N 3/088; G06N 20/00; G06N 3/04; G06N 3/0472; G06N 3/02; G06N 5/045; G06N 20/10; G06N 20/20
USPC .......................................................... 382/157
See application file for complete search history.

(56) References Cited

U.S. PATENT DOCUMENTS 9,836,484 B1 * 12/2017 Bialynicka-Birula ....................... G06F 16/51
2015/0100530 A1 * 4/2015 Mnih ...................... A63F 13/67 706/25

\* cited by examiner

*Primary Examiner* — Ajibola A Akinyemi
(74) *Attorney, Agent, or Firm* — James David Busch

(57) ABSTRACT

An intelligent monitoring device including a processor and an accelerometer and/or a device that includes at least one processor and at least one image sensor. The intelligent monitoring device is configured to observe at least one machine. The intelligent monitoring device is further configured to utilize its processor, or the processor of a coupled system, to recognize actions carried out on or by the at least one machine and infer the state of the machine. The intelligent monitoring device or the coupled system is further configured to provide alerts or help respond to queries about the status of the at least one machine. For example, the intelligent monitoring camera will infer the state of a washing machine based on its observations and provide an alert (optionally only to the user recognized to have loaded the washer) when the washing machine is ready to be unloaded.

20 Claims, 47 Drawing Sheets

| Index | Washing | Washing 2 | Washing 3 | Off | Off 2 | Off 3 | Washing 4 | Washing 5 |
|---|---|---|---|---|---|---|---|---|
| 0 | 369.8146 | 139.2952 | 402.2769 | 283.1151 | 285.9056 | 274.3076 | 423.1532 | 697.3599 |
| 1 | 262.6007 | 75.0647 | 244.425 | 110.5383 | 135.6335 | 128.168 | 212.1347 | 421.9047 |
| 2 | 142.1409 | 132.2362 | 309.1961 | 15.5026 | 21.365 | 19.5372 | 48.2632 | 98.1411 |
| 3 | 170.3425 | 215.5786 | 179.0308 | 26.5612 | 23.5163 | 29.7473 | 49.9209 | 133.3941 |
| 4 | 207.8874 | 89.3375 | 49.3433 | 16.6032 | 28.0189 | 54.1644 | 115.3939 | 108.2803 |
| 5 | 366.8544 | 104.2973 | 114.0247 | 14.6262 | 61.9129 | 22.2132 | 50.3366 | 193.0988 |
| 6 | 399.7763 | 72.257 | 85.4106 | 17.1122 | 40.0485 | 24.0682 | 86.2782 | 281.1541 |
| 7 | 221.5984 | 74.2077 | 78.8519 | 17.7429 | 20.4983 | 27.1528 | 129.6292 | 31.2476 |
| 8 | 195.8494 | 44.9173 | 140.0323 | 10.1899 | 5.4091 | 6.0697 | 122.3163 | 166.1904 |
| 9 | 276.9097 | 170.6239 | 161.4544 | 36.1429 | 38.3698 | 27.4118 | 113.869 | 175.4306 |
| 10 | 161.8488 | 219.4964 | 197.118 | 29.5477 | 39.5094 | 24.8998 | 37.259 | 500.1195 |
| 11 | 202.7143 | 92.7788 | 291.3126 | 23.8467 | 22.5613 | 16.228 | 65.5119 | 261.1463 |
| 12 | 114.3586 | 326.1047 | 196.6444 | 28.0743 | 33.8257 | 14.828 | 117.8473 | 63.0026 |
| 13 | 394.7886 | 316.0266 | 161.4882 | 15.5126 | 40.2012 | 31.0114 | 97.0556 | 243.375 |
| 14 | 122.0288 | 200.2422 | 270.392 | 13.8411 | 25.2544 | 19.8343 | 110.8667 | 328.3769 |
| 15 | 220.1558 | 94.7018 | 257.7314 | 6.9389 | 20.9536 | 33.2931 | 91.7671 | 208.1863 |
| 16 | 101.0078 | 214.0189 | 377.8474 | 29.4975 | 17.2415 | 25.5182 | 27.994 | 243.4662 |
| 17 | 273.9107 | 131.6421 | 273.2246 | 19.2115 | 31.6505 | 34.2688 | 80.0518 | 390.6795 |
| 18 | 178.796 | 108.2383 | 146.3109 | 12.6865 | 39.7165 | 18.6475 | 71.5516 | 499.7119 |
| 19 | 327.2874 | 59.8112 | 316.7519 | 34.0741 | 53.7977 | 18.6179 | 43.7645 | 405.1157 |
| 20 | 160.6119 | 115.4069 | 338.8567 | 45.2701 | 48.841 | 24.6133 | 50.5677 | 244.2788 |
| 21 | 242.5131 | 60.4004 | 60.1795 | 32.4096 | 22.183 | 40.8066 | 116.2 | 193.899 |
| 22 | 292.2111 | 234.8761 | 184.5993 | 25.1701 | 11.9112 | 15.3982 | 71.8988 | 341.164 |
| 23 | 261.0596 | 211.0598 | 136.7049 | 7.8081 | 22.0151 | 37.3336 | 96.1738 | 294.7054 |
| 24 | 214.7317 | 152.5644 | 123.691 | 38.9301 | 29.7847 | 41.4521 | 96.001 | 100.043 |
| 25 | 452.0132 | 77.0101 | 122.6331 | 29.3178 | 78.8321 | 24.8351 | 48.9909 | 159.0683 |
| 26 | 286.4779 | 148.4169 | 116.7033 | 11.3383 | 60.2583 | 23.0339 | 10.5914 | 239.973 |
| 27 | 129.5946 | 74.3431 | 118.9921 | 13.037 | 33.2451 | 27.2326 | 24.02 | 369.998 |
| 28 | 205.2018 | 244.3304 | 80.656 | 24.6413 | 36.22 | 19.9597 | 45.9589 | 275.6577 |
| 29 | 329.6741 | 130.7048 | 94.0215 | 23.085 | 40.0169 | 30.6845 | 47.8866 | 82.3961 |
| 30 | 174.9443 | 146.4464 | 100.6511 | 8.7951 | 27.876 | 11.908 | 89.9449 | 81.1004 |
| 31 | 201.753 | 138.5002 | 233.1201 | 8.9914 | 24.8232 | 10.0436 | 89.1809 | 21.5479 |
| 32 | 414.7583 | 220.6194 | 289.4035 | 27.6032 | 43.9995 | 16.0212 | 20.3137 | 76.3178 |
| 33 | 263.8758 | 168.1648 | 111.2584 | 35.6241 | 45.4489 | 27.9619 | 30.8221 | 132.041 |
| 34 | 63.4801 | 91.4142 | 126.8065 | 23.2454 | 37.025 | 27.4996 | 59.2587 | 93.6126 |
| 35 | 183.762 | 99.1549 | 217.7069 | 20.4727 | 7.1916 | 10.3169 | 63.2642 | 242.0623 |
| 36 | 79.1515 | 78.1884 | 192.3388 | 18.2771 | 9.3887 | 13.8582 | 26.8719 | 211.1469 |
| 37 | 202.5715 | 89.7051 | 148.3084 | 33.3664 | 17.6441 | 15.2798 | 104.8287 | 113.424 |
| 38 | 130.8923 | 198.2656 | 262.9977 | 6.7557 | 38.607 | 34.3905 | 149.7249 | 72.8374 |
| 39 | 176.381 | 310.0695 | 112.6671 | 28.7669 | 24.6273 | 20.106 | 55.3392 | 293.2221 |
| 40 | 147.1113 | 168.0451 | 230.5677 | 31.9313 | 4.1185 | 31.1651 | 38.9499 | 263.5968 |
| 41 | 157.6827 | 164.4187 | 94.484 | 33.0727 | 21.9877 | 32.567 | 76.2089 | 120.2397 |
| 42 | 52.2198 | 109.4845 | 75.9485 | 24.2467 | 30.9087 | 29.7725 | 45.8834 | 79.8095 |
| 43 | 324.9679 | 79.4502 | 55.2976 | 19.7008 | 28.1517 | 24.9928 | 73.9372 | 75.744 |
| 44 | 214.0117 | 143.2571 | 387.1962 | 36.7164 | 13.8119 | 10.2166 | 54.4162 | 115.9125 |
| 45 | 39.1046 | 119.7912 | 393.9702 | 37.8557 | 23.0767 | 24.5666 | 110.2987 | 118.9916 |
| 46 | 109.4199 | 125.0921 | 95.8544 | 39.3496 | 6.3683 | 9.1288 | 69.694 | 104.4618 |
| 47 | 193.3217 | 192.7637 | 62.9687 | 30.5241 | 9.2039 | 43.2568 | 33.7248 | 207.5948 |
| 48 | 58.3472 | 223.3666 | 70.7122 | 31.5551 | 15.8571 | 36.6331 | 77.4054 | 103.2525 |
| 49 | 143.164 | 184.6501 | 97.0823 | 17.5741 | 25.6869 | 2.7064 | 100.4059 | 114.4923 |
| 50 | 289.4615 | 160.3421 | 103.0197 | 32.4986 | 40.691 | 21.5461 | 45.3532 | 128.582 |
| 51 | 95.347 | 151.9929 | 213.7943 | 39.8287 | 19.307 | 34.7697 | 83.3582 | 227.5359 |
| 52 | 119.8736 | 120.0354 | 156.0553 | 42.2455 | 17.3215 | 39.8848 | 57.6528 | 229.0345 |
| 53 | 138.9191 | 103.3874 | 114.1117 | 21.7574 | 32.8491 | 35.4476 | 24.7227 | 185.5803 |
| 54 | 148.7239 | 167.1646 | 233.0256 | 9.8739 | 27.904 | 30.4044 | 21.5018 | 201.7427 |
| 55 | 85.0062 | 79.0482 | 118.9085 | 11.8267 | 28.1343 | 33.0228 | 73.7485 | 327.9046 |
| 56 | 264.7693 | 285.4642 | 107.4826 | 21.0729 | 29.9816 | 49.1154 | 117.2216 | 260.2675 |
| 57 | 220.947 | 290.0361 | 200.2107 | 18.3643 | 7.528 | 16.4806 | 30.6028 | 102.1725 |
| 58 | 29.9105 | 123.4224 | 122.854 | 10.4877 | 20.9999 | 7.1911 | 52.2525 | 42.3025 |
| 59 | 176.541 | 75.0782 | 42.0655 | 10.0036 | 35.011 | 31.7673 | 40.9628 | 185.3123 |
| 60 | 196.7769 | 78.8293 | 48.4322 | 21.8476 | 16.2711 | 63.8361 | 36.6647 | 91.2843 |
| 61 | 66.2855 | 69.5031 | 27.8535 | 6.963 | 17.0526 | 38.7668 | 37.4252 | 240.2752 |
| 62 | 101.071 | 166.8608 | 136.3304 | 32.8778 | 27.0863 | 23.2476 | 20.5561 | 178.3882 |
| 63 | 68.744 | 169.7195 | 44.3928 | 33.4988 | 51.6475 | 15.1429 | 58.3587 | 93.572 |
| Average: | 197.157144 | 147.214395 | 166.527842 | 28.7491219 | 34.3169469 | 31.3804906 | 74.5954531 | 201.342613 |

FIG. 5B

Determining State
Neural Network for Data Chunk(s)

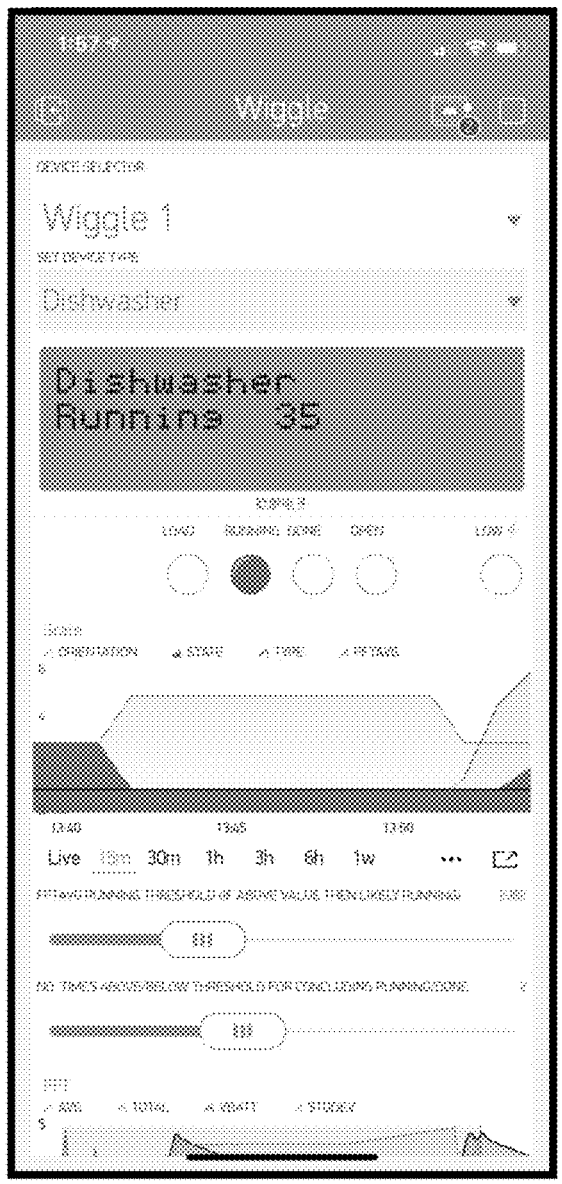 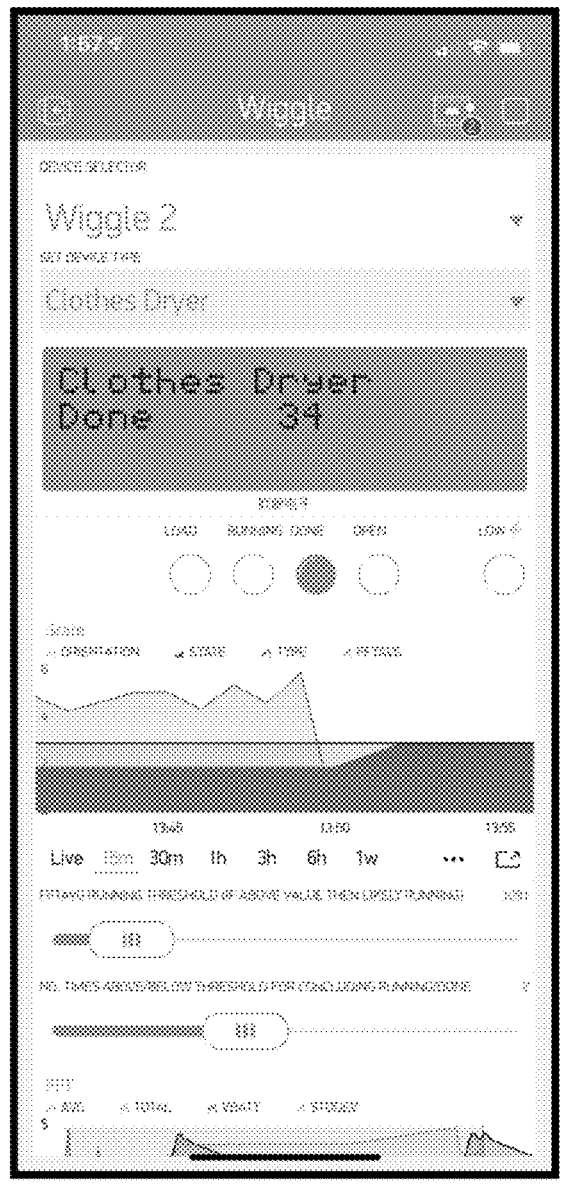
FIG. 12D         FIG. 12E

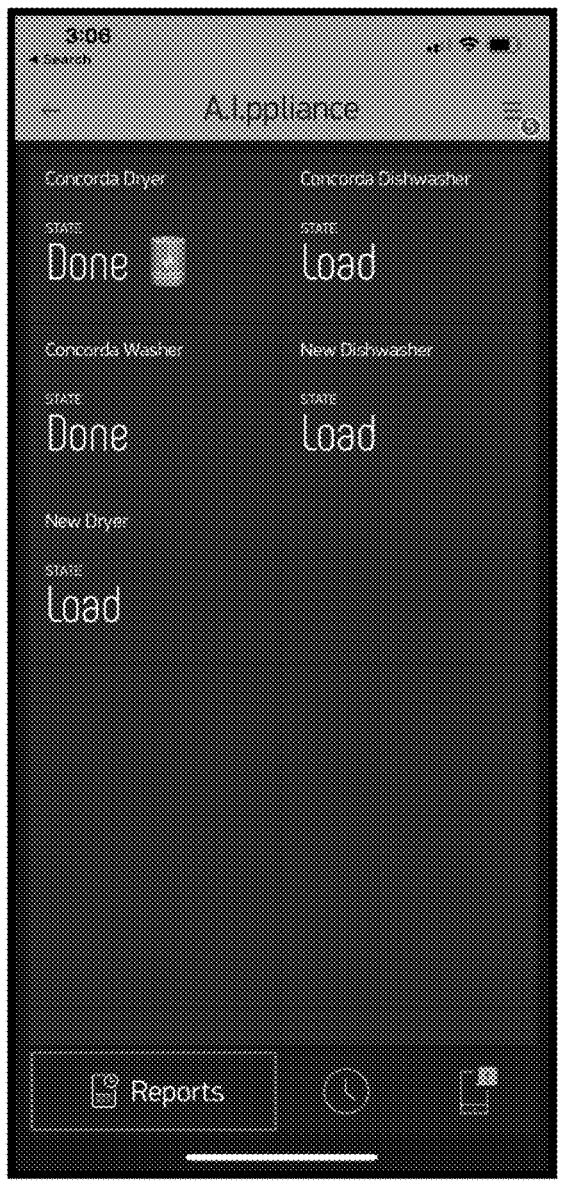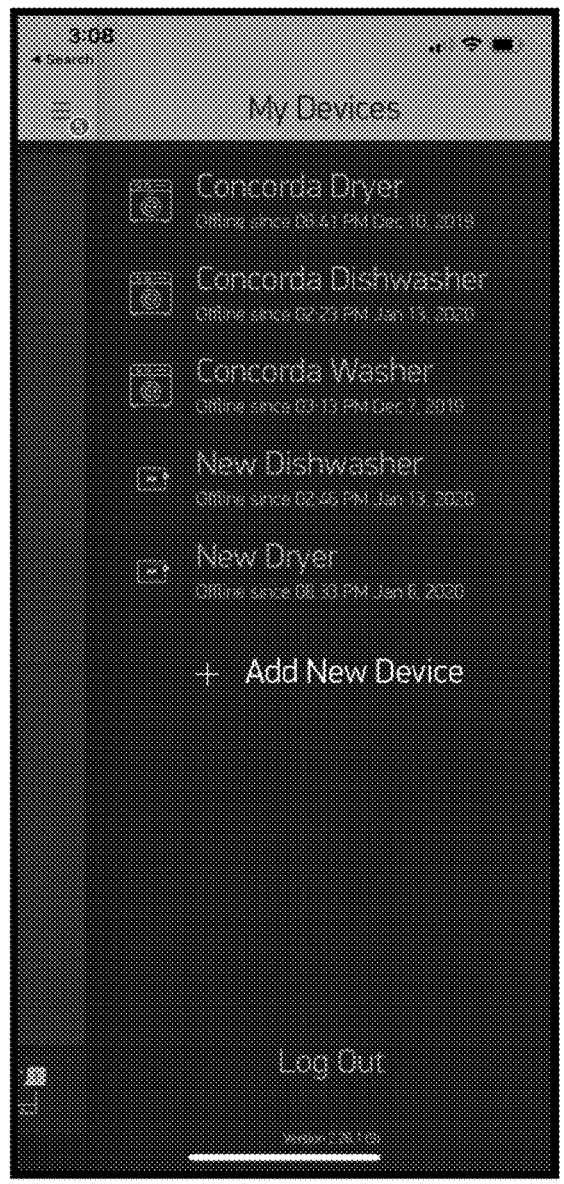
FIG. 12F  FIG. 12G

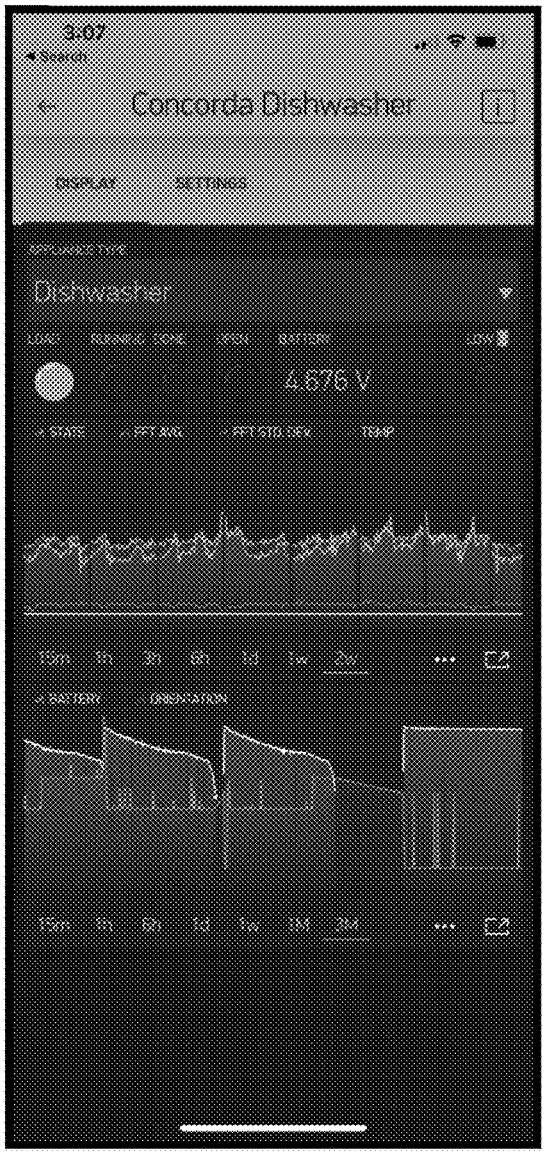
FIG 12J
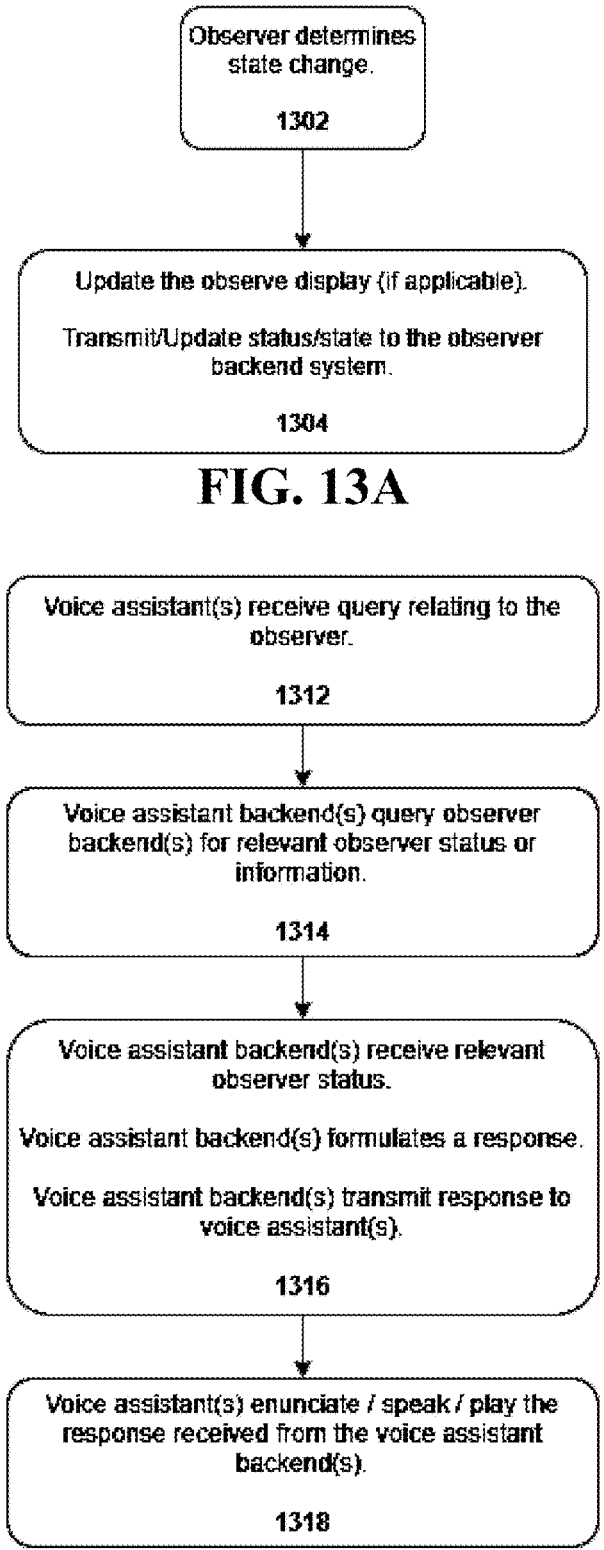
FIG. 13A
FIG. 13B

FIG. 13D

| state | | SAVE |
|---|---|---|

☑ Define synonyms ❓    ☐ Allow automated expansion

| ready to load | ready to load, load, dirty, ready to start, available |
|---|---|
| running | running, washing, drying, in progress |
| done | done, clean, finished, ready to unload |
| open | open |
| closed | closed |
| off | off, stopped |
| heating | heating, hot |
| Click here to edit entry | |

+ Add a row

FIG.13G

⚡ Fulfillment

Webhook                                                             ENABLED ⬤

Your web service will receive a POST request from Dialogflow in the form of the response to a user query matched by intents with webhook enabled. Be sure that your web service meets all the webhook requirements specific to the API version enabled in this agent.

FIG. 13H

DEVICES, SYSTEMS, AND METHODS THAT OBSERVE AND CLASSIFY REAL-WORLD ACTIVITY RELATING TO AN OBSERVED OBJECT, AND TRACK AND DISSEMINATE STATE RELATING THE OBSERVED OBJECT

CROSS REFERENCE TO RELATED APPLICATIONS

This application claims the benefit of U.S. Provisional Application 62/799,004, filed Jan. 30, 2019, which is herein incorporated by reference in its entirety.

COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO A "SEQUENCE LISTING" A TABLE, OR A COMPUTER PROGRAM LISTING APPENDIX SUBMITTED AS AN ASCII TEXT FILE

The official copy of the computer program listing appendix is submitted, with information previously provided on pages 87-195 of the specification as filed, as an ASCII formatted text file via EFS-Web, with a file name of "OBSERVER_COMPUTER_PROGRAM_APPENDIX.txt", a creation date of Nov. 19, 2021, and a size of 262183 bytes. The comptuer program listing filed via EFS-Web is part of the specification, is incorporated in its entirety by reference herein, and contains no new mater which goes beyond the disclosure of the application as filed.

BACKGROUND

1. Field of the Invention

The invention generally relates to observer devices and systems that are able to recognize appliances and other machines, people, or objects based on sensor data such as accelerometer data, visual imaging, depth sensor data, thermal image sensor data, sound data, and any other data type. The observer devices that are the subject of this invention may further be trained or configured to recognize actions performed on or by the appliances, machines, people and objects that the devices are observing. The observer camera devices may infer a state or condition of the appliance, machine, or object based on its observations of the observed device and other inputs.

Many people and businesses have legacy appliances/machines, or new appliances/machines that may or may not able to connect to the internet. Newer appliances that do connect to the internet are either expensive or may present a security risk that consumers do not want to take. For example, some appliances such as ovens, washers, dryers and dishwashers may be started or controlled over the Internet. If a malicious actor takes control of these devices, it may cause damage or danger for the appliance owner. Thus, many people do not want their appliances to connect to the internet to be susceptible to attack in this manner.

However, it can be beneficial to know the state of machines or appliances utilizing the Internet. Knowing the state of each appliance can be particularly challenging and useful in a multi-person household where one person may use a machine without informing the others. Furthermore, being able to receive notifications, reminders, or responses to queries about the state of a device can ensure that users unload appliances in a timely manner, do not waste time preparing to load a device that is in use by another member, and utilize household appliances efficiently.

Accordingly, there is a need for a device that will allows legacy, non-Internet connected devices, or newer Internet enabled devices to communicate their state such that appropriate people can easily obtain the information on their phone or through a voice assistant in a secure manner. Furthermore, there is a need for a device to communicate such information in such a way that does not potentially provide the ability for malicious third-parties to control machines or appliances.

Still further, it is beneficial to track the state of other objects and people around the house or workplace in order to ensure everything is OK or track efficiency. Thus, there is a need for a device to observe people and employees and notify appropriate people of issues that arise. In some forms, privacy can be maintained by only sending textual descriptions of the state of a person when an abnormal state is detected or providing pictures if authorized. Traditional programming techniques may be used to determine and monitor the state of appliances and other machines. Artificial Intelligent systems, such as deep neural networks, may also be used and implemented with various processors, sensors, cameras and other devices to observe and determine the states of monitored machines.

Traditional software programming uses Boolean-based logic that can be tested to confirm that the software does what it was designed to do, using tools and methodologies established over the last few decades.

It can be beneficial to use deep neural network machine learning models. However, it is hard to debug neural network algorithms because they are a black box once trained. Machine learning is a black box programming method in which computers program themselves with data, producing probabilistic logic that diverges from the true-and-false tests used to verify systems programmed with traditional Boolean logic methods.

There is a need to facilitate debugging deep neural networks and the systems built upon them. Currently, the conventional wisdom is to create a custom machine learning model that is trained to perform all aspects of the logic on the device, including state logic. In many cases this is inefficient as it requires each device to be re-trained any time there is a change. The training process can be complicated and computationally expensive.

There is benefit to defining logic of state machine without the use of machine learning training methods, and then apply widely applicable machine learning models to define the states or transitions. This is much more efficient, as computing resources (e.g., power, carbon, etc.) do not need to be expended to come up with the ability to replicate the state machine and define states and transitions in that context. The computing resources can be utilized to create and refine widely applicable machine learning classifiers that may be used to define states and transitions based on pictures (e.g., ImageNet or extensions thereof, etc.), video (e.g., UCF-101 or extensions thereof, etc.), audio, point clouds, or other data that is sensed by an observer device. To the extent these machine learning models need to be adapted, retrained or replaced, they can be swapped out while leaving the other classifiers and state machine logic untouched. The devices that utilize machine learning models can host many different neural networks that are either run in parallel or swapped out depending on the state of the device. This will facilitate creation of devices that implement machine learning algorithms, and improve the functioning, testability, predictability, and maintenance of "artificially intelligent" devices.

It can be useful to monitor machines via the Internet or other wired and wireless connections. However, in many cases it is not practical to update large home appliances or industrial machines; indeed, it can be wasteful to dispose of a large appliance because it simply does not have the newest connectivity accessory available. There is a need to connect legacy home appliances without modifying the appliances.

2. Description of Related Materials

To reduce the complexity and length of the Detailed Specification, and to fully establish the state of the art in certain areas of technology, Applicant herein expressly incorporates by reference all the following materials identified in each numbered paragraph below. The Cite Numbers referred to herein are set forth in the Information Disclosure Statement (IDS) filed with this application and incorporated by reference herein.

The related art shows the novel and non-obvious nature of the present invention including secondary considerations of non-obviousness such as the long-felt need and failure of others to achieve the present invention. All referenced materials are herein incorporated by reference in its entirety.

2.C Other Technologies

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant will amend the specification to expressly recite the essential material that is incorporated by reference as allowed by the applicable rules.

SUMMARY OF THE INVENTION

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

In that regard, the use of the word "coupled" or "connected" implies that the elements may be directly connected or may be indirectly connected or coupled through one or more intervening elements unless it is specifically noted that there must be a direct connection.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

Headings, sections, and other similar designations are provided for the convenience of the reader, and should not be used to limit, divide, or partition the teachings of the variously claimed aspects of the inventions.

The aspects, features, and advantages will be apparent to those artisans of ordinary skill in the art from the DETAILED DESCRIPTION and DRAWINGS, and from the CLAIMS.

However, without attempting to characterize or limit the scope of inventions as they are described and claimed, some of the advantages of the various inventions are summarized below.

It is an object of the invention to track the state of household and industrial appliances, machines, people, and objects with relatively inexpensive "smart" or "Internet of Things" (IoT) devices that are able to easily attach to or view the legacy machine in order to observe and infer the state of the legacy machines.

It is yet another (and optionally independent) object of the invention to implement use sensor-based devices to infer and track the state of appliances, machines, people and objects of interest to a user.

It is yet another (and optionally independent) object of the invention to use accelerometer sensor devices to infer and track the state of appliances, machines, people and objects of interest to a user.

It is yet another (and optionally independent) object of the invention to use heat gyroscope sensor devices to infer and track the state of appliances, machines, people and objects of interest to a user.

It is yet another (and optionally independent) object of the invention to use magnetometer sensor devices to infer and track the state of appliances, machines, people and objects of interest to a user.

It is yet another (and optionally independent) object of the invention to use heat inertial measurement unit devices to infer and track the state of appliances, machines, people and objects of interest to a user.

It is yet another (and optionally independent) object of the invention to use vibration sensor devices to infer and track the state of appliances, machines, people and objects of interest to a user.

It is yet another (and optionally independent) object of the invention to use security camera devices to infer and track the state of appliances, machines, people and objects of interest to a user.

It is yet another (and optionally independent) object of the invention to use heat sensor devices to infer and track the state of appliances, machines, people and objects of interest to a user.

It is yet another (and optionally independent) object of the invention to use depth sensor devices to infer and track the state of appliances, machines, people and objects of interest to a user.

It is yet another (and optionally independent) object of the invention to use sound sensor devices to infer and track the state of appliances, machines, people and objects of interest to a user.

It is yet another (and optionally independent) object of the invention to use power usage sensor devices to infer and track the state of appliances, machines, people and objects of interest to a user.

It is yet another (and optionally independent) object of the invention to use multiple-sensor devices to infer and track the state of appliances, machines, people and objects of interest to a user.

It is yet another (and optionally independent) object of the invention to use any type of sensor device or devices with to infer and track the state of appliances, machines, people and objects of interest to a user by correlating observed data to real-world actions performed on or by the machine or sensor devices.

It is yet another (and optionally independent) object of the invention to use machine learning techniques to correlating observed data to real-world actions performed on or by the machine or sensor devices.

It is yet another (and optionally independent) object of the invention to use neural networks to correlate observed data to real-world actions performed on or by the machine or sensor devices.

It is yet another (and optionally independent) object of the invention to use convolutional neural networks to correlate observed data to real-world actions performed on or by the machine or sensor devices.

It is yet another (and optionally independent) object of the invention to use recurrent neural networks to correlate observed data to real-world actions performed on or by the machine or sensor devices.

It is yet another (and optionally independent) object of the invention to use long-term recurrent convolutional networks for visual recognition and to correlate observed data to real-world actions performed on or by the machine or sensor devices.

It is yet another (and optionally independent) object of the invention to use long short-term memory neural networks to correlate observed data to real-world actions performed on or by the machine or sensor devices.

It is yet another (and optionally independent) object of the invention to use deep learning to correlate observed data to real-world actions performed on or by the machine or sensor devices.

It is yet another (and optionally independent) object of the invention to use a combination of neural networks and/or deep learning to correlate observed data to real-world actions performed on or by the machine or sensor devices.

It is yet another (and optionally independent) object of the invention to use algorithmic programming to correlate observed data to real-world actions performed on or by the machine or sensor devices.

It is yet another (and optionally independent) object of the invention to use heuristic programming to correlate observed data to real-world actions performed on or by the machine or sensor devices.

It is yet another (and optionally independent) object of the invention to use any other methods to correlate observed data to real-world actions performed on or by the machine or sensor devices.

It is yet another (and optionally independent) object of the invention to track the state of a machine, appliance, object or person using a finite-state machine model.

It is yet another (and optionally independent) object of the invention to track the state of a machine, appliance, object or person using a two-state finite-state machine model.

It is yet another (and optionally independent) object of the invention to track the state of a machine, appliance, object or person using a three-state finite-state machine model.

It is yet another (and optionally independent) object of the invention to track the state of a machine, appliance, object or person using an abnormal state detector finite-state machine model.

It is yet another (and optionally independent) object of the invention to track the state of a machine, appliance, object or person using an neglectable machine finite-state machine model.

It is yet another (and optionally independent) object of the invention to track the state of a machine, appliance, object or person using an loadable machine finite-state machine model.

It is yet another (and optionally independent) object of the invention to track the state of a machine, appliance, object or person using an single-user machine finite-state machine model.

It is yet another (and optionally independent) object of the invention to determine the identity of users that act on machines.

It is yet another (and optionally independent) object of the invention to Determine that a user has loaded a machine, It is yet another (and optionally independent) object of the invention to determine that the machine has run, It is yet another (and optionally independent) object of the invention to determine that the machine subsequently is done and ready for further processing (e.g., a user to unload the machine).

It is yet another (and optionally independent) object of the invention to utilize messaging to communicate to a user that loaded a machine that the machine is ready to be unloaded.

It is yet another (and optionally independent) object of the invention to utilize messaging to communicate to the user that was determined to have last interacted with a machine (e.g., loaded the machine) that the machine needs further attention (e.g., it is done and is ready to be unloaded).

It is yet another (and optionally independent) object of the invention to provide a back-end state tracking database for appliances, machines, people (i.e., any object) so that other devices may query the backend to determine the current or historical states of the tracked objects.

It is yet another (and optionally independent) object of the invention to act on machines with actuators (e.g., trigger an infrared transmitter, power relay, motion device, etc.).

It is yet another (and optionally independent) object of the invention to alert users that devices have been left in a vulnerable or open state (e.g., "the garage is open!" "the oven is on!").

It is yet another (and optionally independent) object of the invention to utilize voice assistants (e.g., Google Home, Amazon Alexa, Apple Siri) to alert users of a change in the state of an observed object (e.g., "the dishwasher is done.").

It is yet another (and optionally independent) object of the invention to utilize voice assistants in the home to respond to queries (e.g., "is the dishwasher done?") about observed machines (e.g., "yes, the dishwasher is done.").

It is yet another (and optionally independent) object of the invention to help treat involuntary movement disorders such as trichotillomania (hair pulling) and other body-focused repetitive behavior classified as an impulse control disorders.

It is yet another (and optionally independent) object of the invention to discipline dogs that are doing things they should not be (e.g., "Chubs, stop!") based on image recognition technology.

At least one of the above listed, unlisted, and other objects of the invention may be achieved by an observer device with a processor, a triple-axis accelerometer, and a wireless communication interface (e.g., a Bluetooth, Wi-Fi, ISM, LoRA, Cellular, etc.) wherein the processor is configured to: periodically record a series of measurements from at least one axis of the triple-axis accelerometer over a period of time, process those measurements using a signal processing technique such as a Fourier transform, compute the average value of the Fourier transform result, compare the average value to a threshold value, determine, based on the comparison, whether the device should cause a transition in a state machine model of an observed machine, and if the determination is yes, cause the state machine transition to occur.

At least one of the above listed, unlisted, and other objects of the invention may be achieved by an observer device with a processor, an imaging sensor, and a wireless communication interface (e.g., a Bluetooth, Wi-Fi, ISM, LoRA, Cellular, etc.) wherein the processor is configured to: periodically record an image from the imaging sensor, pass the image through a deep neural network to obtain a result, determine, based on the result, whether the device should cause a transition in a state machine model of an observed machine, and if the determination is yes, cause the state machine transition to occur.

The above listed objects, and summary of how the objects might be achieved, are intended to assist with the understanding of the invention(s), and shall not be used to limit the scope of claims as done in Pacing Technologies, LLC v. Garmin International, Inc., No. 14-1396 (Fed. Cir. Feb. 18, 2015).

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 5B depicts experimental data collected from an experimental sensor- or accelerometer-based observer device.

FIG. 12D depicts a detail view of a second example mobile application showing that a dishwasher is running.

FIG. 12E depicts another detail view of the second example mobile application showing that a clothes dryer is done.

FIG. 12F depicts a main screen of a third example mobile application.

FIG. 12G depicts an add device screen of the third example mobile application.

FIG. 12J depicts a device detail display screen of the third example mobile application.

FIG. 13A depicts a flowchart for updating an observer backend based on an observation from an observer device.

FIG. 13B depicts a flowchart for handling a voice assistant query relating to an observer and obtaining a vocalized response.

FIG. 13D depicts details for a "get appliance state" voice assistant agent intent.

FIG. 13G depicts details for the state entity associated with the voice assistant agent.

FIG. 13H depicts the fulfillment options associated with the voice assistant agent

The figures are provided to aid in the understanding of the invention and their simplicity should not use to limit the scope of the invention.

Elements and acts in the figures are illustrated for simplicity and clarity, and the drawings have not necessarily been rendered according to any sequence or embodiment, and their simplicity should not use to limit the scope of the invention.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

In addition to the description provided above, additional information is provided in the file history associated with this application and the associated provisional application referenced above (e.g., as an Appendix to the Specification, Information Disclosure Statement, Transmittal Letter, etc.); those materials are hereby incorporated by reference in its entirety.

I. Hardware

Below, a general device and two different exemplary devices will be discussed. One of the exemplary devices is a simple observer and the other is a more-complex observer.

These are meant to be two examples of observer devices of varying complexity and do not necessarily constitute two different "embodiments" of the invention. Devices of varying complexity and forms, including devices that are composed of a combination of sensors described herein but not specifically detailed in an example, may work together as part of the system herein described. These devices may be less complex, more complex, or of intermediate complexity when compared to the exemplary devices described.

I.1. Observer Hardware

Figure 1:
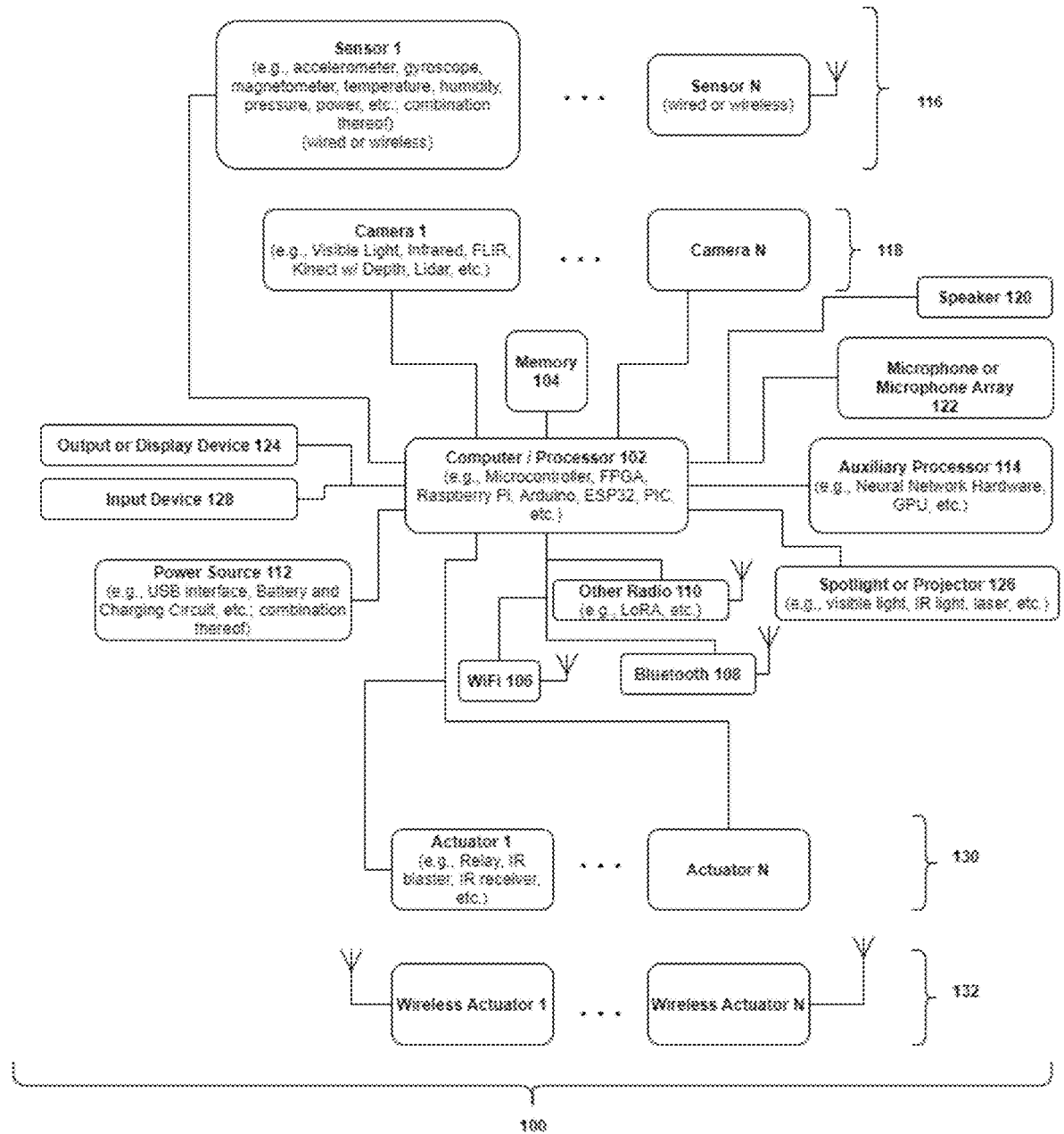
FIG. 1 depicts one example observer device.

With reference to FIG. 1, an exemplary observer 100 device is illustrated.

The observer 100 includes a computer or processor 102 (e.g., a Raspberry Pi, Arduino, ESP32, iOS Device, etc.) that is coupled to or includes memory 104, at least one wireless interface (such as a Wi-Fi interface 106, Bluetooth interface 108, or other radio interface 110 (e.g., LoRA, ISM, etc.)), and a source of power 112 (e.g., battery or wall plug, wireless charging system such as one that uses the Qi standard, etc.). The observer may also be coupled to an auxiliary processor 114 (e.g., a neural network processor, graphics processing unit, math co-processor, etc.)

An observer might be an off-the-shelf voice assistant device (e.g., Amazon Alexa, Google Assistant, etc.), an off-the-shelf camera device (e.g., Wyze Camera, RTSP camera, etc.) other commercially available equipment, or custom purpose-built hardware.

The observer 100 may be coupled to one or more sensors, such as sensors 1 . . . N 116. For example, an accelerometer (1-axis, 2-axis, or 3-axis), gyroscope (1-axis, 2-axis, or 3-axis), magnetometer (1-axis, 2-axis, or 3-axis), inertial measurement unit, temperature, humidity, pressure, voltmeter, ammeter, power meter, infrared signal receiver, fluid flow meter or detector, moisture detector, heart rate detector, GPS chip, light meter, distance sensor (infrared, ultrasonic, RADAR, LIDAR, etc.), passive infrared (PIR), or any other type of sensor etc. may be coupled to the observer 100. Any combination of the aforementioned sensors may be utilized. Furthermore, each sensor may either be directly or indirectly coupled to the observer 100 via wireless or wired technologies.

The observer 100 may also be coupled to one or more cameras or imaging devices, such as cameras1 . . . N 118. For example, a visible light camera, an infrared camera or thermal camera (e.g., FLIR, etc.), a depth camera (e.g., Kinect, etc.), a LIDAR device, etc. may be coupled to the observer 100. Any combination of the aforementioned cameras may be utilized. Furthermore, each camera may either be directly or indirectly coupled to the observer 100 via wireless or wired technologies.

The observer 100 may also be coupled to one or more sound devices. For example, a speaker or speaker array 120, a microphone or microphone array 122, a mobile device or phone, a voice assistant (e.g., Echo/Alexa, Google Assistant, etc.), or any other sound input or output device, etc. may be coupled to the observer. Any combination of the aforementioned sound devices may be utilized. Furthermore, each sound device may either be directly or indirectly coupled to the observer 100 via wireless or wired technologies.

The observer 100 may also be coupled to one or more output devices. For example, one or more output devices 124 such as a display (e.g., eInk, ePaper, OLED, TFT, etc.), light emitters 126 (e.g., spotlight, strobe, visible light, infrared light), haptic feedback device, a mobile device or phone, a voice assistant (e.g., Echo/Alexa, Google Assistant, etc.), or any other output device may be coupled to the observer 100. Any combination of the aforementioned output devices may be utilized. Furthermore, each output device may either be directly or indirectly coupled to the observer 100 via wireless or wired technologies.

The observer 100 may also be coupled to one or more input devices. For example, one or more input devices 128 such as a keyboard, a mouse, a touch sensor, a button, a mobile device or phone, a voice assistant (e.g., Echo/Alexa, Google Assistant, etc.), an indication from one of the other sensors described herein, or any other input device may be coupled to the observer 100. Furthermore, each input device may either be directly or indirectly coupled to the observer 100 via wireless or wired technologies.

The observer 100 may also be coupled to one or more actuators, such as actuators 1 . . . N 130 or wireless actuators 1 . . . N 132. For example, one or more actuators such as a relay, infrared transmitter (receiver, or transceiver), power actuator (e.g., relay, power tail, wireless outlet controller controlled via Wi-Fi, Bluetooth, radio, etc. such as those made by Kasa, Switchmate, X10, etc.), motion actuators (e.g., servo motor, DC motor, stepper motor, linear actuator, etc.), sound actuators (e.g., speaker, buzzer, etc.), visible light actuators (e.g., LED (single or multi-color), strobe, display, lamp, etc.) or any other actuator may be coupled to the observer 100. Furthermore, each actuator may either be directly or indirectly coupled to the observer 100 via wireless or wired technologies.

I.1.A Observer Hardware—Example Sensor-Based Observer

Figure 2A:
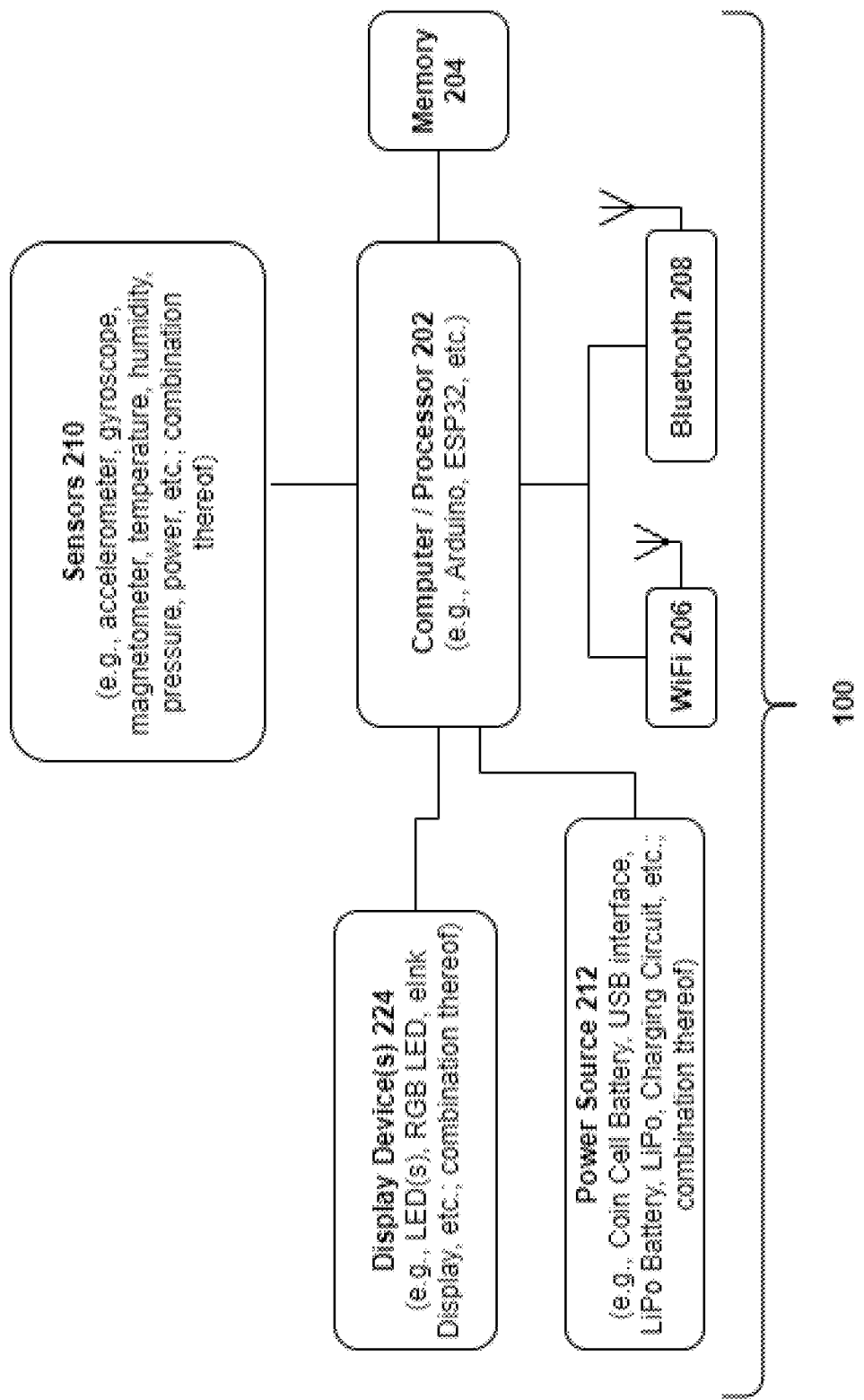
FIG. 2A depicts another example observer device.

As one example for purposes of illustration and without limitation, with reference to FIG. 2A, an observer 100 may be configured such as follows.

Figure 2B:
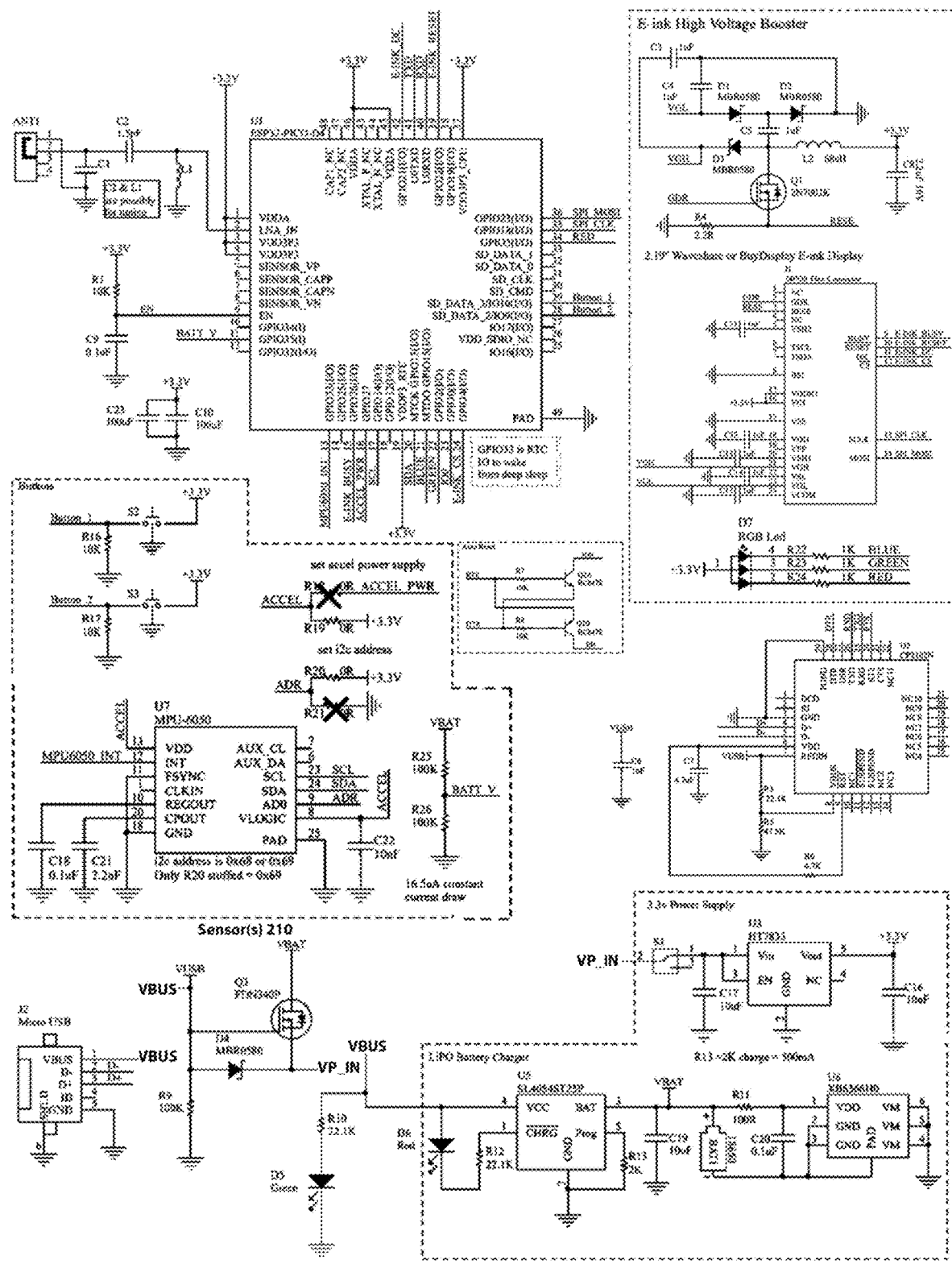
FIG. 2B depicts a schematic diagram of an example observer device.

As one example, observer 100 includes at least a processor 202 (e.g., a low power Arduino device such as a device based on the Punch Through Design Light Blue Bean), memory 204, a wireless interface 208 (e.g., Bluetooth Low Energy, etc.), a source of power (e.g., coin cell battery) 212, and a triple-axis accelerometer 210, and a display device 224 (e.g., RGB LED). As another example, observer 100 includes at least a processor 202 (e.g., a processor such as the ESP32 chip such as a device based the TTGO T5 V2.2 development board), memory 204, a wireless interface 206 (e.g., Wi-Fi, etc.), a source of power (e.g., USB port, LiPo Charging Circuit, and LiPo battery) 212, and a triple-axis accelerometer 210 (such as a GY521 or MPU6050 which also contains a temperature sensor a triple-axis gyroscope) and a display device 224 (e.g., e-Ink screen, LED(s), RGB LED, etc.). An exemplary schematic diagram for such an observer is provided as FIG. 2B.

Either of the above examples may additionally or alternatively contain a piezo vibration sensor.

The user interface for either of the exemplary observer 100 devices can utilize at least any of the following: buttons built onto the device, the relative orientation of the device to the ground based on the accelerometer or an IMU, RGB LED, a display, voice assistants, or mobile device applications, a website, etc. as further described herein.

The housing for either of the exemplary observer 100 devices is configured to allow the device to attach to an appliance or machine in order to, for example, detect vibrations produced by the appliance when the appliance is running, and/or optionally detect movement of doors that are part of the appliance.

An exemplary case provides a way for an indicator or display such as an RGB LED or E-Ink display to be visible to a user of the device. Furthermore, the case may further include a magnet or an adhesive or suction mount to enable it to removably attach to an appliance. For adhesive or suction mounts, the case may further provide a rotatable base that allows the observer 100 to rotate or flip relative to gravity while attached to the appliance. Any other mount may also be used with the exemplary observer 100 device.

The observer 100 device is configured to detect whether it has been rotated substantially with respect to the ground.

One way to do this is to periodically measure the acceleration vector using the accelerometer or other sensor and determine the largest component of the acceleration vector. This can be used to determine if the observer 100 device has been rotated around a vector normal to the plane on which it is attached to the appliance (e.g., indicating that the user flipped it upside down), or if it has been rotated relative to the horizon (e.g., indicating that the user opened a downward or upward facing door on a washing machine, dishwasher, or garage, etc.).

Figure 4:
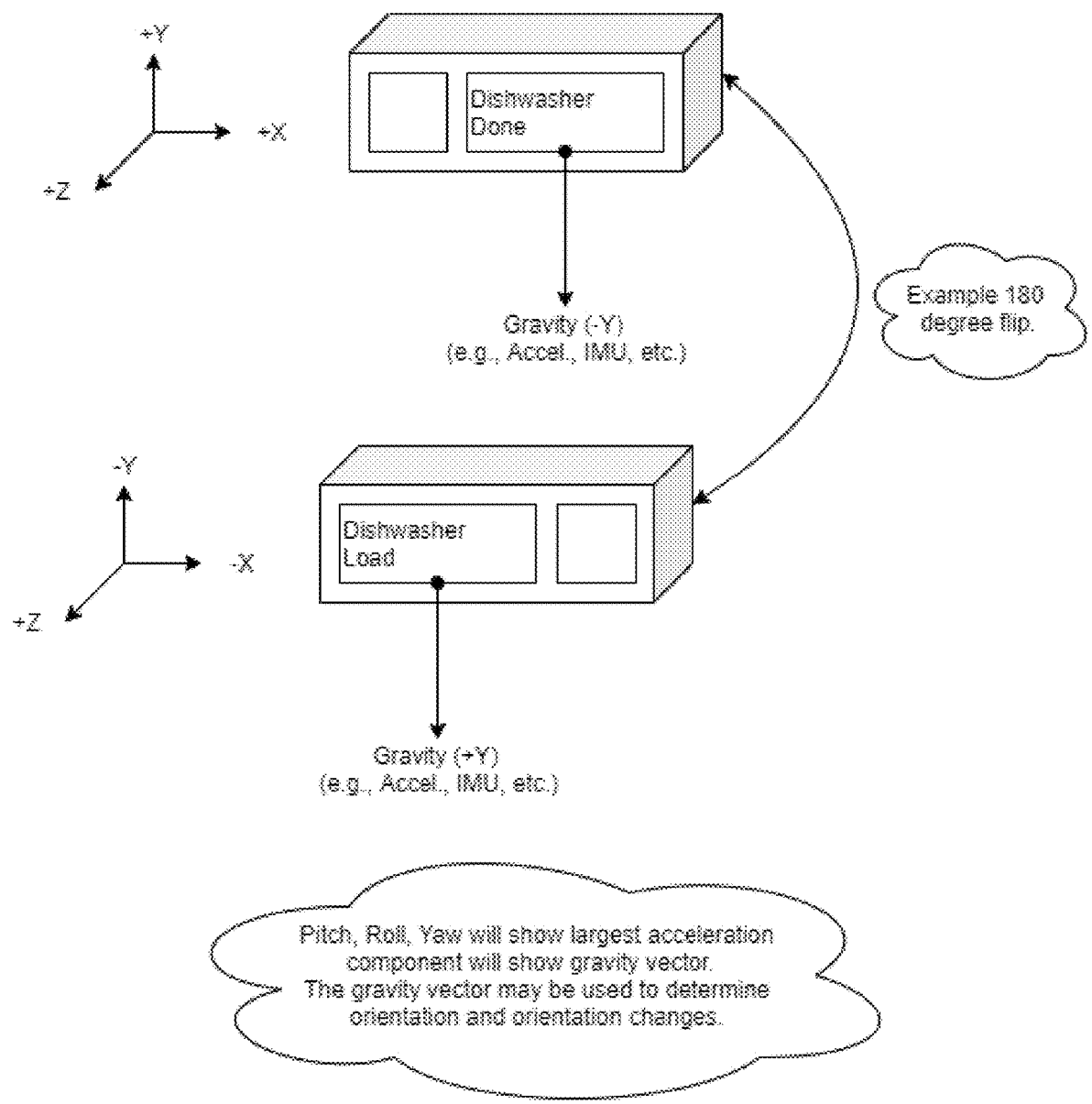
FIG. 4 depicts one example method of determining the orientation of an observer device relative to the ground using accelerometer data.

For example, with reference to FIG. 4, the orientation of the observer 100 device with respect to the ground can be determined. The accelerometer, or other orientation sensor, in observer 100 provides acceleration components in the X, Y, and Z axis. Gravity is constantly acting on the accelerometer with an acceleration of approximately 9.81 m/s^2. For an observer 100 device, this will be the largest component of the acceleration of the device. Comparing the X, Y, and Z acceleration values provided by the accelerometer, the orientation of observer 100 with respect to the ground can be determined. If, at one time, the observer reports that the largest acceleration component is in the −Y axis, then at a subsequent time reports that the largest acceleration component is in the +Y axis, we can determine that the device has been rotated perhaps as much as 180 degrees. This can be used as a user-interface input to, for example, change the state of the observer device. In addition, by using trigonometry on the X, Y, and Z axis acceleration components, the roll and pitch of the device can be determined. Based on this information, the angle of the observer 100 device relative to the ground may be obtained. This information can be used, in conjunction with knowing the observer 100 is attached to a door of an appliance, to determine when a user is interacting (e.g., loading or unloading) the appliance, or to determine when a door is open (e.g., a garage door).

Furthermore, when attached to an appliance or machine, the observer 100 device may be configured to detect whether the appliance or machine is running by using the accelerometer.

With reference to FIG. 5, exemplary data collected by an observer 100 including accelerometer-based data 502, temperature-based data 504, and/or gyroscope- or magnetometer based-data 506 is illustrated. The data further illustrates the orientation of the observer 100 relative to the ground. For example, based on this information, an algorithm on observer 100 can: determine when the door of an appliance was loaded based on observer 100 device orientation changes 508; determine when the appliance 510 was running based on vibration or temperature changes; determine when the appliance completed running based on vibration or temperature changes 512; and, determine when the appliance was unloaded based on observer 100 device orientation changes 514.

In addition, an infrared detector, LIDAR, or other range or object detector, etc. can be incorporated into the device to determine proximity to another object such a block with adhesive or magnet placed on an appliance. This can be used, for example to determine if a door or window, that does not tilt up or down (and therefore does not change the gravity vector) has been opened. In one form of the invention, an infrared emitter and detector are integrated into the observer. The infrared emitter transmits light which is then reflected off an adjacent object. The infrared detector detects the light indicating that the door or window is closed. If no reflected infrared light was detected, if it the reflected light was below a threshold value, or if a LIDAR or other range finder indicates a larger than normal distance, then it would indicate the observed door, appliance door, or window was open.

Figure 5A:
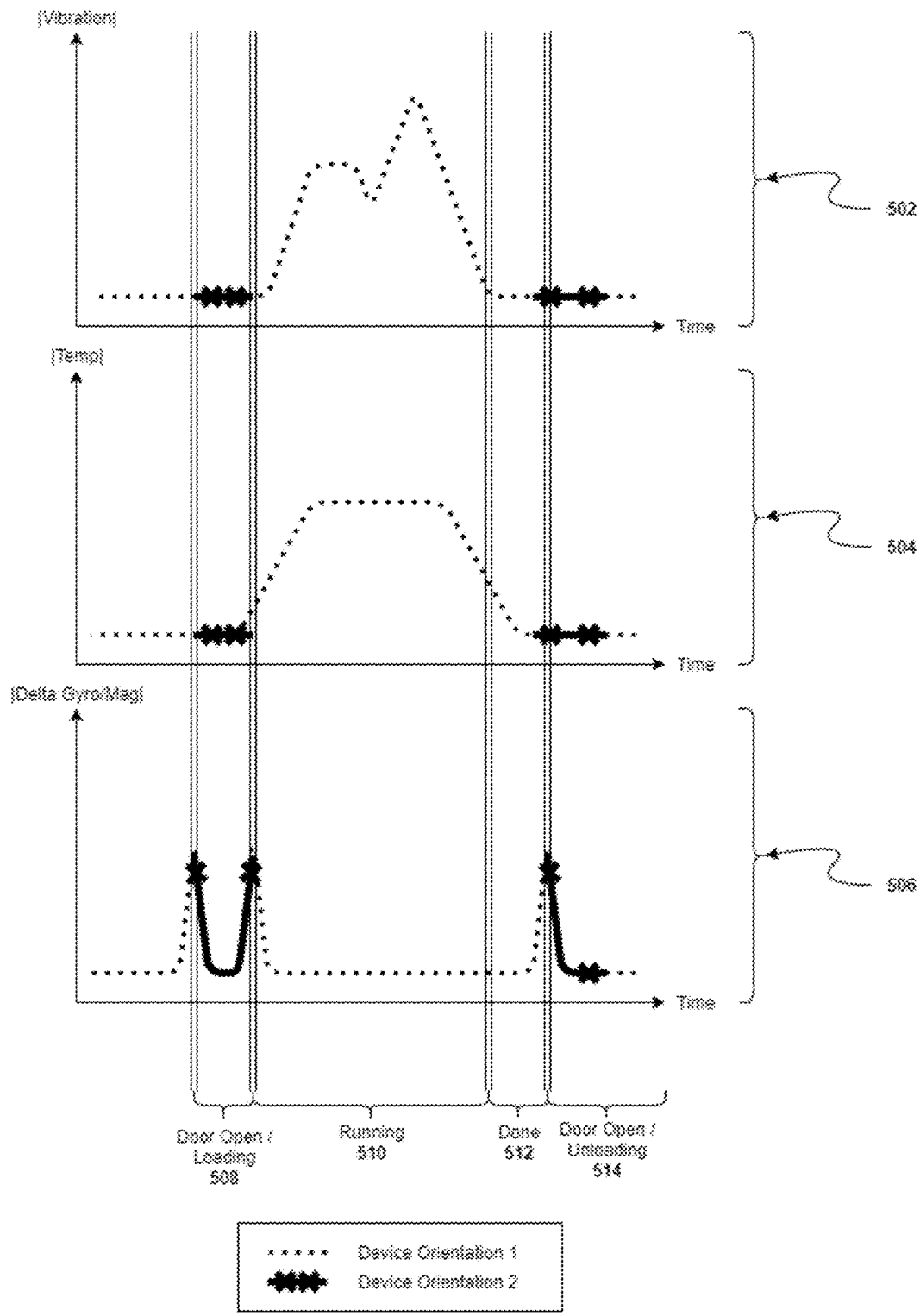
FIG. 5A depicts example accelerometer, temperature, and gyroscope/magnetometer data collected by an observer device attached to an example appliance.
Figure 6A:
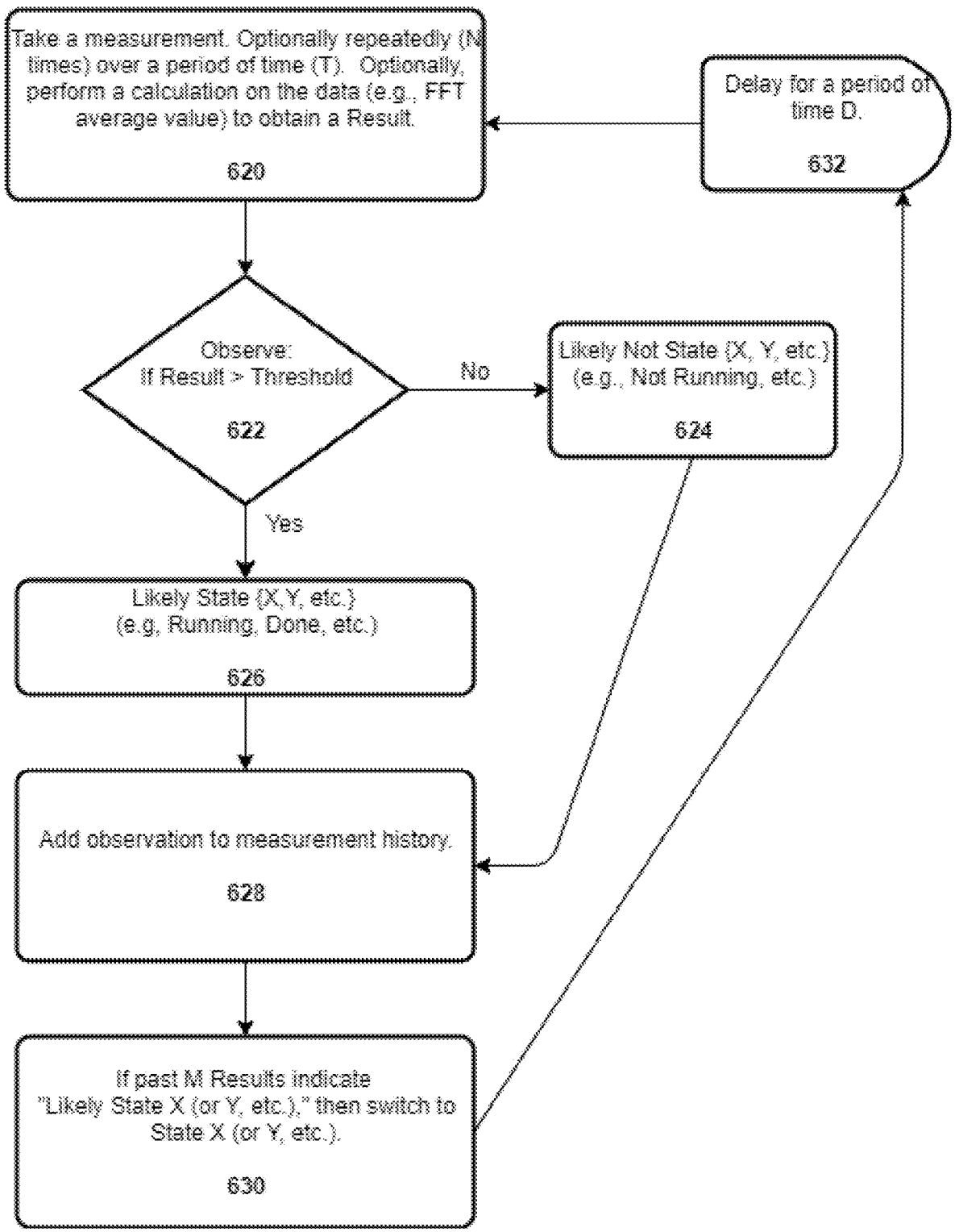
FIG. 6A depicts utilizing a method of waveform analysis to determine an appliance state (e.g., running or not running, etc.) based on data such as depicted in FIG. 5.

With reference to FIG. 6A, data or statistics relating to the data illustrated in FIGS. 5A, 5B, and/or 5C, can be used to train a neural network 602. To train the neural network, data is collected and tagged as illustrated in FIGS. 5A, 5B, and/or 5C. The neural network is then trained using back-propagation techniques. Then, once the neural network is trained, new data is provided to the neural network 602 as inputs 604. Based on the input, the neural network then provides probability values at its output layer for each possible state 606. Thus, values of for the average energy across a series of acceleration measurements, along with orientation, temperature, and gyroscope readings can be turned into an output probability such as "closed," "load," "loading," "loaded," "running," "unload," "unloading," "open," etc. The highest probability value, or the highest above a threshold can be taken as the current state or used to drive a finite state machine model of an applicable appliance.

Another way to determine if an appliance is running with observer 100 is to periodically measure the average energy of the acceleration components over a short period of time using an accelerometer or other sensor. This may be done with a Fast Fourier Transform (FFT), or using other methods. If the average energy over a short period of time exceeds a threshold amount that is determined to indicate the machine is running based on historical data, then the observer 100 device can determine whether the appliance to which it is attached is running or idle.

Figure 6B:
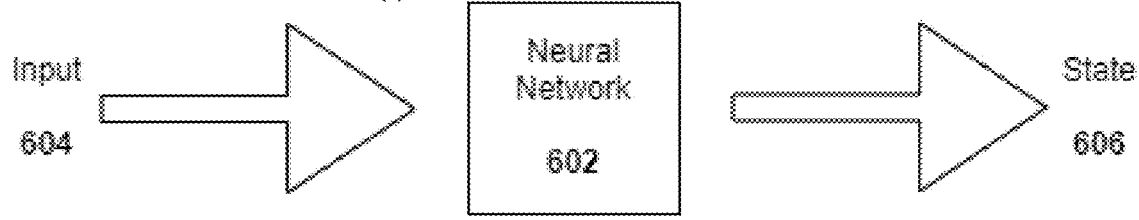
FIG. 6B depicts utilizing a neural network or machine learning model to determine an appliance state (e.g., running or not running, etc.) based on data such as depicted in FIG. 5.

For example, with reference to FIG. 6B, at act 620, observer 100 periodically measures a sensor value such as the acceleration components over a short period of time (T) using an accelerometer or other sensor; and then performs a calculation on the collected data to obtain a result such as a power spectrum density. The calculation may be done with a Fast Fourier Transform (FFT), or using other methods to obtain an average FFT value for that data set. At act 622 if the reading of the result of the calculation is greater than a threshold value, it can be inferred that the appliance is likely running 626 (or is likely in state X, Y, etc.). If it is not, it can be inferred that the appliance is likely not running 624 (or not in state X, Y, etc.). At act 628, if it is determined the appliance is likely running this is noted in an observation history. At act 630, if it is determined that the past M (e.g., an integer of 1 or more) measurements indicate the machine is running (or in state X, Y, etc.), then it can be inferred or determined that the machine is running (or in the "likely"*M state X, Y, etc.). The observer may sleep or delay by a period of time D at act 632, before taking another measurement.

Other algorithms may also be used. For example, the standard deviation of measurements in any of the X, Y, and/or Z axis can be compared to a threshold value. If the value is exceeded, then it is inferred that the appliance is running.

An IMU utilizing an accelerometer, gyroscope, and magnetometer, or any other device, may also be used to detect orientation and vibration changes.

Either of the exemplary observer 100 devices may either broadcast information using Bluetooth Low Energy or connect to remote devices through Bluetooth or Wi-Fi as further described below. See Source Tables 4, 5, 6.

Artwork-Based e-Paper State Display. In some forms of the invention, an electronic display (e.g., an LCD, LED, OLED, E-Ink, projection or projector display, or any other type of electronically controlled display, etc.) may be utilized.

In some forms of the invention, for example, instead of the digital (or analog) display including textual information such as "LOAD", "RUNNING", "DONE" etc., artwork can be used.

For example, predominantly dark graphics or text can be used for "LOAD"/"DIRTY", and predominantly light graphics or text can be used for "DONE"/"CLEAN." Colors may also be used and associated with states. For purposes of illustration and without limitation, if a color e-paper display (e.g., red/black/white, full color, etc.) is used, then red may be used for one of the states such as "LOAD"/Dirty. Of course, any association between state, color, and/or brightness might be utilized.

As an additional example, in some forms of the invention, the graphics may be line art or a picture that a user uploads and associates with the observer device or appliance. The artwork, graphics, text, or other information to be displayed may also update periodically from a server.

The artwork can also be used in conjunction with a textual description of the state by having the textual description superimposed or overlaid on top of the art.

Pinwheel or Mechanical Display. In some forms of the invention, a mechanical display may be utilized. For example, E-ink and other electronic displays can be relatively expensive. Instead of or in addition to using these displays, a motor or servo with a pinwheel, flap, or other mechanism or object may be used. The object may include different colors or messages on its surface that can rotate, flip, or otherwise move as needed while the observer device is active (i.e., not in a low electrical current sleep mode, etc.) and then persistently display while the device is inactive (i.e., in a low electrical current sleep mode).

Projection Display. In various forms of the invention, a projector (e.g. projector, pan/tilt projector, spherical projector, etc.) may be used to project information onto observed machines. The projector may brighten and dim based on ambient light amount, user preferences, or time of day, and may project state above device at user eye level, and may move so that when appliance is in use or blocked by the user the annotation is not occluded and is still visible to the user nearest the appliance or machine. Alternatively, or in addition, the information may also be data sent to a server that is then used to annotate an augmented reality device instead of physically projecting light onto the device For purposes of illustration and without limitation, if a kitchen dishwasher is observed, when it is ready to load a red "Load" state may be projected onto the appliance; if running a blue "Running" state designator could be projected onto the device; if done a green "Done" designator may be projected onto the appliance or above the appliance. As another example, if an observed stove is hot, then a red hot indicator can be projected onto or above the appliance as to alert users that the device is hot.

I.1.B Observer Hardware—Example Vision-Based Observer

Figure 2C:
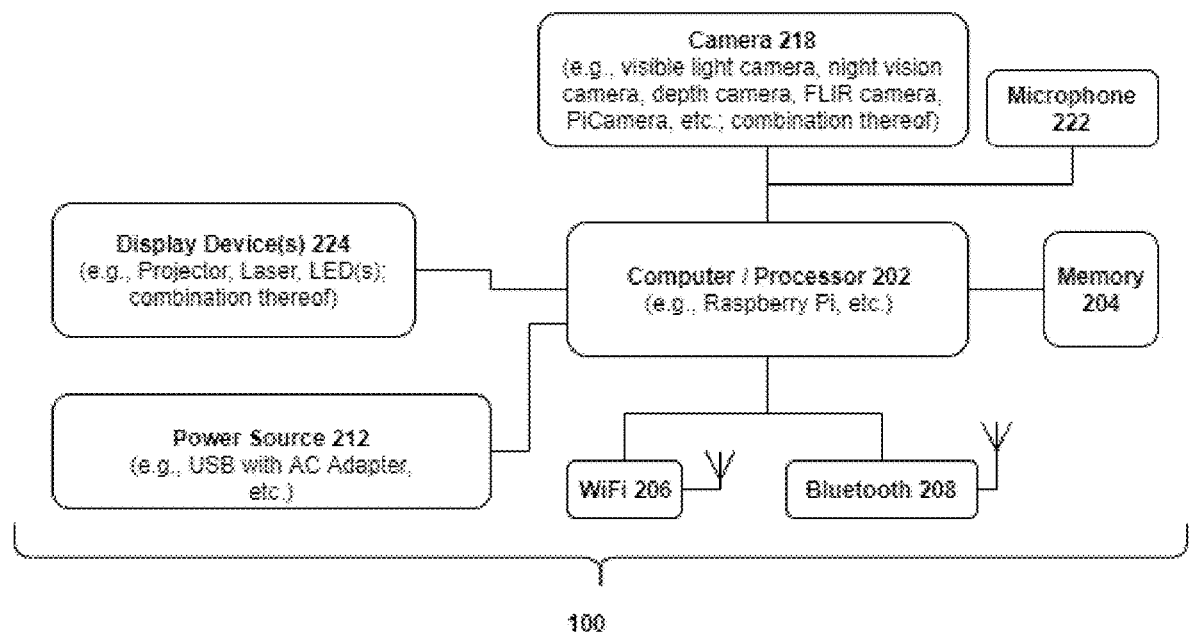
FIG. 2C depicts yet another example observer device.

As one example for purposes of illustration and without limitation, with reference to FIG. 2C, an observer 100 may also be configured as follows. Observer 100 includes at least a processor 202, memory 204, a wireless interface 206 (e.g., Wi-Fi, etc.), a source of power 212 (e.g., wall plug), and a camera 218. Such devices may be existing third-party security camera devices (such as those produced by Ring, Nest, Zmodo, Wyze, any Real Time Streaming Protocol (RTSP) compatible camera, etc.). The images recorded from those devices may be obtained using an Application Programming Interface (API), and analyzed or processed on a remote computing device.

As another example, observer 100 includes at least a processor 202 (e.g., a Raspberry Pi 3B+), memory 204, a wireless interface(s) 206 and 208 (e.g., Bluetooth Low Energy, Bluetooth, Wi-Fi, etc.), a source of power 212 (e.g., wall plug or battery), and a camera device 218 (e.g., a PiCamera, etc.).

As another example, observer 100 includes at least a processor 202 (e.g., a Raspberry Pi 3B+), memory 204, a wireless interface(s) 206 and 208 (e.g., Bluetooth Low Energy, Bluetooth, Wi-Fi, etc.), a source of power 212 (e.g., wall plug or battery), a camera device 218 (e.g., a PiCamera, etc.) and optionally an audio capture device 222 (e.g., USB Microphone, etc.).

As another example, observer 100 includes at least a processor 202 (e.g., a Raspberry Pi 3B+), memory 204, a wireless interface(s) 206 and 208 (e.g., Bluetooth Low Energy, Bluetooth, Wi-Fi, etc.), a source of power 212 (e.g., wall plug or battery), and a camera and depth camera device 218 (e.g., a Kinect, etc.).

These examples may be modified and adapted to different, substitute, or equivalent components based on availability and for design for manufacture.

The user interface for any of the exemplary observer 100 devices can utilize at least any of the following: buttons built onto the device, the relative orientation of the device to the ground based on the accelerometer or an IMU, RGB LED, a display, voice assistants, or mobile device applications, a website, etc. as further described herein.

The housing for any of the exemplary observer 100 devices is configured to allow the camera to be directed to view an appliance in order to capture images (e.g., RGB, depth, thermal, etc.) and sound (e.g., to produce a spectrogram) produced by the appliance and/or people interacting with the appliance. For example, sequential images and sound recordings of users loading, starting, and unloading the appliances as well as sequential images and sound of the device running can be used to train one or more neural networks to infer the current state of a device.

These exemplary observer 100 devices may simply capture images and sound for further processing on a backend server, or the observer 100 devices may utilize onboard processors (including optional neural network processors) to analyze the captured information themselves.

The observer 100 device may alternatively be integrated into or interfaced with (wired or wirelessly) an appliance. For example, observer 100 device may be interfaced with a control circuit of an appliance in order to determine or infer state information of the appliance. Observer 100 may be configured to have its camera face the appliance from a remote location, or may be integrated with the appliance as to be able to observer users that interact with the appliance. Observer 100 may perform facial recognition on the users in order to determine or infer not only the state information of the appliance, but also the last person to load or run the appliance. Upon detecting the appliance has finished running, observer 100 may then notify the recognized individual to unload the appliance. See Source Tables 7 and 8.

I.1.C Observer Hardware—Display Features

In addition to acting as an observer, observers attached/connected/in communication with a display may also act as a smart screen device that displays information such as weather information, spelling information, conversion information, or timer information. This information may be obtained directly from the internet or may be obtained or pushed from a connected or nearby voice assistant.

For example, the observer may display information it obtains from the internet. At a specific time of day or when the observer has been idle for a period of time, it may show: (1) only the weather forecast; (2) a split screen with the appliance state and a weather forecast; and/or, (3) a weather forecast with appliance state also shown somewhere on the screen. The weather forecast shown can be one that is based on a pre-configured setting or a location determination or setting.

For example, if a user queries a voice assistant for the weather, the voice assistant may also transmit a graphic display of the weather forecast to a nearby observer device if the observer is equipped with a screen.

For example, if a user queries a voice assistant to start a timer, the voice assistant may also transmit a graphic display of the timer countdown, or an instruction to graphically display a timer countdown ending at a certain time, to a nearby observer device if the observer is equipped with a screen.

In either case, the voice assistant may transmit the instructions or information via any wireless communication channel such as Wi-Fi, BLE, etc.

I.1.D Observer Hardware—Example Sensor- and Vision-Based Observer Enclosure

Different case designs can be used with an observer 100 device depending on the device capabilities.

Figure 2D:
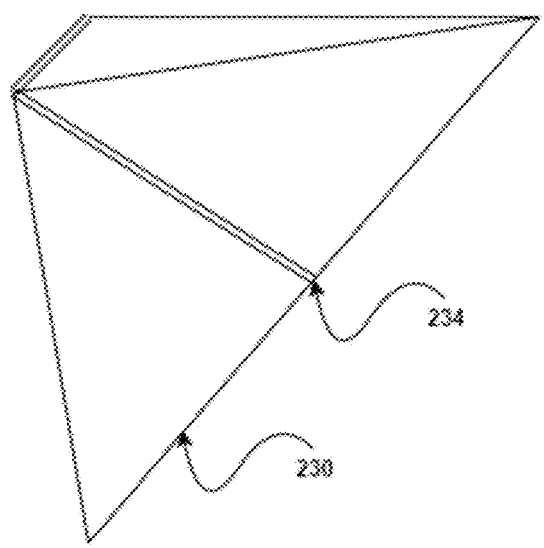
FIG. 2D depicts one physical form of an example observer device.
Figure 2E:
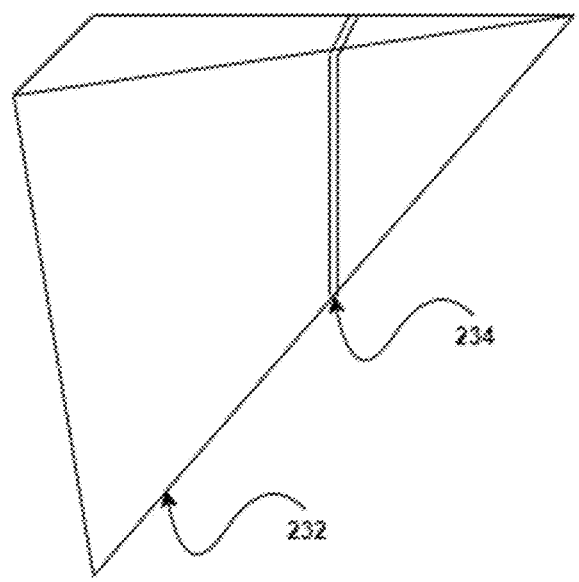
FIG. 2E depicts another physical form of an example observer device.

For example, with reference to FIG. 2D, one form of a sensor-based observer 100 device is depicted. The case 230 contains a clear window 234 for status led diffusion to facilitate viewing from any angle. Similarly, FIG. 2E provides another form of a sensor-based observer device with case 232 and clear window 234. The status led may indicate the state of the device with a constant or intermittent color illumination. For example, a red light may indicate "Dirty/Ready to Load," a green light might indicate "Clean/Done," a blue light may indicate "Washing/Running," a yellow light may indicate "Alert/Caution," a white light may indicate a system status such as booting up, firmware updating, Wi-Fi connected, etc. The case 230 and/or 232 may also have rounded corners, a teardrop cross section, and/or a base level of thickness so no sharp edges on hypotenuse. The case 230 and/or 232 may also have any other shape. The case may have a magnetic, adhesive or other attachable and/or detachable backing for application of the case to an observed appliance or machine.

Figure 2F:
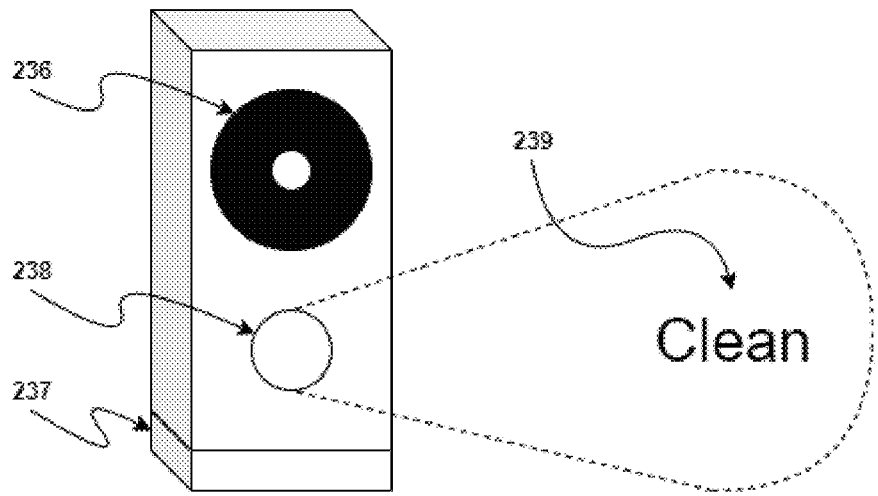
FIG. 2F depicts a physical form of an example image-based observer device.

For example, with reference to FIG. 2F, one form of an image-based observer 100 device is depicted. The device contains an imaging device 236, a projection device 238, and optionally a mount 237. The imaging device 236 may be any type or combination of imaging devices. The various forms of the image-based observer 100 device may also contain sensors for non-imaging-based classification. The imaging device 236 may be able to pan and/or tilt to change the field of view either manually or under electronic control. The projection device 238 may be any type of projector and may project the current status 239 of the observed object onto or within the proximity of the observed object. The projected current status 239 may be placed higher or lower and/or to the left or right of the projection area to better correlate the status with the observed device in the real world. In some forms of the device, the mount 237 is present. The mount 237 may be manually controlled or may be electronically controlled in pan/tilt/angle and/or any other axis.

Figure 2G:
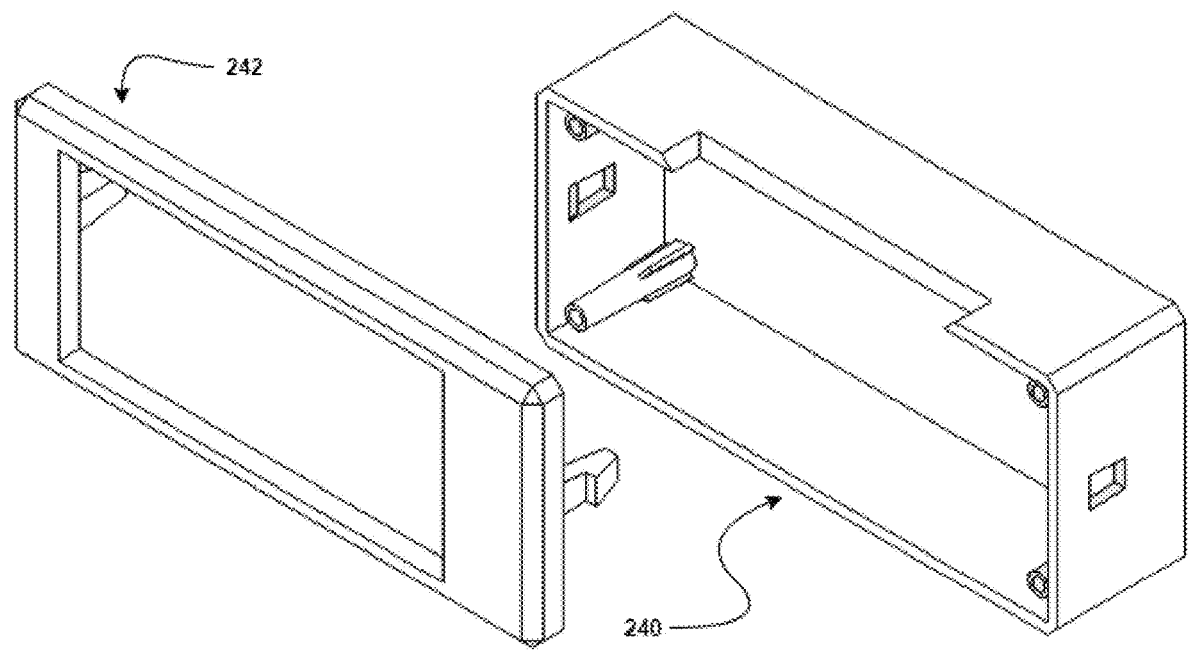
FIG. 2G depicts a physical form of a sensor- or accelerometer-based observer device.
Figure 2H:
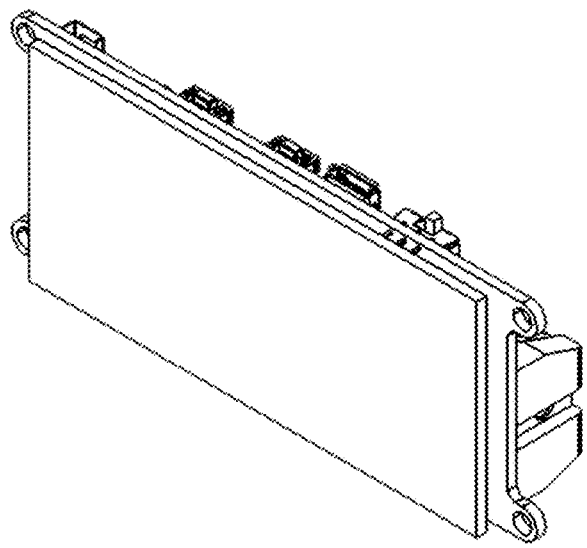
FIG. 2H depicts a physical form of a circuit board for a sensor- or accelerometer-based observer device.
Figure 2I:
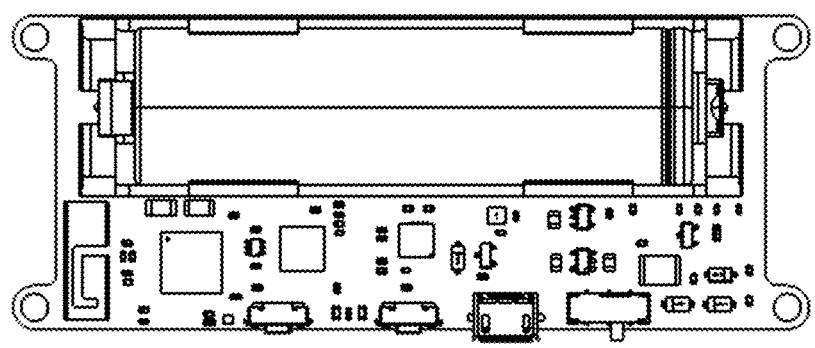
FIG. 2I depicts another view of a physical form of a circuit board for a sensor- or accelerometer-based observer device.
Figure 2J:
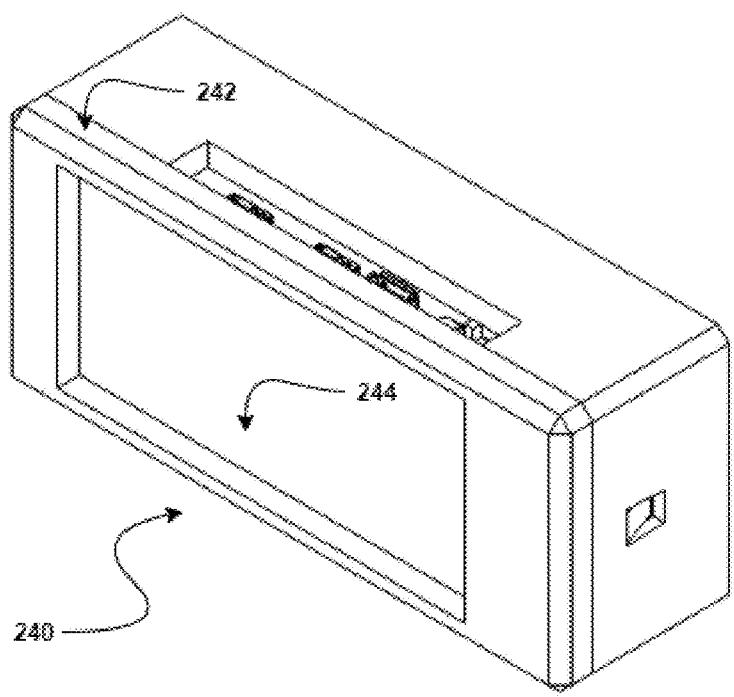
FIG. 2J depicts a physical form of the circuit board for a sensor- or accelerometer-based observer device in the case depicted in FIG. 2G.
Figure 2K:
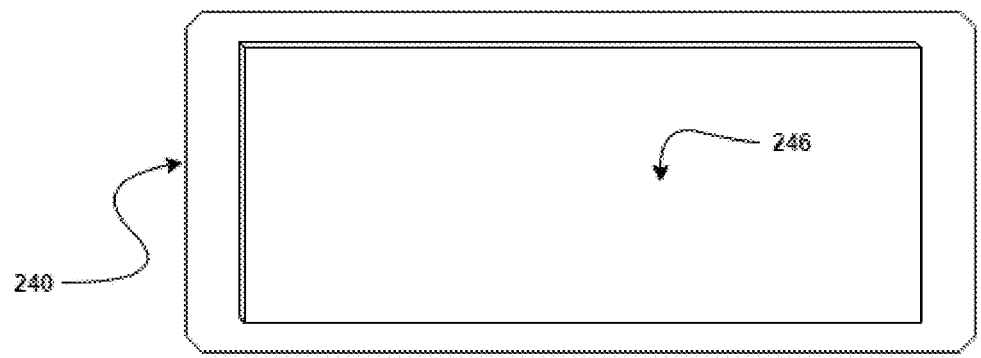
FIG. 2K depicts a rear view of FIG. 2J.

For example, with reference to FIG. 2G, another form of a sensor-based observer 100 device case is depicted. The case has a front portion 242, and a back portion 240. With reference to FIGS. 21H and 21, a sensor-based observer 100 device including a display (e.g., a 2.9-inch E-ink, etc.) is depicted. The device also optionally includes buttons, a USB charging port, an LiPo battery (e.g., 18650 size, etc.), RGB LED, Red LED, Green LED, etc. The sensor-based observer device can be screwed into the back portion 240 of the case. As depicted in FIG. 2J, the front portion 242 of the case snaps over the front of the device into the back portion 240 of the case while leaving the display 244 visible. If the sensor-based observer did not have a display, or had a different type or size of display, an alternate front portion 242 of the case may be provided with an appropriate opening or no opening. Furthermore, other shapes of front portion 242 may be provided for fun (e.g., like a refrigerator or appliance magnet, etc.), aesthetics (e.g., different colors, designs, etc.), branding (e.g., detergent company, soap company, dryer sheet company, etc.), etc. As depicted in FIG. 2K, the back may have an adhesive or magnetic backing 246 that allows the observer 100 device and/or case to attach and/or detach from an observed appliance or machine.

Figure 2L:
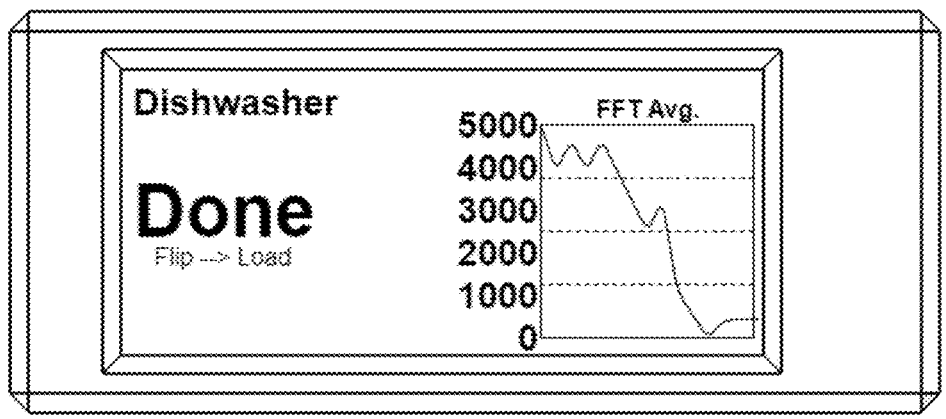
FIG. 2L depicts a physical form of a sensor- or accelerometer-based observer device with a display screen indicating that a dishwasher is clean or done.

Observer devices with a display (e.g., E-ink, etc.) may update the display in order to provide information to people passing by the observer device and the observed object. For purposes of illustration and without limitation, with reference to FIG. 2L, the observer device display has been updated to indicate that a Dishwasher appliance to which it is (removably) attached is "Done." The screen also indicates that the device may be "flipped" (e.g., rotated 180 degrees upside down) to transition the state of the observer from "Done" to "Load" (e.g., "Flip→Load", etc.). The device may also provide additional information such as a graph showing the "FFT. Avg." value detected by the observer devices. In this particular example, the reduction in the "FFT. Avg." over time to a sustained level below a threshold value has caused the observer to conclude that the observed dishwasher is now "Done." The done indication may be placed on a light color background with dark text so that it is easily visible from a distance.

Figure 2M:
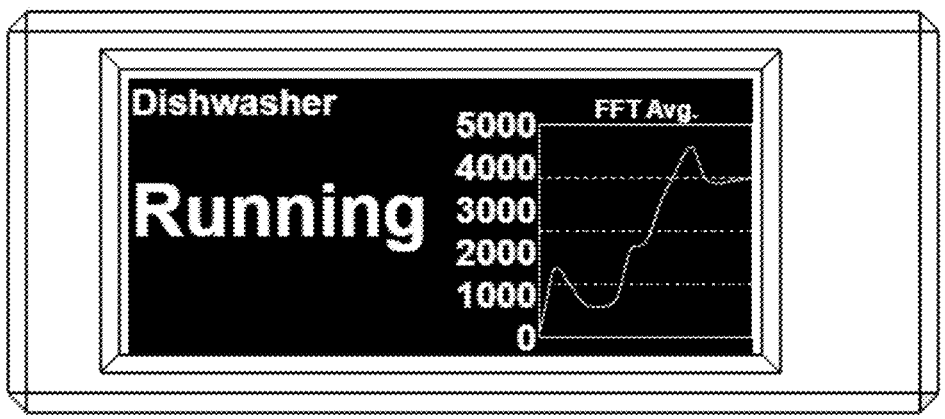
FIG. 2M depicts a physical form of a sensor- or accelerometer-based observer device with a display screen indicating that a dishwasher is running.

For purposes of illustration and without limitation, with reference to FIG. 2M, the observer device display has been updated to indicate that a Dishwasher appliance to which it is (removably) attached is "Running." The device may also provide additional information such as a graph showing the "FFT. Avg." value detected by the observer devices. In this particular example, the increase in the "FFT. Avg." over time to a sustained level above a threshold value has caused the observer to conclude that the observed dishwasher is now "Running." The running indication may be placed on a dark color background with light text.

Figure 2N:
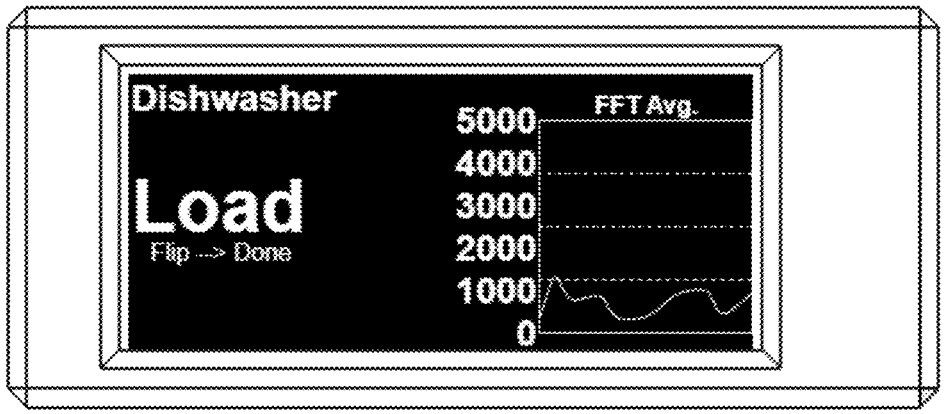
FIG. 2N depicts a physical form of a sensor- or accelerometer-based observer device with a display screen indicating that a dishwasher is dirty or ready to load.

For purposes of illustration and without limitation, with reference to FIG. 2N, the observer device display has been updated to indicate that a Dishwasher appliance to which it is (removably) attached is "Ready to Load." The screen also indicates that the device may be "flipped" (e.g., rotated 180 degrees upside down) to transition the state of the observer from "Load" to "Done" (e.g., "Flip→Done", etc.). The device may also provide additional information such as a graph showing the "FFT. Avg." value detected by the observer devices. In this particular example, the observer has concluded that the observed dishwasher is now ready to "Load," because it was either flipped 180 degrees while displaying "Done" or because it was rotated downward such that the screen was facing the ground for a period of time to indicate that the user had the dishwasher door open for a sufficient period of time to indicate that the dishwasher was unloaded after it was "Done." The load indication may be placed on a dark color background with light text so that it is easily visible from a distance. Alternatively, the load indicating background may be a dark red or a yellow or any other color depending on the capabilities of an E-Ink or other type of display.

Power Management.

In various forms of the invention, the battery-powered observer device manages its power by entering deep sleep mode for varying amounts of time, as shown in the various Source Tables, then the observer wakes up and takes a measurement with its sensors. If no action is needed, the observer re-enters deep sleep; otherwise, information is updated on the screen of the device (if applicable) and on the server backend via the Internet as necessary.

I2. System Overview

Below, a general system and different exemplary systems will be discussed. These are meant to be examples of systems of varying complexity and do not necessarily constitute two different "embodiments" of the invention. Systems of varying complexity and forms, including systems that are composed of a combination of devices and sensors described herein but not specifically detailed in an example, may work together as part of the system herein described. These devices may be less complex, more complex, or of intermediate complexity when compared to the exemplary devices described.

I.2.A Example Acceleration or Sensor-Based Observer System(s)

Figure 3A:
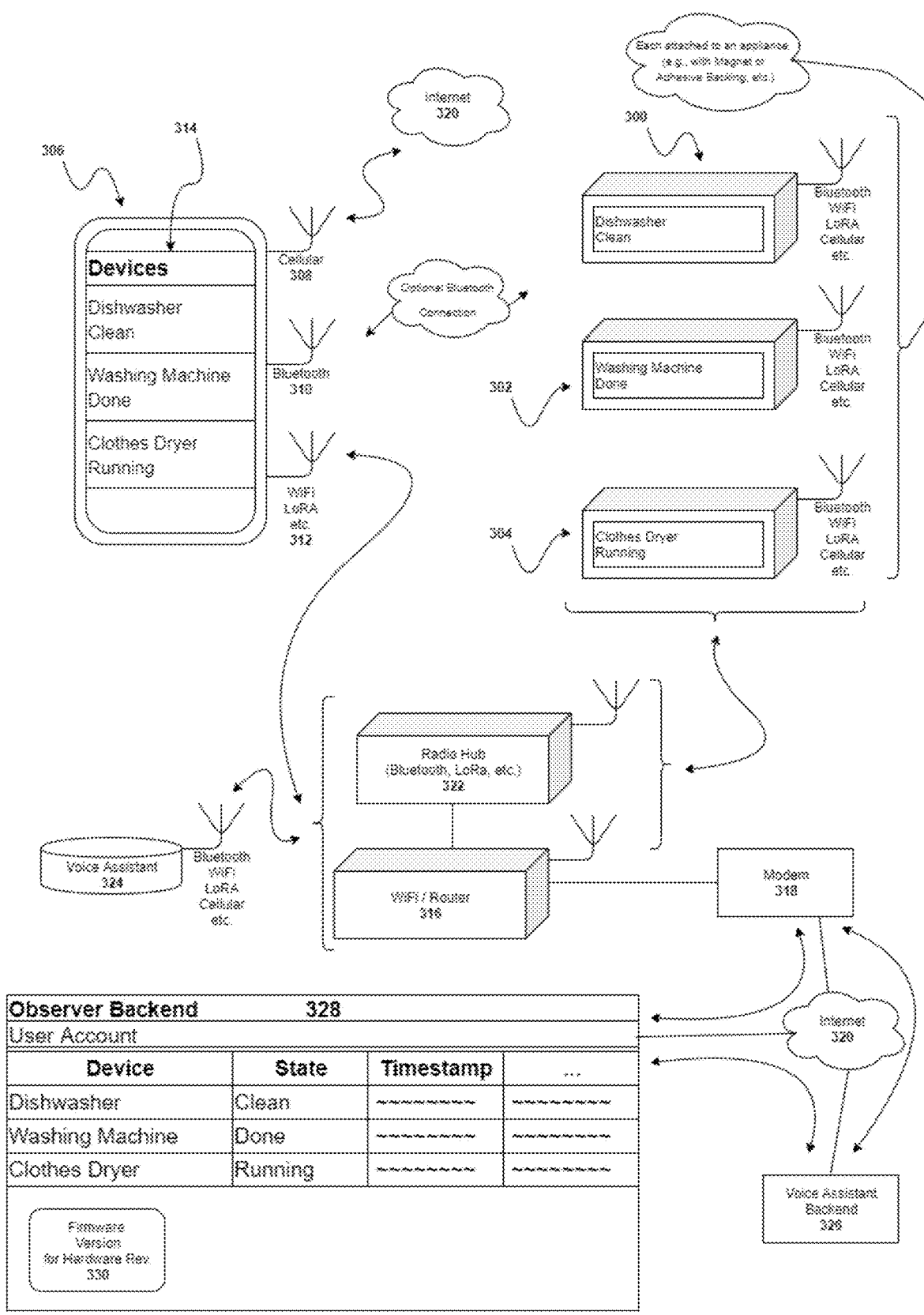
FIG. 3A depicts one example system utilizing an observer device.

With reference to FIG. 3A, the system includes at least one observer 100 device such as devices 300, 302, and 304.

The system may also include a mobile phone 306 with a Wi-Fi interface 312, Bluetooth interface 310, and a cellular interface 308 capable of establishing a connection to the Internet 320. The mobile phone 306 may further contain a control application 314 configured to specifically interface with observer 100 devices.

The system may also include any of the following: a Wi-Fi access point and/or router 316 coupled to a modem 318 capable of establishing a connection to the Internet 320, a radio hub 322 (e.g., a device with any combination of a Bluetooth, LoRA, or other radio interface running a MQTT or other server, etc.) coupled to the Wi-Fi access point, a smart home device 300 coupled to the router 316 and a voice assistant 324 wirelessly coupled to the Wi-Fi access point.

The system may be coupled, via the Internet 320, to a voice assistant backend 326 (e.g., Amazon Alexa, Google Assistant), an observer backend 328 (e.g., Amazon AWS, Microsoft Azure, Google Cloud, Blynk, etc.), and a push notification backend (e.g., Apple, Android, Twitter, SMS, etc.).

I.2.A.i BLE Device Paired to Phone

As one example implementation of the system, an observer 100 utilizes a Bluetooth Low Energy (BLE) interface broadcast data to a nearby mobile device 306. The mobile device 306 may then relay this information to a back-end server 328 via the Internet 320.

As another example, when an observer 100 device is idle it may act as an iBeacon so that it can awaken mobile devices 306 that pass by the observer 100 and communicate with them. The iBeacon broadcast may also contain coded information relating to the inferred state of the observed appliance as part of the major ID or minor ID of the iBeacon broadcast. The mobile device 306, upon receiving an iBeacon or BLE advertisement, may respond by pairing or initiating a communication session over the Bluetooth interface to exchange data with the observer 100. The observer 100 may also collect information from its sensors when idle.

The mobile device 306 may also check to see if there is updated data on the back-end server 328 that is to be sent to the observer 100 device. If there is such data, then the mobile device will retrieve the data via its Wi-Fi or cellular interface over the Internet and then transmit that data to the observer 100 over the Bluetooth interface.

The observer may then hibernate while it optionally collects more sensor data for a period of time, or it may immediately become an iBeacon or BLE advertiser again.

I.2.A.ii Phones as Data Aggregators Using Bluetooth Beacon Transmissions

As another example, mobile device 306 has an application 314 that is installed that listens for all UUIDs assigned to observer 100 devices. Currently iOS allows an application to listen for 20 different UUIDs. Each UUID could have 0xFFFF unique major IDs and 0xFFFF unique minor IDs. When a mobile device 306 senses one of the UUIDs, it can start ranging for beacons and obtain the major and minor IDs and report that to a central server.

A back-end server 328 can process that information, associate the information with a specific observer 100 devices, determine the state of that observer 100 device based on the encoding in the major and minor IDs that indicate what device it is, and what its current state is.

The back-end server 328 can then notify appropriate user's that have subscribed to notifications for state changes from that device. In this way, third parties that pass by an observer 100 may relay information about the state of the observer to interested parties without having to pair the observer 100 to the mobile device 306 (which would be impractical for third parties to do for unknown-to-them observer 100 devices).

I.2.A.ii BLE Device Paired to HUB

As another example, observer 100 devices may be paired via Bluetooth or Bluetooth Low Energy or any other communication technology to a radio hub 322.

Radio hub 322 may be a device such as a Raspberry Pi running a NodeRed MQTT server. The data hub 322 is connected via Wi-Fi or wired connection to the home router 316. The data hub can then orchestrate the data flow from the observer 100 to other services and actions around the house.

Radio hub 322 may also be a device such as a Google Home or Amazon Echo smart speaker. The observer 100 may communicate with Bluetooth to the radio hub 322, which then performs additional actions such as notifying a phone or relaying information from the observer 100 to a back-end server for further processing and/or notification.

I.2.A.iv Observer Connected Via Wi-Fi

As another example, observer 100 devices include a Wi-Fi interface and connect to a home Wi-Fi network associated with a user. The devices are able to connect through the Wi-Fi router 316 and modem 318 to the Internet 320 and update the observer back-end database 328. The observer back-end database may be any back-end service including for example that provided by Blynk.io (or AWS, Azure, etc.).

A portion of the observer back-end 328, or any other part of the system, may also store firmware updated 330 for observer devices 100 such as devices 300, 302, and 304. Observer devices 100 may connect to the Internet 320 to request any available firmware updates 330 for their particular hardware revision if the firmware version is greater than the current firmware version on the observer device. Alternatively, firmware may be pushed to the observer devices 100.

I.2.B Example Vision-Based Observer System(s)

Figure 3B:
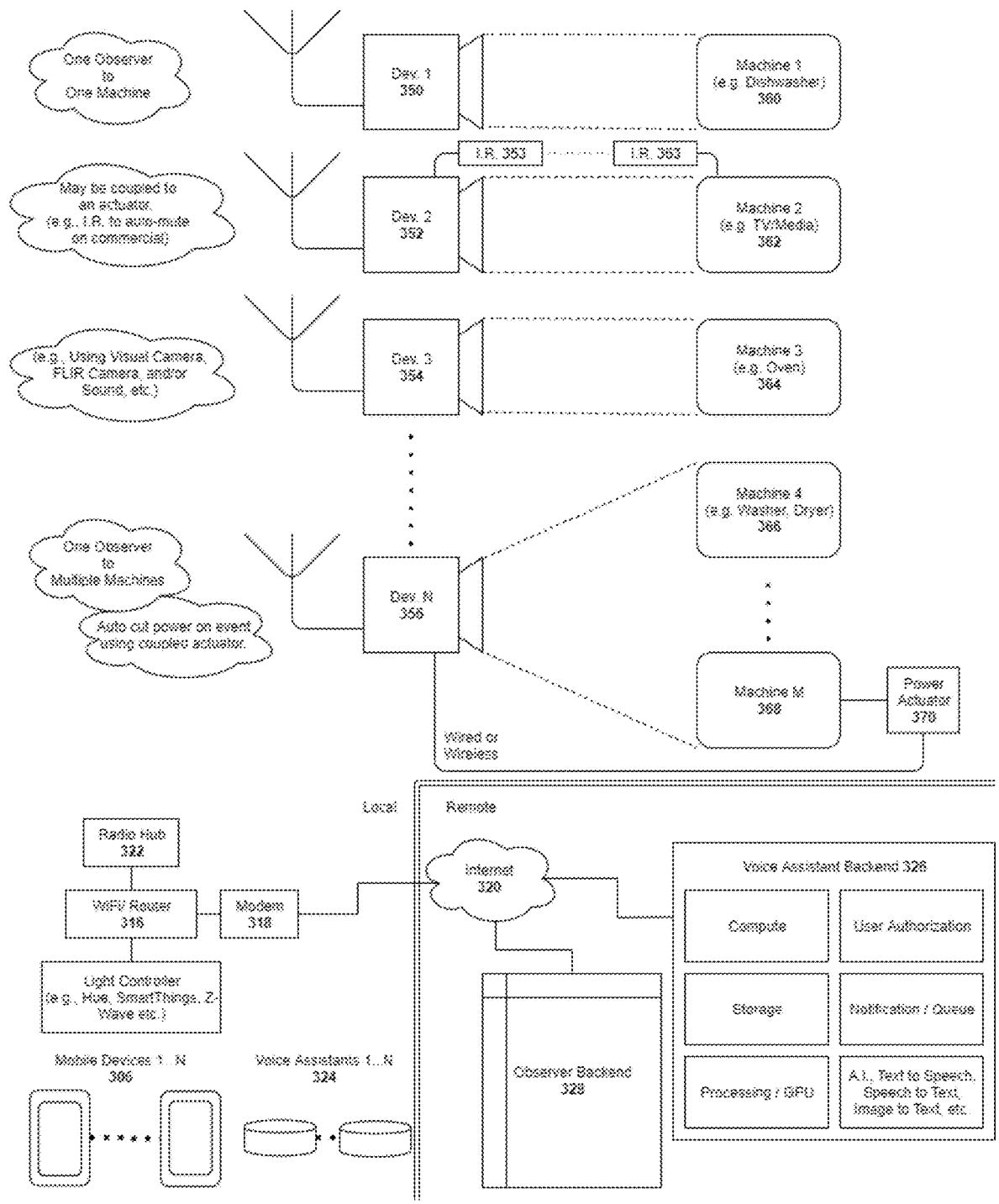
FIG. 3B depicts another example system utilizing an observer device.

With reference to FIG. 3B, the system includes at least one observer 100 device such as devices 1 through N 350, 352, 354, and 356. At least one observer 100 is configured to visually observe at least one machine such as machines 1 through M 360, 362, 364, 366, and 368. The exemplary system of FIG. 3B may be combined with the system depicted in FIG. 3A or any other disclosure in this specification.

The system may also include at least one mobile device(s) 306 with at least a Wi-Fi interface, Bluetooth interface, and optionally a cellular interface capable of establishing a connection to the Internet 320. The mobile device(s) 306 may further contain a control application 314 configured to specifically interface with at least one of observer 100 devices.

The system may also include any of the following: a Wi-Fi access point and/or router 316 coupled to a modem 318 capable of establishing a connection to the Internet 320, a radio hub 322 (e.g., a device with a Bluetooth, LoRA, ZigBee, or other radio interface running a server such as an MQTT server, etc.) coupled to the Wi-Fi access point, a smart home device coupled to the router such as a Phillips Hue light controller and at least one voice assistant or smart speaker such as smart speakers 1 through N 324 wirelessly coupled to the Wi-Fi access point.

The system may be coupled, via the Internet 320, to a voice assistant backend 326 (e.g., Amazon Alexa, Google Assistant), an observer backend 328 (e.g., Amazon AWS, Microsoft Azure, Google Cloud, Blynk, etc.), and a push notification backend (e.g., Apple, Android, Twitter, Email, SMS, etc.).

Observer 100 devices of different types and capabilities (including vision-based sensing) can be combined in any system. Furthermore, accelerometer-based and vision-based observers can be combined in the same system.

For example, a first device 350 is an observer 100 device that may include a camera, or a camera and microphone. It is configured to observe a dishwasher 360. The first device 350 observes the dishwasher, and notes when it is ready to load/dirty, running, or done/clean and needs to be unloaded. The first device 350 may accomplish this by processing locally or remotely any combination of images, sounds, videos, etc. to determine current state and/or state change events that it records to either the radio hub 322, the observer backend 328, or both. The first device 350 may also be configured to recognize the identity of the person who last loaded dishwasher 360 in order to send targeted notifications to that person when the dishwasher is done or when it is ready to be unloaded.

As another example, a second device 352 is an observer 100 device that may include a camera, or a camera and microphone along with an infrared transceiver/transmitter 353. It is configured to observe a television/entertainment center. The second device 362 may be configured to recognize when the television has been neglected—that is when everyone left the room without turning off the TV. In such instances, the second device 352 will automatically turn the television off via transmitting a command from infrared transceiver/transmitter 353 to infrared transceiver/receiver 363. The second device 352 may also be configured to recognize when commercials are played on television and to automatically mute the television during commercials, or to fast forward or skip ahead until non-commercial content is detected on the television.

Still further, an exemplary third device 354 is an observer 100 device that may include a camera, a thermal camera, and a microphone. The third device is configured to observe an oven 364. The thermal image may be used to determine if the oven has been neglected in an "On" state.

In the illustrative example, a Nth device 356 is an observer 100 device that may include a camera or a camera and microphone along with an interface, either wired or wireless, to an actuator such as a power or motion actuator 370. The fourth device may be configured to observe multiple machines such as a washing machine and a dryer 366. It may also be configured to observe another machine such as a hot water heater 368. The fourth device is configured to track the state of the washing machine and the dryer and communicate the updated state as appropriate to either the radio hub 322, the observer backend 328, or both. It is also configured to detect an abnormal state with the hot water heater 368. If an abnormal state is detected with the hot water heater 368, then the actuator 370 can shut off power to the hot water heater (if it is a power actuator) or turn off the water supply to the hot water heater (if it's a motion actuator) and alert the appropriate person or people. Different actuators can be hooked to different machines and coupled wirelessly to the observer system in order to go beyond merely monitoring devices and also impart change on the observed devices.

These observer 100 devices 350, 352, 354, and 356, are configured to transmit updated state or status information or commands via the Wi-Fi connection. These commands are routed to the Internet. Updated state information is transmitted to either the radio hub 322, the observer backend 328, or both. Commands to actuate a power actuator or light command may be routed to the internet to a backend service such as a voice assistant backend 326, and thereafter a response is received. A voice query is routed from smart speakers 324 via Wi-Fi access point/router 316, modem 318, and via the Internet 320 to voice assistant backend service 326. Voice assistant backend service may communicate (transmit information, receive information, or both) with observer backend 328 via the Internet 320 to receive updated state information or issue commands to the observer backend. The observer backend may relay those commands back to the appropriate observer devices via the Internet 320. Voice assistant backend service 326 formulates a voice response with retrieved information and causes the voice assistant 324 to audibly respond. See Source Tables 7 and 8.

I.2.C Example Other System(s)

The systems may be interfaced with various other systems such as notification systems (e.g., IFTTT, Apple Push Notification System, Android Push Notification System, SMS Notification Systems, Twitter, Amazon Alexa Voice Announcement System, Google Home Voice Announcement System, etc.), home lighting systems (e.g., Phillips Hue, etc.), and smart plug systems (e.g., Kasa, WeMo, etc.), or any other system that has an Application Programming Interface or other access mechanism.

II. State Machines

Inferring the state of an appliance attached to or observed by observer device 100 may be accomplished using a finite state machine model of the appliance.

II.1 Example State Machines

For purposes of illustration and without limitation, the various forms of the observer 100 devices may be utilized with state machine types described herein to model the behavior of appliances that may be observed with the observer 100.

Two-State Machines. Machines that have a first state and a second state. See, e.g., Table 1, below.

Three-State Machines. Machines that have three states. See, e.g., Table 2, below.

More-State Machines. Machines that have an integer number of states greater than three.

Generic Machine or Abnormal State Detector. Generic machines that have a normal state and an abnormal state. (e.g., Hot water heater, Saw, etc.). See, e.g., Tables 3.1 and 3.2, below.

Neglectable Machine or Openable Machine. Machines that users may forget to return to non-used state. For example, garage doors, ovens, stoves, refrigerators, sinks, TVs, lights, etc. See, e.g., Tables 4.1 and 4.2, below.

Single User Machine. Machines that can be occupied or un-occupied (e.g., Rooms such as bathrooms or conference rooms). See, e.g., Tables 5.1 and 5.2, below.

Loadable Machine. Machines that are loaded, run, and then complete a cycle. (Washer, Dryer, Dishwasher, Coffee Maker, Microwave, etc.). See, e.g., Tables 6.1 and 6.2, below.

Cyclic Machines. Machines that are intended to cycle from an idle state to a working state repeatedly without issue. See, e.g., Tables 7.1 and 7.2, below.

The above categories of state machines are for illustration only and may be modified in the claims simplify or combine various aspects or terminology used. Furthermore, the more detailed descriptions of each of the general categories of state machines may be modified to add or remove states and transitions to simplify or add features.

Each of the below tables are applicable to any type or configuration of observer such as those relying on various sensors, accelerometer data, vision data, sound data, etc. The notation used in Tables 1 through 7 is as follows: (A) each state is denoted in brackets; for example, State: [Name of State] (B) each transition is denoted with an arrow; for example, Transition to State: →State; (C) each line in each cell is optionally independent of the other lines in the cell. For example, "Detected [1]. (newline) Detected [2]. (newline) Detected [3]." should be read as "[1] alone, [2] alone, [3] alone, or any combination of [1], [2], and [3] (and possibly other factors)."

TABLE 1

Two-State Machine.

| Machine | [State 1] | → State 2 | [State 2] | → State 1 |
|---|---|---|---|---|
| Generic/Other | State 1 | Detect specified activity 2. Detect rotation of device around specified axis. | State 2 | Detect specified activity 1. Detect rotation of device around specified axis. |
| Dishwasher | Ready to Load. Dirty. | Detect running done with accelerometer and/or temperature. Detect rotation of device around specified axis. | Ready to Unload. Clean. | Detect unloaded (e.g., door open for greater than threshold time, etc.). Detect rotation of device around specified axis. |
| Washing Machine (Top Load) | Available. Ready to Load. Load. | Detect running done with accelerometer and/or temperature. Detect rotation of device around specified axis. | Ready to Unload. Done. | Detect unloaded (e.g., door open for greater than threshold time, etc.). Detect rotation of device around specified axis. |
| Washing Machine (Front Load) | Available. Ready to Load. Load. | Detect running done with accelerometer and/or temperature. Detect rotation of device around specified axis. | Ready to Unload. Done. | Detect unloaded (e.g., door open for greater than threshold time, etc.). Detect rotation of device around specified axis. |
| Dryer | Available. Ready to Load. Load. | Detect running done with accelerometer and/or temperature. Detect rotation of device around specified axis. | Ready to Unload. Done. | Detect unloaded (e.g., door open for greater than threshold time, etc.). Detect rotation of device around specified axis. |
| Garage Door | Open | Detected closed (e.g., rotation of 90 degrees around specified axis.) | Closed | Detected open (e.g., rotation of 90 degrees around specified axis.) |

TABLE 2

Three-State Machine.

| Machine | [State 1] | → State 2 | [State 2] | → State 3 | [State 3] | → State 1 |
|---|---|---|---|---|---|---|
| Generic/Other | State 1 | Detect specified activity 2. Detect rotation of device around specified axis. | State 2 | Detect specified activity 3. Detect rotation of device around specified axis. | State 3 | Detect specified activity 1. Detect rotation of device around specified axis. |
| Washing Machine | Available. Ready to Load. Load. | Detect running with accelerometer and/or temperature. Detect rotation of device around specified axis. | Running. Washing. | Detect running complete with accelerometer and/or temperature. Detect rotation of device around specified axis. | Ready to Unload. Done. | Detect unloaded (e.g., door open for greater than threshold time, etc.). Detect rotation of device around specified axis. |
| Dryer | Available. Ready to Load. Load. | Detect running with accelerometer and/or temperature. Detect rotation of device around specified axis. | Running. Drying. | Detect running complete with accelerometer and/or temperature. Detect rotation of device around specified axis. | Ready to Unload. Done. | Detect unloaded (e.g., door open for greater than threshold time, etc.). Detect rotation of device around specified axis. |
| Dishwasher | Ready to Load. Dirty. | Detect running with accelerometer and/or temperature. Detect rotation of device around specified axis. | Running. Washing. | Detect running complete with accelerometer and/or temperature. Detect rotation of device around specified axis. | Ready to Unload. Clean. | Detect unloaded (e.g., door open for greater than threshold time, etc.). Detect rotation of device around specified axis. |

TABLE 3.1

Generic Machine/Abnormal State Detector

| Specific Machine | [Normal] | → Alert | [Alert] | → Normal |
|---|---|---|---|---|
| Generic/Other | Normal. | Problem detected. | Alert appropriate person or people. | Problem resolved, or alert dismissed |
| Water Heater (observer device attached to the body of the heater) | Normal with no water on ground. Normal with no moisture detected on ground. Normal within specified temperature range. | Problem detected. Detect rotation of device around specified axis. Detect abnormal temperature reading. | Alert appropriate person of nature of problem. | Normal situation detected with water heater. |
| Toilet (observer device attached to pipe or fixture) | Normal operation. Flowing water detected for expected period using accelerometer, vibration, or water flow sensor. If equipped, no moisture detected on floor near toilet using moisture detector. | Abnormal operation detected (e.g., constantly running water, water detected on floor, etc.) | Alert appropriate person or people. | Toilet normal operation detected. |
| Person/Baby (e.g., Awake, Crying, etc.) | Asleep or not crying. Vibration detected associated with the baby being awake. Sound detected associated with the baby crying. | Detected awake and/or crying. | Alert appropriate person or people. | Detected asleep and/or not crying. |
| Person (e.g., monitor trichotillomania (hair pulling) or other disorder.) | Not pulling hair. Not exhibiting motion associated with disorder based on accelerometer worn on wrist, etc. | Detected motion associated with disorder. | Alert appropriate person or people. | Detected motion associated with disorder has stopped. |
| Person (e.g., monitor not fallen). | Person standing, sitting, laying down on bed. Person not laying down or hunched over on floor based on accelerometer reading from wrist, GPS position indicating a public place, heart rate or body heat indicating the device is being worn. | Detected person falling/ or laying hunched over where not expected (e.g., not at home based on GPS, while wearing the device on wrist). | Alert appropriate person on people. Optionally, alert emergency services. | Detected situation resolved. |

TABLE 4.1

| Specific Machine | [Normal] | → Vulnerable | [Vulnerable] | → Alert | [Alert] | → Normal |
|---|---|---|---|---|---|---|
| | | | Neglectable Machine | | | |
| Generic/Other | Normal. | Detected the machine has been placed in a vulnerable state. | The machine is in a vulnerable state. | Determines that the machine has been neglected while in the vulnerable state | Alert appropriate person or people. | Detected machine placed in normal state, or alert dismissed |
| Refrigerator. (observer device attached to door) | Not in use with door closed. | Detected door open based on orientation reading. | Door open while in use. | Detected prolonged door open state. Detected warning beeping using microphone from refrigerator for prolonged time without user interaction. | Alert appropriate person or people. | Detected door closed. |
| Stove | Not in use with door closed. | Detected heating or hot using temperature sensor or remote temperature sensor. | Heating or hot. | Detected prolonged vulnerable. Detected timer going off using microphone for prolonged time without user interaction. | Alert appropriate person or people. | Detected cooling using temperature sensor. |
| Oven (observer device attached to door) | Not in use with door closed. | Detected heating or hot using temperature sensor. | Steady state heating or hot. | Detected steady state heating or hot for prolonged period using temperature sensor. Detected timer on oven beeping for prolonged time without user interaction. Detected door open and close with accelerometer without cooling period following based on temperature sensor (e.g., user forgot to turn off the oven). | Alert appropriate person or people. | Detected oven off or cooling and door closed. |
| Sink (observer device attached to pipe or fixture) | Not in use/ off based on vibration and/or temperature readings. | Detected running based on vibration and/or temperature readings. | Running. | Detected prolonged on state based on vibration and/or temperature readings. | Alert appropriate person or people. | Detected water turned off based on vibration and/or temperature readings. |
| Television (light sensor placed on power led, motion detector facing outward from tv) | Not in use/ off. | Detected on based on light sensor placed over powered. | On. | Detected prolonged on state while not near a human based on motion sensor. | Emit infrared signal to turn off the television. Alert appropriate person or people. | Detected machine placed in normal state, or alert dismissed |
| Curling Iron (accelerometer in handle and either a temp sensor or power usage sensor) | Not in use/ off | Detected heating or hot. | Steady state heating or hot while in use by person based on accelerometer data. | Detected prolonged steady state heating or hot while not in use by a human based on accelerometer data. | Remove power from the machine. Alert appropriate person or people. | Detected machine placed in normal state, or alert dismissed. Detected cooling. Detected power off. |
| Garage Door | Closed | Detected open/ opening based on accelerometer data. | Open. | Detected prolonged period of time open. | Alert appropriate person or people. | Detected closed/ closing based on accelerometer data. |

TABLE 5.1

Single User Machine

| Specific Machine | [Available] | → In Use | [In Use] | → Alert | [Alert] | → Available |
|---|---|---|---|---|---|---|
| Generic/Other | Machine is available. | Detected that the machine has become occupied | Machine is occupied | A problem is detected with the machine or it is flagged as out of order. | Alert appropriate person or people, and/or note that the machine is not available because it is out of order. | Detected that the machine has become unoccupied. (If from [Alert], the alert flag is reset) |
| Room (observer mounted on door facing inward) | Room is not occupied. | Detected human entering the room using a motion sensor. Detected human entering the room using an accelerometer or other sensor discussed herein. | Room is occupied. | Room flagged as out of service. | Alert appropriate person or people. Note that the room is not available because it is out of order. | Detected human leaving the room using a motion sensor. Detected human leaving the room using an accelerometer. If from [Alert], the alert flag is reset). |
| Parking Spot (observer mounted above parking spot) | Parking spot is empty. | Detected car entering the parking spot or occupying the parking spot using a distance sensor or other sensor discussed herein. | Car is occupying the parking spot. | A problem is detected with the parking spot or it is flagged as out of order or reserved. Optionally, a non-car object is detected to be in the space in the space. | Alert appropriate person or people. Note that the machine is not available because it is out of order. | Car observed leaving the spot using a distance sensor. |
| Seat (mounted in seat or on seat) | Seat is not occupied. | Detected object or human occupying the seat based on a pressure sensor reading or other sensor discussed herein. | Object or human occupying the seat. | A problem is detected with the seat or it is flagged as out of order or reserved. Detect that an object is in seat, alert if in seat too long. Detect that the seat has tipped over based on accelerometer reading. | Alert appropriate person or people. Note that the machine is not available because it is out of order. | Person observed leaving the seat based on pressure sensor reading. |

TABLE 6.1

Loadable Machine

| Specific Machine | [Load] | → Loaded | [Loaded] | → Running | [Running] | → Alert | [Alert] | → Unload | [Unload] | → Load |
|---|---|---|---|---|---|---|---|---|---|---|
| Generic/Other | Machine is empty and not in use. | Detected user loading machine. | Machine is loaded and ready to run. | Detected machine running. | Machine is loaded and running. | Detected problem or error. | There is a problem or error. Stop the machine immediately. Alert appropriate people. | Detected that the machine has completed its running state without error. | Machine has completed running. | Detected user unloading machine. |
| Washing Machine | Available. Ready to Load. Load. | Detected user loading machine. | Machine is loaded and ready to run. | Detect running with accelerometer and/or temperature. Detect rotation of device around | Running. Washing. | Detected problem or error. | There is a problem or error. Stop the machine immediately. Alert appropriate people. | Detect running complete with accelerometer and/or temperature. Detect rotation of device | Ready to Unload. Done. | Detect unloaded (e.g., door open for greater than threshold time, etc.). Detect rotation |

TABLE 6.1-continued

Loadable Machine

| Specific Machine | [Load] | → Loaded | [Loaded] | → Running | [Running] | → Alert | [Alert] | → Unload | [Unload] | → Load |
|---|---|---|---|---|---|---|---|---|---|---|
| | | | | specified axis. | | | | around specified axis. | | of device around specified axis. |
| Dryer | Available. Ready to Load. Load. | Detected user loading machine. | Machine is loaded and ready to run. | Detect running with accelerometer and/or temperature. Detect rotation of device around specified axis. | Running. Drying. | Detected problem or error. | There is a problem or error. Stop the machine immediately. Alert appropriate people. | Detect running complete with accelerometer and/or temperature. Detect rotation of device around specified axis. | Ready to Unload. Done. | Detect unloaded (e.g., door open for greater than threshold time, etc.). Detect rotation of device around specified axis. |
| Dishwasher | Ready to Load. Dirty. | Detected user loading machine. | Machine is loaded and ready to run. | Detect running with accelerometer and/or temperature. Detect rotation of device around specified axis. | Running. Washing. | Detected problem or error. | There is a problem or error. Stop the machine immediately. Alert appropriate people. | Detect running complete with accelerometer and/or temperature. Detect rotation of device around specified axis. | Ready to Unload. Clean. | Detect unloaded (e.g., door open for greater than threshold time, etc.). Detect rotation of device around specified axis. |
| Coffee Maker (Single Serving) | Machine is empty and not in use. | Detected user loading machine. Coffee cup installed under dispenser. | Machine is loaded and ready to run. | Detected machine running. | Machine is loaded and running. | Detected problem or error. | There is a problem or error. Stop the machine immediately. Alert appropriate people. | Detected that the machine has completed its running state without error. | Machine has completed running and coffee cup is ready. | Detected user unloading machine by taking coffee cup. |
| Coffee Maker (Coffee Pot) | Machine is empty and not in use. | Detected user loading machine. Coffee pot installed under dispenser. | Machine is loaded and ready to run. | Detected machine running. | Machine is loaded and running. | Detected problem or error. | There is a problem or error. Stop the machine immediately. Alert appropriate people. | Detected that the machine has completed its running state without error. | Machine has completed running and coffee pot is ready to use. | Detected empty coffee pot, or cold coffee pot. |
| Blender | Machine is empty and not in use. | Detected user loading machine. Pitcher with contents installed. | Machine is loaded and ready to run. | Detected machine running. | Machine is loaded and running. | Detected problem or error. | There is a problem or error. Stop the machine immediately. Alert appropriate people. | Detected that the machine has completed its running state without error. | Machine has completed running. Cleaning required. | Detected empty clean pitcher. |
| Microwave | Machine is empty and not in use. | Detected user loading machine. Detected door closed. | Machine is loaded and ready to run. | Detected machine running. | Machine is loaded and running. | Detected problem or error. | There is a problem or error. Stop the machine immediately. Alert appropriate people. | Detected that the machine has completed its running state without error. | Machine has completed running. | Detected user unloading machine. |

TABLE 7.1

Cyclic Machine

| Specific Machine | [Idle] | → Working | [Working] | → Alert | [Alert] |
|---|---|---|---|---|---|
| Generic/Other | Waiting for next cycle. | Detected working. | Machine is performing work. | Determines an issue while performing work or while idle (prolonged state in either part of cycle). | Alert appropriate person or people. |
| Cashier Employee | Waiting for next customer. | Detected serving customer. | Serving customer. | Detected prolonged idle state or prolonged interaction with customer. | Alert appropriate person or people. |

TABLE 3.2

Generic Machine/Abnormal State Detector (Vision/Sound Based)

| Specific Machine | [Normal] | → Alert | [Alert] | → Normal |
|---|---|---|---|---|
| Generic/Other | Normal. | Problem detected | Alert appropriate person or people. | Problem resolved, or alert dismissed |
| Water Heater | Normal with no water on ground. If Flir or IR Thermometer sensor available, temperature within expected range. | Problem detected. | Alert appropriate person of nature of problem. | Normal situation detected with water heater. |
| Miter Saw/Table Saw | No dangerous situation detected (e.g., no human body parts in path of blade) | Dangerous situation detected. | Use an actuator to immediately shut of the saw. Alert appropriate person or people. | Normal situation detected. |
| Roof of House | No moisture or problem | Moisture detected. | Notify user. | No moisture detected. |
| Toilet (e.g., may be sound-based, proximity sensor, and/or vibration-based only) | Normal operation. | Abnormal operation detected (e.g., constantly running water noise, water detected on floor, etc.) | Alert appropriate person or people. | Toilet normal operation detected. |
| Person/Baby (e.g., Awake, Crying, etc.) | Asleep or not crying. | Detected awake or crying. | Alert appropriate person or people. | Detected asleep or not crying. |
| Person (e.g., monitor trichotillomania (hair pulling) or other disorder.) | Not pulling hair. Not exhibiting motion associated with disorder. | Detected hand pulling hair, eyebrows, etc. Detected motion associated with disorder. | Alert appropriate person or people. | Detected hand moving away from hair, eyebrows, etc. Detected motion associated with disorder has stopped. |
| Person (e.g., monitor not fallen). | Person standing, sitting, laying down on bed. Person not laying down or hunched over on floor. | Detected person falling/or laying hunched over on floor. | Alert appropriate person on people. Optionally, alert emergency services. | Detected situation resolved. |

TABLE 4.2

Neglectable Machine

| Specific Machine | [Normal] | → Vulnerable | [Vulnerable] | → Alert | [Alert] | → Normal |
|---|---|---|---|---|---|---|
| Generic/Other | Normal. | Detected the machine has been placed in a vulnerable state. | The machine is in a vulnerable state. | Determines that the machine has been neglected while in the vulnerable state | Alert appropriate person or people. | Detected machine placed in normal state, or alert dismissed |
| Refrigerator | Not in use with door closed. | Detected door open. | Door open while in use. | Detected prolonged door open state while not near a human. Detected warning beeping from refrigerator for prolonged time without user interaction. | Alert appropriate person or people. | Detected door closed. |
| Stove | Not in use with door closed. | Detected heating or hot. | Heating or hot. Heating or hot with door open. | Detected prolonged vulnerable while not near a human. Detected timer going off for prolonged time without user interaction. | Alert appropriate person or people. | Detected cooling. |

TABLE 4.2-continued

| | | | Neglectable Machine | | | |
|---|---|---|---|---|---|---|
| Specific Machine | [Normal] | → Vulnerable | [Vulnerable] | → Alert | [Alert] | → Normal |
| Oven | Not in use with door closed. | Detected heating or hot. | Steady state heating or hot. | Detected steady state heating or hot for prolonged period. Detected timer on oven beeping for prolonged time without user interaction. | Alert appropriate person or people. | Detected oven off or cooling and door closed. |
| Sink | Not in use/ off. | Detected running. | Running. | Detected prolonged on state while not near a human. | Alert appropriate person or people. | Detected water turned off. |
| Television | Not in use/ off | Detected on. | On. | Detected prolonged on state while not near a human. | Emit infrared signal to turn off the television. Alert appropriate person or people. | Detected machine placed in normal state, or alert dismissed |
| Curling Iron | Not in use/ off. | Detected heating or hot. | Steady state heating or hot while in use by person. | Detected prolonged steady state heating or hot while not near a human. | Remove power from the machine. Alert appropriate person or people. | Detected machine placed in normal state, or alert dismissed |
| Garage Door | Closed | Detected open/ opening. | Open. | Detected prolonged period of time open before or after human/ car activity. | Alert appropriate person or people. | Detected closed/ closing. |
| Escalator or Moving Walkway | Off/not moving | Detected people approaching the entrance to the device. | On/moving. | Determine an issue or dangerous situation involving someone riding on the escalator or moving walkway, (e.g., increased current to motor indicating jam, visual indication of jam, screams or other loud noises detected, etc.) | Stop motion immediately. Alert appropriate person or people. | Detected a period of time with no people on the escalator or moving walkway and nobody in the area of the device. |

TABLE 5.2

| | | | Single User Machine | | | |
|---|---|---|---|---|---|---|
| Specific Machine | [Available] | → In Use | [In Use] | → Alert | [Alert] | → Available |
| Generic/ Other | Machine is available. | Detected that the machine has become occupied | Machine is occupied | A problem is detected with the machine or it is flagged as out of order. | Alert appropriate person or people, and/or note that the machine is not available because it is out of order. | Detected that the machine has become unoccupied. (If from [Alert], the alert flag is reset) |
| Room | Room is not occupied. | Detected human entering the room. | Human observed to have gone in the room. | Detected sign on the door, cleaning cart in front, or flagged as out of order. | Alert appropriate person or people, and/or note that the machine is not available because it is out of order. | Human observed leaving the room. (If from [Alert], the alert flag is reset). |
| Parking Spot | Parking spot is empty. | Detected car entering the parking spot or occupying the parking spot. | Car is occupying the parking spot. | A problem is detected with the parking spot or it is flagged as out of order or reserved. Optionally, a non-car object is detected to be in the space in the space. | Alert appropriate person or people, and/or note that the machine is not available because it is out of order. | Car observed leaving the spot. |
| Seat | Seat is not occupied. | Detected object or human | Object or human occupying | A problem is detected with the parking spot or it is flagged as out | Alert appropriate person or people, and/or note that | Person observed leaving the seat. |

TABLE 5.2-continued

| | | | Single User Machine | | | | |
|---|---|---|---|---|---|---|---|
| Specific Machine | [Available] | → In Use | [In Use] | → Alert | [Alert] | | → Available |
| | | occupying the seat. | the seat. | of order or reserved. Optionally, detect that an object is in seat, alert if in seat too long. | the machine is not available because it is out of order. | | |

TABLE 6.2

| | | | Loadable Machine | | | | |
|---|---|---|---|---|---|---|---|
| Specific Machine | [Load] | → Loaded | [Loaded] | → Running | [Running] | → Alert | [Alert] | Unload |
| Generic/Other | Machine is empty and not in use. | Detected user loading machine. | Machine is loaded and ready to run. | Detected machine running. | Machine is loaded and running. | Detected problem or error. | There is a problem or error. Stop the machine immediately. Alert appropriate people. | Detected that the machine has completed its running state without error. |
| Washing Machine | Machine is empty and not in use. | Detected user loading machine. Detected door closed | Machine is loaded and ready to run. | Detected machine running. | Machine is loaded and running. | Detected problem or error. | There is a problem or error. Stop the machine immediately. Alert appropriate people. | Detected that the machine has completed its running state without error. |
| Dryer | Machine is empty and not in use. | Detected user loading machine. Detected door closed | Machine is loaded and ready to run. | Detected machine running. | Machine is loaded and running. | Detected problem or error. | There is a problem or error. Stop the machine immediately. Alert appropriate people. | Detected that the machine has completed its running state without error. |
| Dishwasher | Machine is empty and not in use. | Detected user loading machine. Detected door closed | Machine is loaded and ready to run. | Detected machine running. | Machine is loaded and running. | Detected problem or error. | There is a problem or error. Stop the machine immediately. Alert appropriate people. | Detected that the machine has completed its running state without error. |
| Coffee Maker (Single Serving) | Machine is empty and not in use. | Detected user loading machine. Coffee cup installed under dispenser. | Machine is loaded and ready to run. | Detected machine running. | Machine is loaded and running. | Detected problem or error. | There is a problem or error. Stop the machine immediately. Alert appropriate people. | Detected that the machine has completed its running state without error. |
| Coffee Maker (Coffee Pot) | Machine is empty and not in use. | Detected user loading machine. Coffee pot installed under dispenser. | Machine is loaded and ready to run. | Detected machine running. | Machine is loaded and running. | Detected problem or error. | There is a problem or error. Stop the machine immediately. Alert appropriate people. | Detected that the machine has completed its running state without error. |
| Blender | Machine is empty and not in use. | Detected user loading machine. Pitcher with contents installed. | Machine is loaded and ready to run. | Detected machine running. | Machine is loaded and running. | Detected problem or error. | There is a problem or error. Stop the machine immediately. Alert | Detected that the machine has completed its running state |

TABLE 6.2-continued

Loadable Machine

| Specific Machine | [Load] | → Loaded | [Loaded] | → Running | [Running] | → Alert | [Alert] | Unload |
|---|---|---|---|---|---|---|---|---|
| Microwave | Machine is empty and not in use. | Detected user loading machine. Detected door closed | Machine is loaded and ready to run. | Detected machine running. | Machine is loaded and running. | Detected problem or error. | appropriate people. There is a problem or error. Stop the machine immediately. Alert appropriate people. | without error. Detected that the machine has completed its running state without error. |

TABLE 7.2

Cyclic Machine

| Specific Machine | [Idle] | → Working | [Working] | → Alert | [Alert] |
|---|---|---|---|---|---|
| Generic/Other | Waiting for next cycle. | Detected working. | Machine is performing work. | Determines an issue while performing work or while idle (prolonged state in either part of cycle). | Alert appropriate person or people. |
| Cashier Employee | Waiting for next customer. | Detected serving customer. | Serving customer. | Detected prolonged idle state or prolonged interaction with customer. | Alert appropriate person or people. |

Figure 7A:
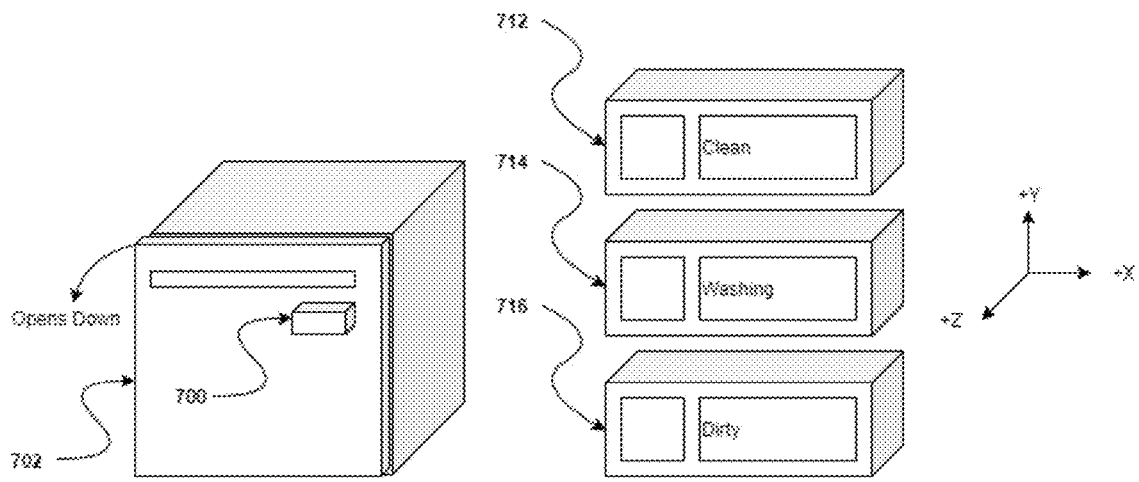
FIG. 7A depicts an example accelerometer-based observer attached to an example dishwasher appliance.

With reference to FIG. 7A, an illustration of an example accelerometer- or sensor-based observer 100 such as device 700 attached to an example appliance 702 (e.g., a dishwasher, etc.) is provided. Dishwasher appliance 702 has a door that opens toward the ground on a horizontal axis. Observer 700 is magnetically (or otherwise) attached to the door of the dishwasher appliance 702. Depending on the inferred state of the dishwasher appliance 702, the observer 700 updates its display (e.g., an e-Ink display, a remote server/mobile phone app, etc.) to indicate the state of the dishwasher such as by stating "CLEAN"/"DONE" 712, "WASHING"/"RUNNING" 714, or "DIRTY"/"LOAD" 716.

Figure 8A:
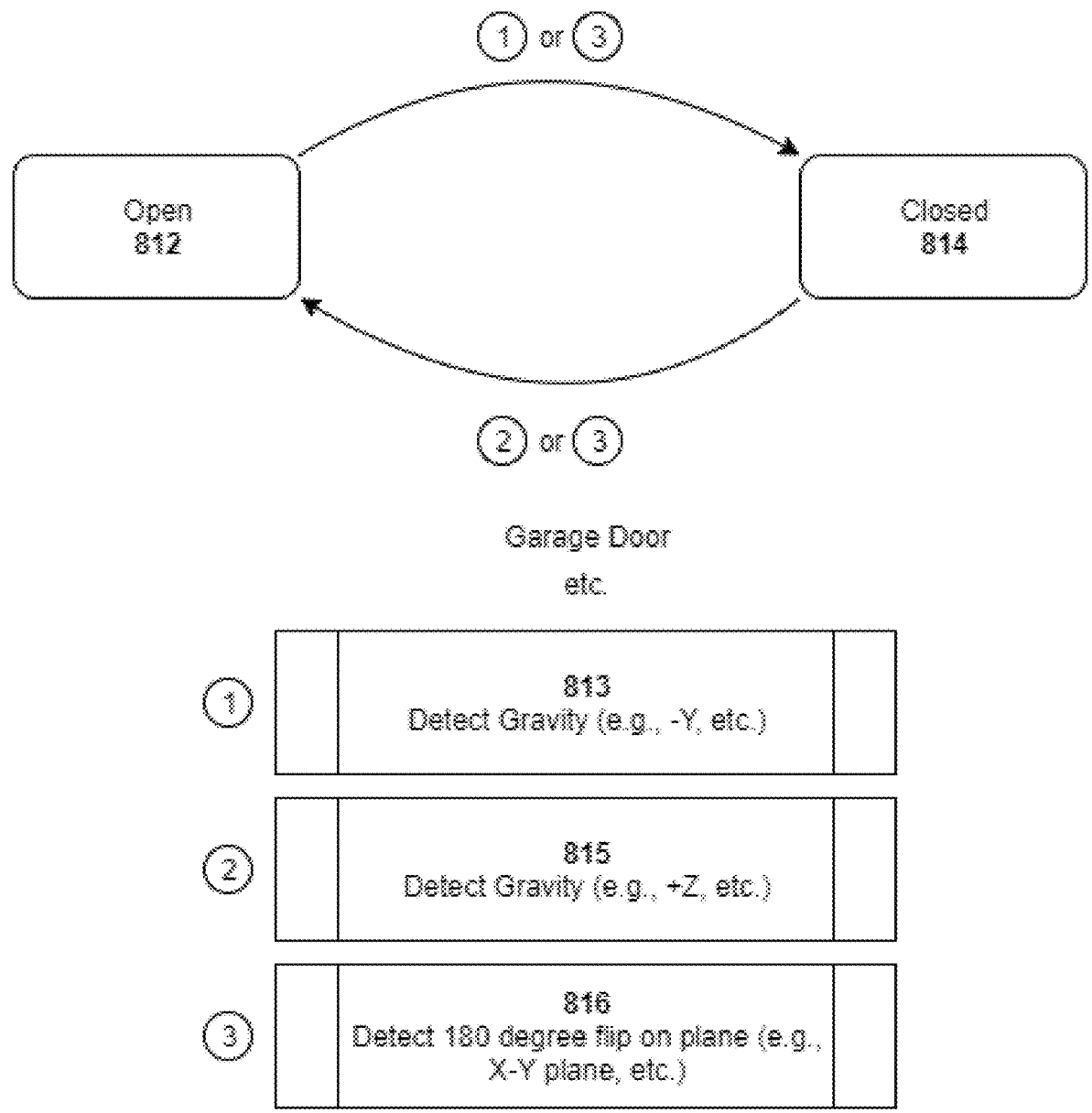
FIG. 8A depicts a two-state state diagram.
Figure 8B:
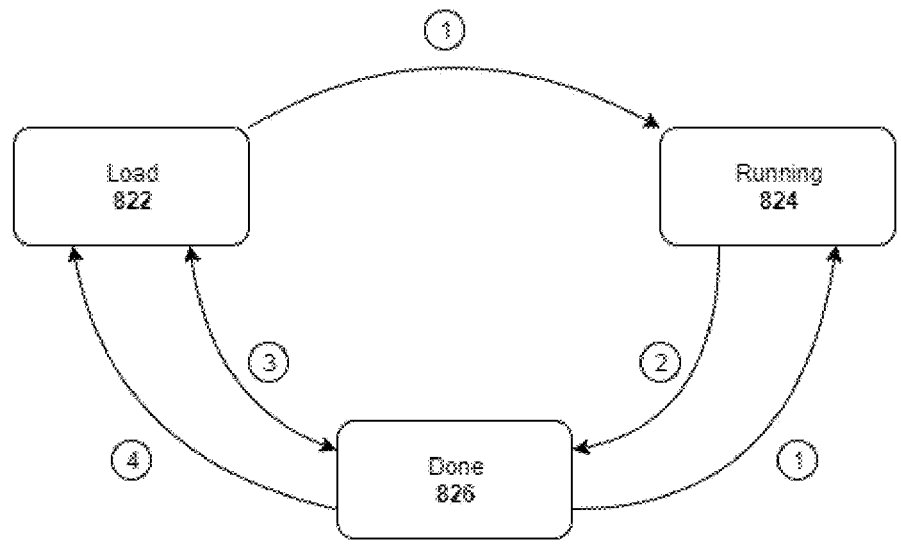
FIG. 8B depicts a three-state state diagram.

With reference to FIG. 8B, a three-state state diagram of the example dishwasher observer 700 depicted in FIG. 7A is provided. At 822, the state is "Load." If a sustained vibration above a threshold level is detected while in the "Load" state, then the transition (1) 823 from the "Load" 822 to "Running" 824 state occurs. Optionally, the sustained vibration considered for this transition may be limited to the vibration in the Z axis only, or the vibration in the X-Y plane only. The sustained vibration may be measured using the accelerometer and a Fast Fourier Transform as illustrated elsewhere herein; or any other method may be used. At 824, the state is "Running". If the sustained vibration above a threshold level stops while in the "Running" state, a transition (2) 825 to the "Done" 826 state occurs. At 826, the state is "Done." If a sustained vibration above a threshold level is detected while in the "Done" state, then the transition (1) 823 from the "Done" 826 to "Running" 824 state occurs. If the door of the dishwasher is opened past a threshold angle (e.g., 45 degrees down) for a sufficient period of time top indicate that a user has unloaded the clean dishes, then the transition (4) 828 from the "Done" 826 state to the "Load" 822 state occurs. If in the "Done" 826 state or the "Load" 822 state, the observer 100 detects that it has been flipped in the X-Y plane or that a designated button has been pressed, the state is reversed from "Done" 826 to "Load" 822 or vice versa via transition (3) 827.

Figure 7B:
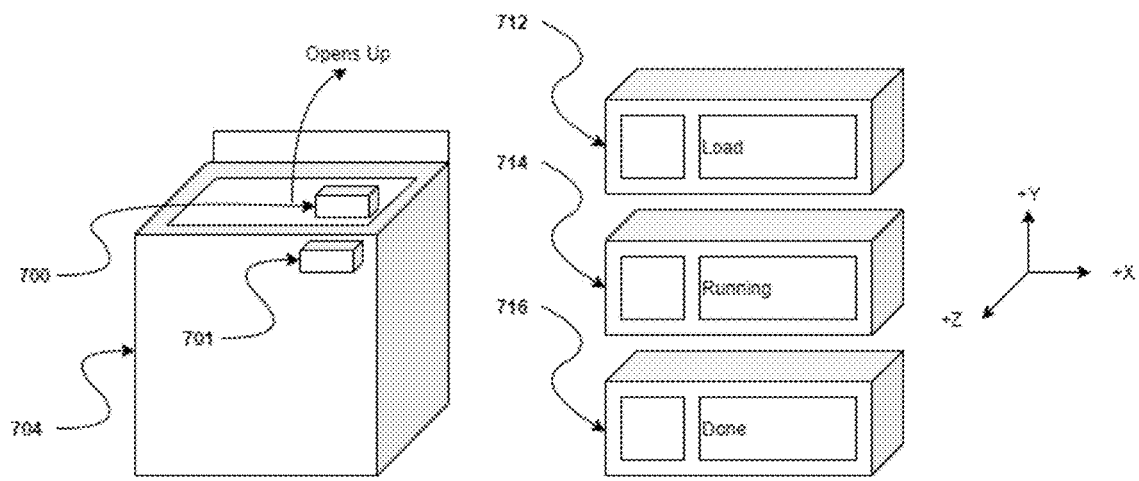
FIG. 7B depicts an example accelerometer-based observer attached to an example top-load washing machine appliance.

With reference to FIG. 7B, an illustration of an example accelerometer-based observer 100 such as either device 700 or 701 attached to an example top-load appliance 704 (e.g., clothes washing machine, etc.) is provided. Top load washing appliance 704 has a door that opens up a horizontal axis. Observer 100 is optionally magnetically attached to the door of the top-load washing appliance such as illustrated by device 700, or may also be attached to the front of the appliance such as illustrated by device 701. Depending on the inferred state of the appliance 704, the observer 100 updates its display (e.g., an e-Ink display, a remote server/mobile phone app, etc.) to indicate the state of the appliance such as by stating "CLEAN"/"DONE" 712, "WASHING"/"RUNNING" 714, or "DIRTY"/"LOAD" 716.

With reference to FIG. 8B, a three-state state diagram of the example appliance observer 700 depicted in FIG. 7B is provided. At 822, the state is "Load." If a sustained vibration above a threshold level is detected while in the "Load" state, then the transition (1) 823 from the "Load" 822 to "Running" 824 state occurs. Optionally, the sustained vibration considered for this transition may be limited to the vibration in the Z axis only, or the vibration in the X-Y plane only). At 824, the state is "Running". If the sustained vibration above a threshold level stops while in the "Running" 824 state, a transition (2) 825 to the "Done" 826 state occurs. At 826, the state is "Done." If a sustained vibration above a threshold level is detected while in the "Done" state, then the transition (1) 823 from the "Done" 826 to "Running" 824 state occurs. If the door of the appliance is opened past a threshold angle (e.g., 45 degrees up) for a sufficient period of time top indicate that a user has unloaded the wet clothes to be placed in the dryer, then the transition (4) 828 from the "Done" state to the "Load" 822 state occurs. If in the "Done"

826 state or the "Load" 822 state, the observer 100 detects that it has been flipped in the X-Z plane or that a designated button has been pressed, the state is reversed from "Done" 826 to "Load" 822 or vice versa via transition (3) 827.

Figure 7C:
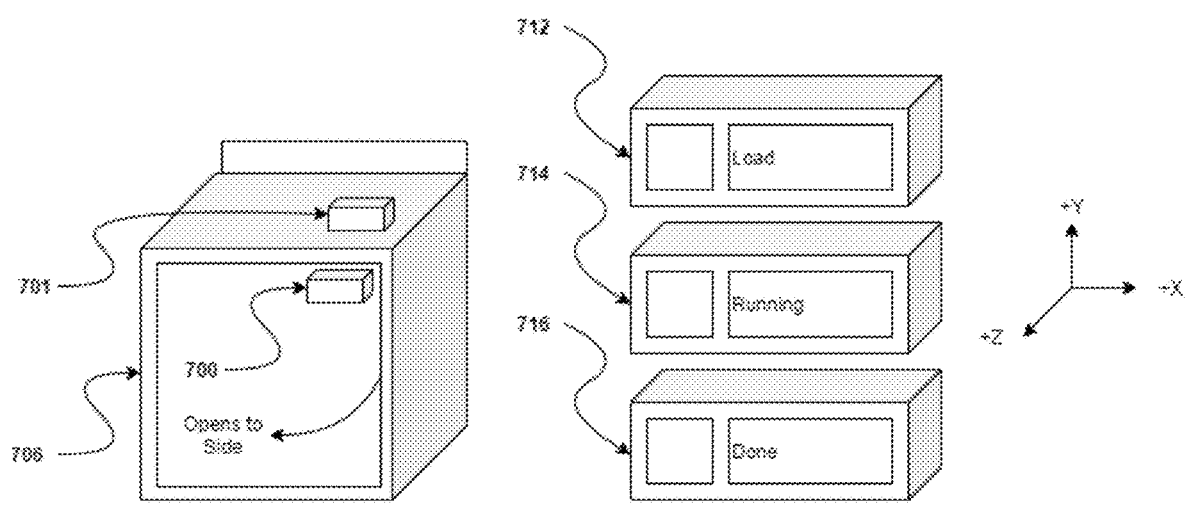
FIG. 7C depicts an illustration of an example accelerometer-based observer attached to an example front-load washing machine or a dryer appliance.

With reference to FIG. 7C, an illustration of an example accelerometer-based observer 100 such as device 700 or 701 attached to an example appliance 706 (e.g., front-load washing machine or a dryer, etc.) is provided. Top load washing appliance 706 has a door that opens outward on a vertical axis. Observer 100 is optionally attached to the door of the front-load washing or dryer appliance as illustrated by device 700 or may also be attached to the top of the appliance as illustrated by device 701. Depending on the inferred state of the appliance 706, the observer 100 updates its display (e.g., an e-Ink display, a remote server/mobile phone app, etc.) to indicate the state of the appliance such as by stating "CLEAN"/"DONE" 712, "WASHING"/"RUNNING" 714, or "DIRTY"/"LOAD" 716.

With reference to FIG. 8B, a three-state state diagram of the example appliance observer 700 depicted in FIG. 7C is provided. At 822, the state is "Load." If a sustained vibration above a threshold level is detected while in the "Load" 822 state, then the transition (1) 823 from the "Load" 822 to "Running" 824 state occurs. Optionally, the sustained vibration considered for this transition may be limited to the vibration in the Z axis only, or the vibration in the X-Y plane only). At 824, the state is "Running." If the sustained vibration above a threshold level stops while in the "Running" 824 state, a transition (2) 825 to the "Done" 826 state occurs. At 826, the state is "Done." If a sustained vibration above a threshold level is detected while in the "Done" state, then the transition (1) 823 from the "Done" 826 to "Running" 824 state occurs. If the door of the appliance is opened past a threshold angle (e.g., 45 degrees outward based on accelerometer, magnetometer, gyroscope, IMU, etc.) for a sufficient period of time top indicate that a user has unloaded the clothes, then the transition (4) 828 from the "Done" 826 state to the "Load" 822 state occurs.

If in the "Done" 826 state or the "Load" 822 state, the observer 100 detects that it has been flipped in the X-Y plane or that a designated button has been pressed, the state is reversed from "Done" 826 to "Load" 822 or vice versa via transition (3) 827.

Additional examples of three-state machine states and transitions for different appliances are provided in Table 2.

Figure 7D:
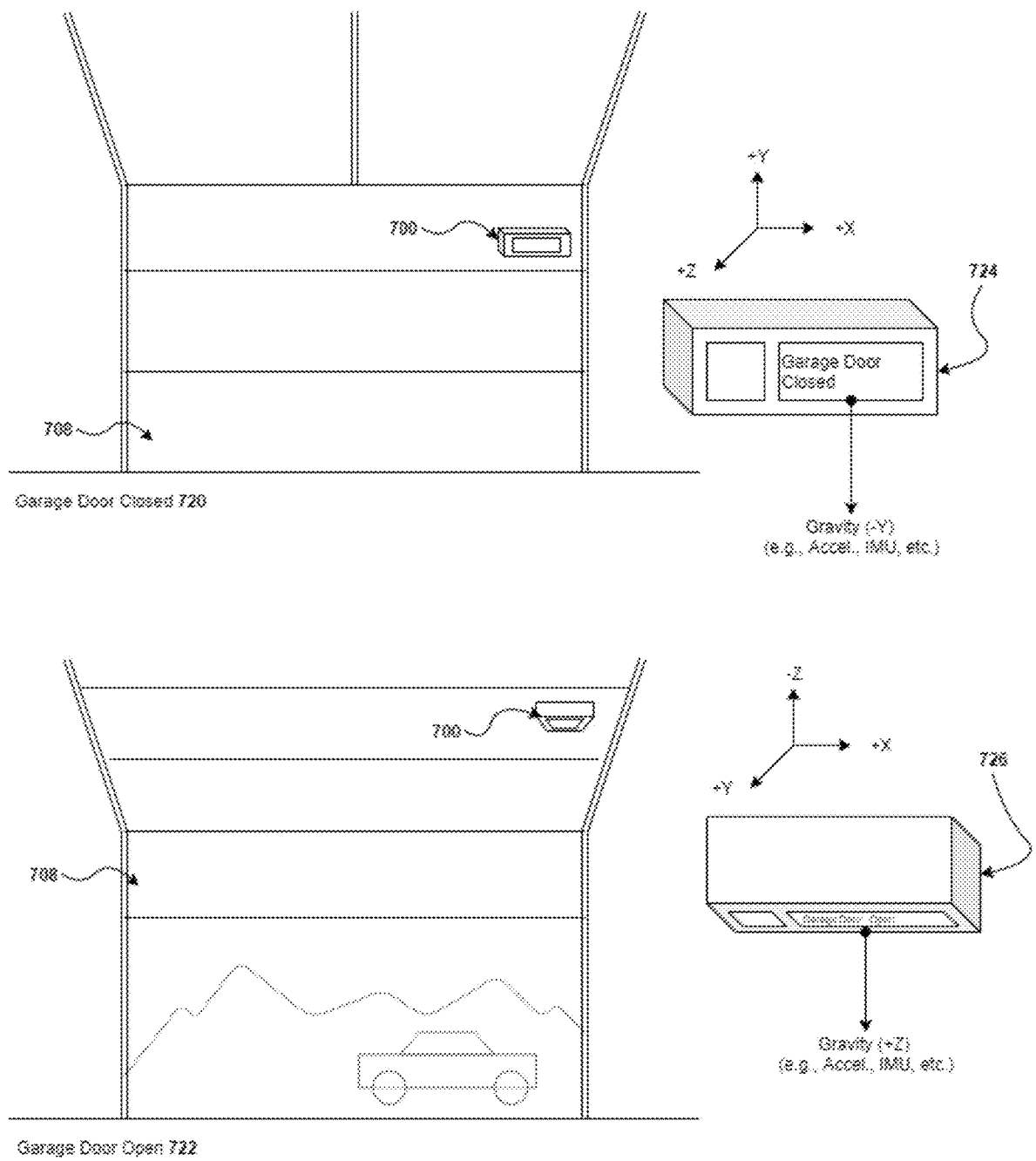
FIG. 7D depicts an example accelerometer-based observer attached to an example garage door.

With reference to FIG. 7D, an illustration of an example accelerometer-based observer 100 attached to an example garage door 708 is provided. Garage door 708 is a vertically oriented plane when closed 720, and a horizontal oriented plane when open 722. Observer 100 is attached to the inside of the garage door with adhesive, tape, or magnets as illustrated by device 700. Depending on the inferred state of the garage door 708, the observer 100 updates its display (e.g., an e-Ink display, a remote server/mobile phone app, etc.) to indicate the state of the garage door 708 such as by stating "OPEN" 726 or "CLOSED" 724.

With reference to FIG. 8A, a two-state state diagram of the example appliance observer 100 depicted in FIG. 7D is provided. At 812, the state is "Open." While in the "Open" 812 state, the gravity vector is detected to be in the +Z axis. If the gravity vector is detected to change to the −Y axis, a transition (1) 813 to the "Closed" 814 state occurs. At 814, the state is "Closed." While in the "Closed" 814 state, if the gravity vector is detected to change to the +Z axis, then the transition (2) 815 from the "Closed" 814 to "Open" 812 state occurs. If in the "Closed" 814 state or the "Open" 812 state, the observer 100 detects that it has been flipped in the X-Y plane or that a designated button has been pressed, the state is reversed from "Open" 812 to "Closed" 814 or vice versa via transition (3) 816.

Figure 7E:
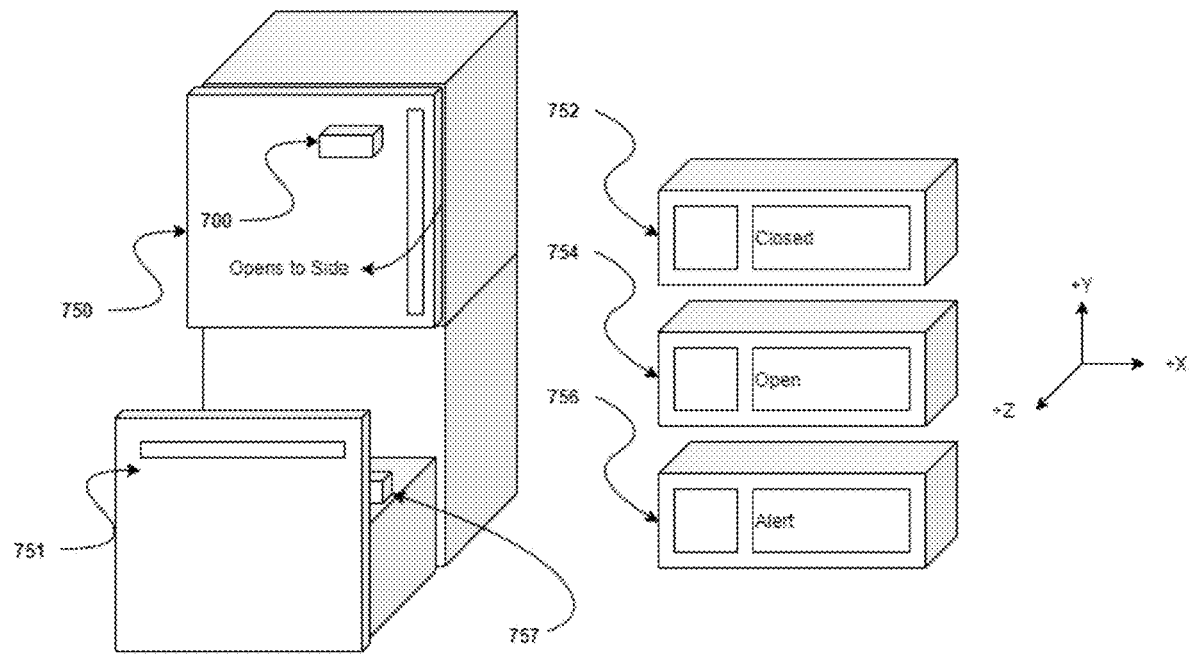
FIG. 7E depicts an example observer with object or range detector, a gyroscope, thermometer, and/or magnetometer, attached to an example refrigerator door.
Figure 8C:
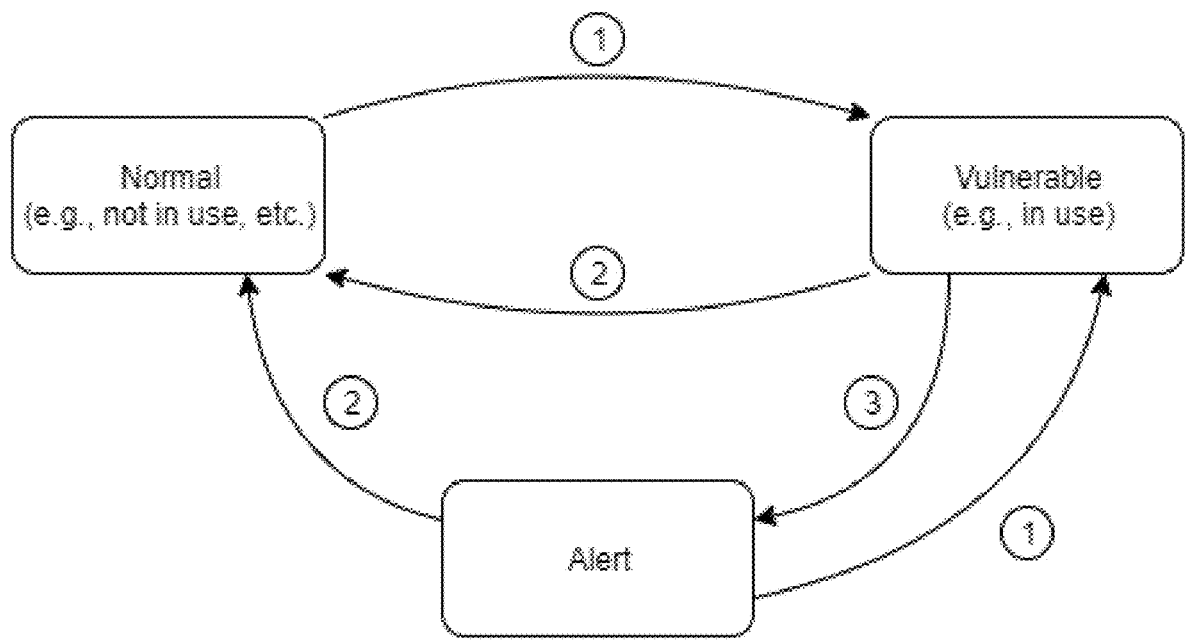
FIG. 8C depicts a neglectable machine state diagram.
Figure 8D:
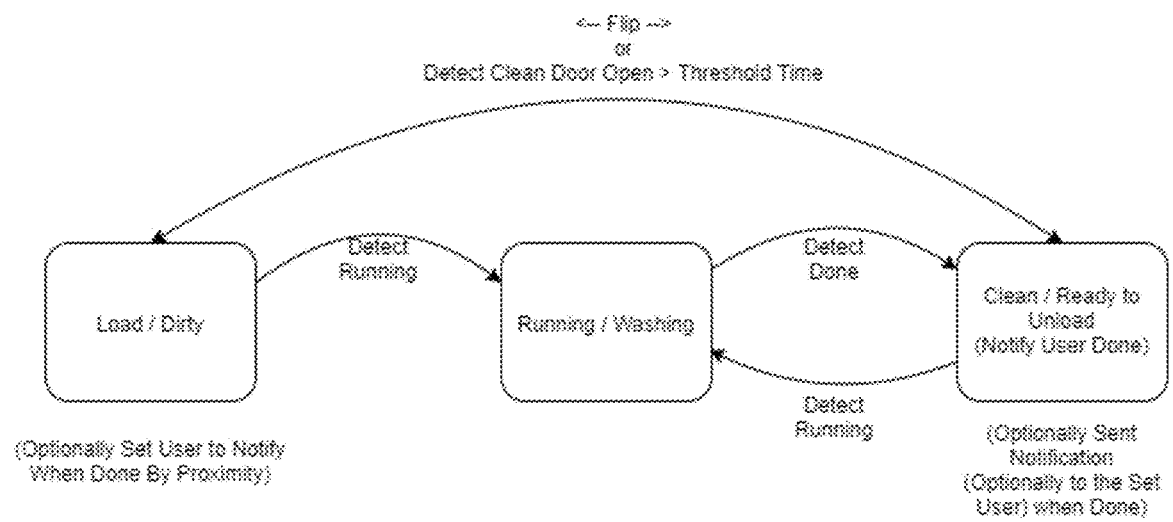
FIG. 8D depicts a state diagram for a loadable machine.
Figure 8E:
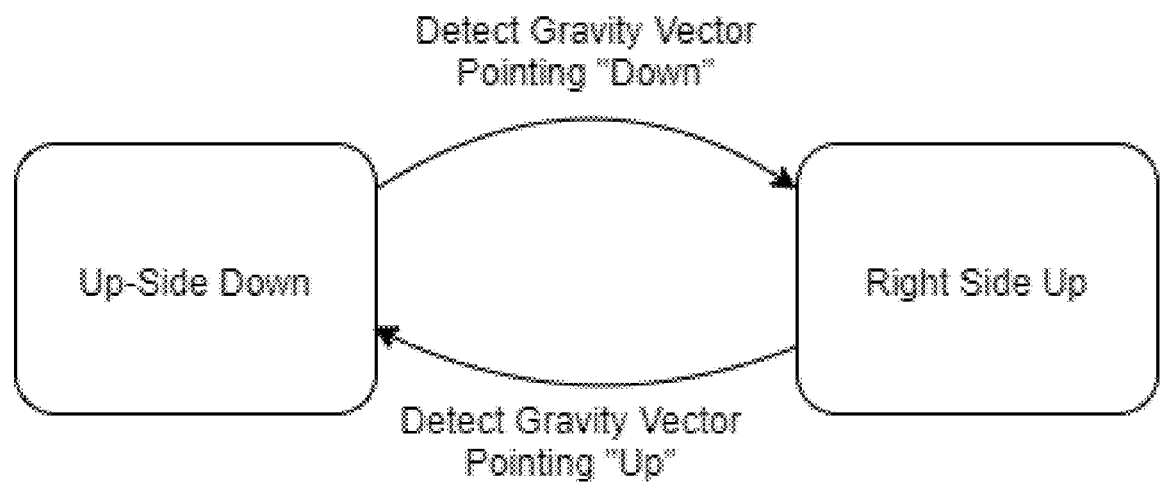
FIG. 8E depicts a state diagram for determining the orientation of an observer device.

With reference to FIG. 7E, an illustration of an example observer 700 attached to an example refrigerator door 750 with either an object or range detector, a gyroscope, and/or a magnetometer, is provided. Refrigerator door 750 is a vertically oriented plane when closed, and also a vertically oriented plane when open. The door is rotated approximately 90 degrees in space. The observer can, for example, detect if the door is open or closed based on: (A) a change in or specific value(s)/range of the magnetic field using a magnetometer, (B) a change in or specific value(s)/range of angular rotation using a gyroscope, (C) a change in whether an adjacent object is detected using an infrared emitter and detector, or (D) a change in range from a LIDAR or distance measuring device, and/or (E) any combination of the above or other sensor readings. Depending on the inferred state of the refrigerator door 750, the observer 700 updates its E-Ink display to indicate the state of the refrigerator door 750 such as by stating "OPEN" 754 or "CLOSED" 752. If the door is left open for a prolonged period of time, the observer 700 may state "ALERT" 756 and notify the appropriate people via notification or other methods. Another example observer 757 may similarly be placed in or on a freezer drawer 751. Various sate machines may be used with a refrigerator, including for example those shown in at least FIGS. 8C, 9B, 9H.

Figure 7F:
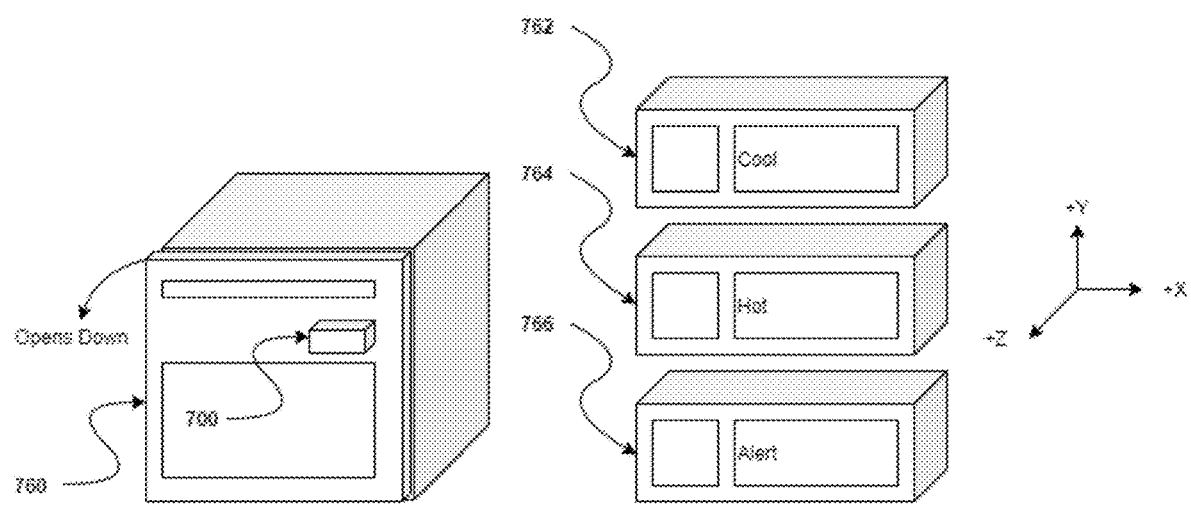
FIG. 7F depicts an example observer with thermometer attached to an example refrigerator door.

With reference to FIG. 7F, an illustration of an example accelerometer- or sensor-based observer 100 such as device 700 attached to an example heating appliance 702 (e.g., an oven, etc.) is provided. Heating appliance 760 has a door that opens toward the ground on a horizontal axis. Observer 700 is magnetically (or otherwise) attached to the door of the appliance 760. Depending on the inferred state of the heating appliance 760, the observer 700 updates its display (e.g., an e-Ink display, a remote server/mobile phone app, etc.) to indicate the state of the dishwasher such as by stating "COOL" 762, or "HOT" 764. If the door is left open for a prolonged period of time or the oven is left on for a prolonged period of time, the observer 700 may state "ALERT" 756 and notify the appropriate people via notification or other methods. Various sate machines may be used with a refrigerator, including for example those shown in at least FIG. 8C.

Additional examples of two-state machine states and transitions for different appliances are provided in Table 1.

Figure 9A:
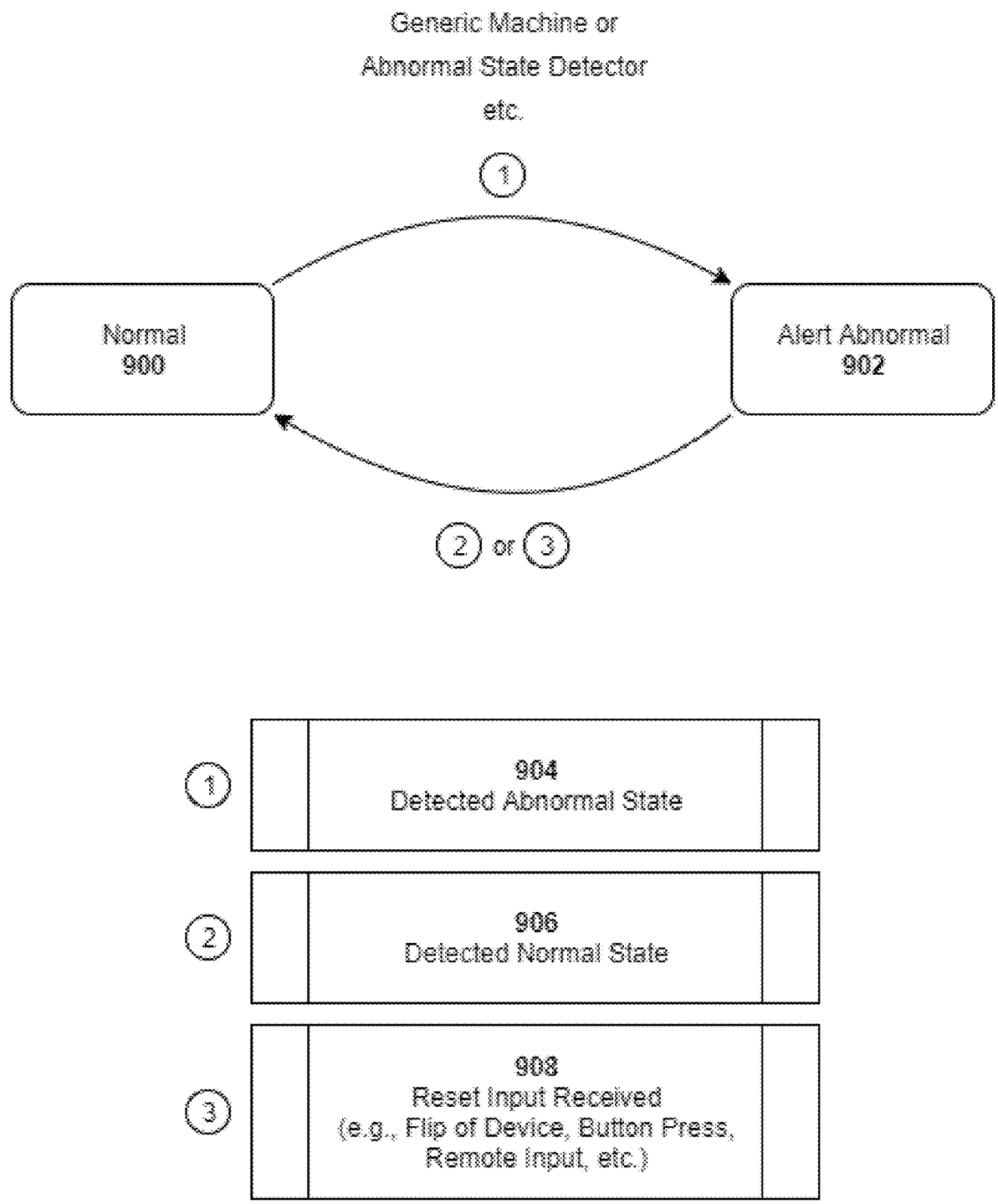
FIG. 9A depicts an abnormal state detector (or generic machine) state diagram.

With reference to FIG. 9A, an exemplary abnormal state detector (or generic machine) state diagram is depicted. An abnormal state detector may be used with an observer 100 in conjunction with any person, machine, appliance, object, etc. At 900, the state is "Normal." See also Table 3 [Normal] column. If an abnormal condition is detected while in a "Normal" state, the state is updated via transition 904 to the "Alert" state 902. See also Table 3 "->Alert" column. At 902, the state is "Alert" and an appropriate action is taken. See also Table 3 "[Alert]" column. While in the "Alert" state, if a normal condition is detected (optionally for a threshold period of time), or if there is a reset input to the observer, then the state is updated via transition 906 to the "Normal" state. See also Table 3 "->Normal" column. A reset input may also trigger transition 908 from the "Alert" state 902 to the "Normal" state 900. Additional examples of states and transitions for various observed items are provided in Tables 3.1 and 3.2.

Figure 9B:
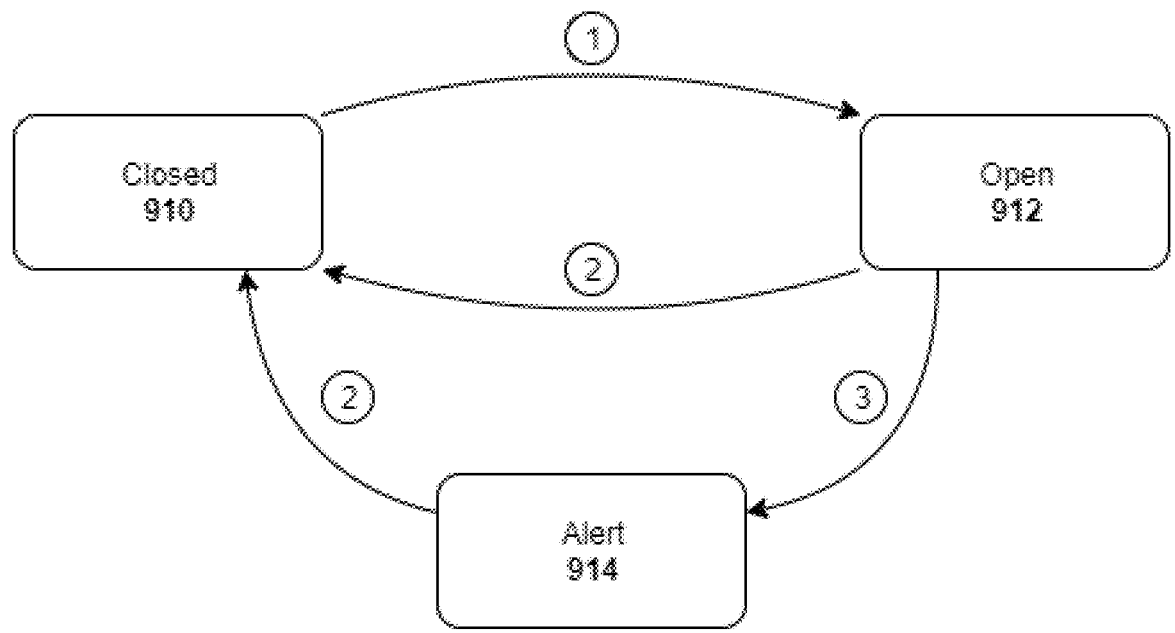
FIG. 9B depicts an openable machine (or neglectable machine) state diagram.

With reference to FIG. 9B, an exemplary openable machine (or neglectable machine) state diagram is depicted.

An openable machine state machine may be used with an observer 100 in conjunction with any person, machine, appliance, object, etc. but it is particularly suited for machines that are to be utilized when in the proximity of a person. At 910, the state is "Closed." See also Table 4 [Normal] column. If it is detected that the machine is opened, the state is updated via transition 916 to the "Open" state 912. For example, it is detected that a user opened a door to a refrigerator, garage, or other device. See also Table 4 "->Open" column. At 912, the state is "Open." If a it is detected that the machine is closed, the state is updated via transition 918 to the "Closed" state 910. See also Table 4 "->Normal" column. If an abnormal, neglected, or alert condition is detected while in an "Open" state 912, the state is updated via transition 911 to the "Alert" state 914. See also Table 4 "->Alert" column. At 914, the state is "Alert." In the alert state, the observer 100 causes an appropriate action to be taken. See also Table 4 "[Alert]" column. If it is detected that the machine has been placed back into a closed condition (e.g., the user closing the door to the refrigerator, garage, or other device, etc.), the state is updated to the "Closed" state via transition 918. Additional examples of states and transitions for various observed items are provided in Tables 4.1 and 4.2.

Figure 9C:
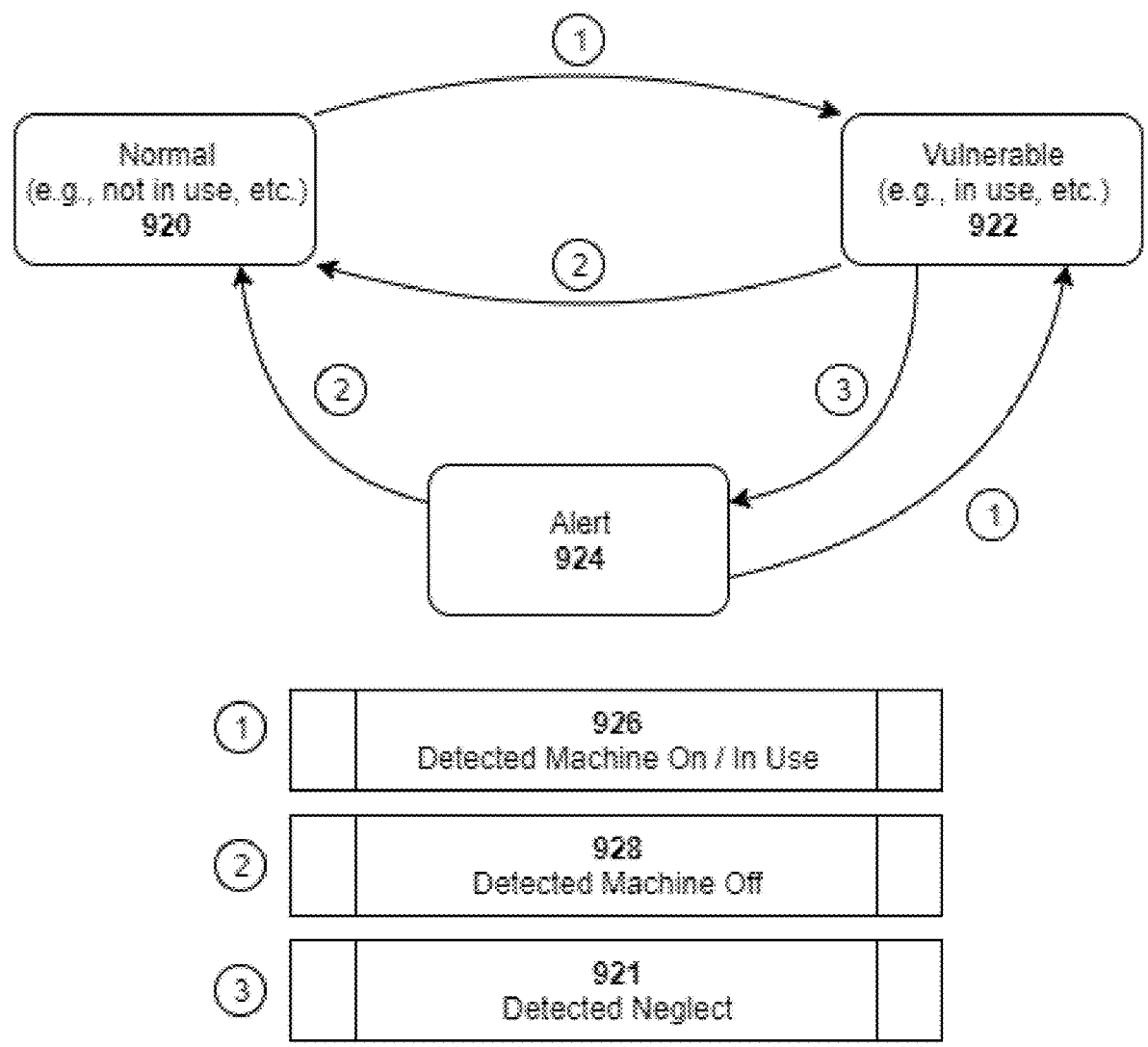
FIG. 9C depicts a neglectable machine (or openable machine) state diagram.

With reference to FIG. 9C, an exemplary neglectable machine (or openable machine) state diagram is depicted. A neglectable machine state machine may be used with an observer 100 in conjunction with any person, machine, appliance, object, etc. but it is particularly suited for machines that are to be utilized when in the proximity of a person. At 920, the state is "Normal." See also Table 4 [Normal] column. If a vulnerable condition (i.e., a condition that should only occur when the machine is supervised) is detected while in a "Normal" state 920, the state is updated via transition 926 to the "Vulnerable" state 922. For example, it is detected that a user turned on a neglectable machine. See also Table 4 "->Vulnerable" column. At 922, the state is "Vulnerable." If a normal condition is detected when in the vulnerable state (e.g., the user turning off the machine), the state is updated via transition 928 to the "Normal" state 920. See also Table 4 "->Normal" column. If an abnormal or neglected condition is detected while in a "Vulnerable" state 922, the state is updated via transition 921 to the "Alert" state 924. See also Table 4 "->Alert" column. At 924, the state is "Alert." In the "Alert" state 924, the observer 100 causes an appropriate action to be taken. See also Table 4 "[Alert]" column. If it is detected that a user is no longer neglecting the machine, the stat is updated to "Vulnerable" 922 via transition 926. If it is detected that the machine has been placed back into a normal condition (e.g., the user turning off the machine), the state is updated to the "Normal" state 920 via transition 928. Additional examples of states and transitions for various observed items are provided in Tables 4.1 and 4.2.

Figure 9D:
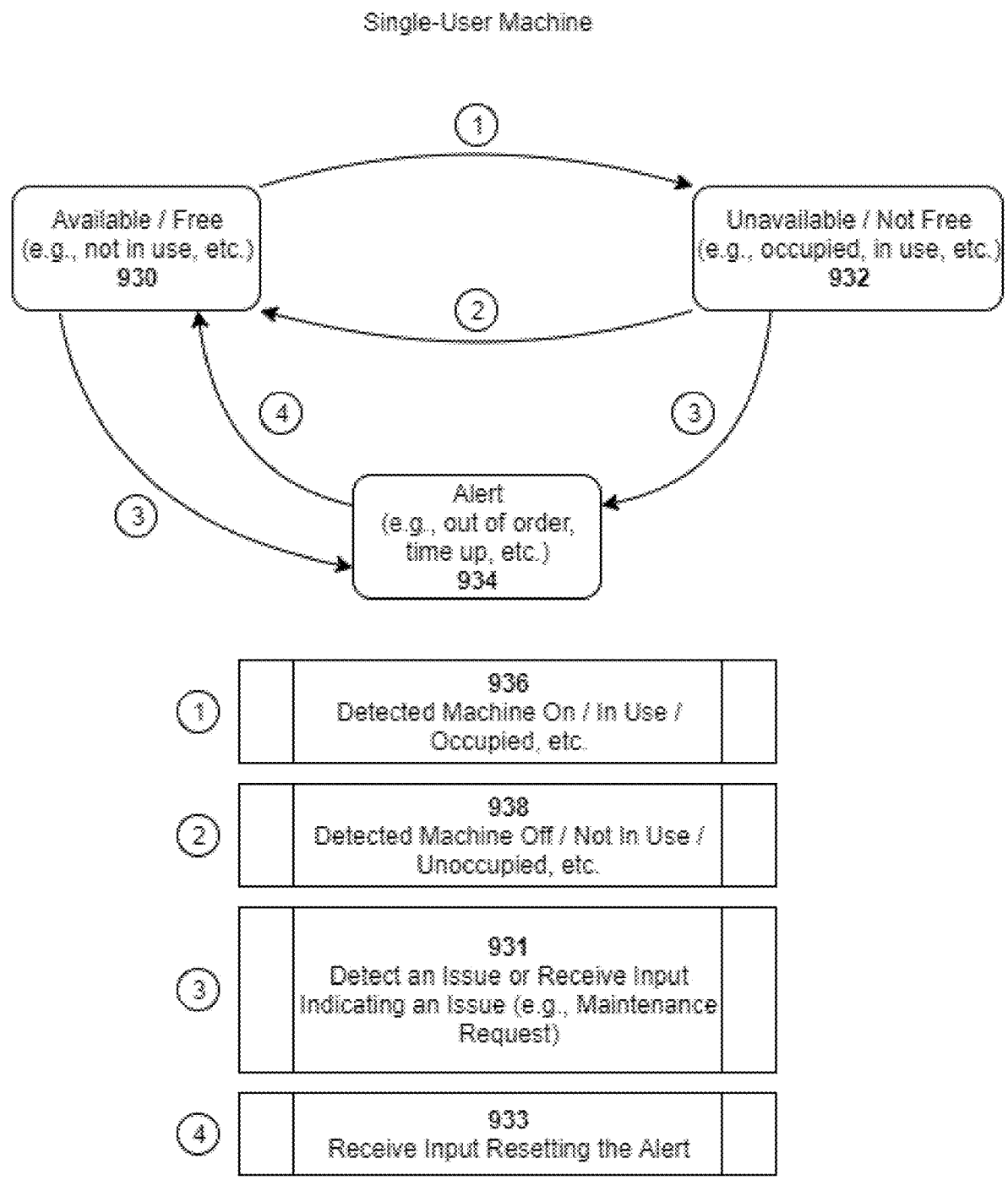
FIG. 9D depicts a single-user machine state diagram.

With reference to FIG. 9D, an exemplary single-user machine state diagram is depicted. A single-user machine state machine may be used with an observer 100 in conjunction with any person, machine, appliance, object, etc. but it is particularly suited for machines that are to be utilized only by a single person or group of people such as a room, parking spot, or seat(s). At 930, the state is "Available." See also Table 5 [Available] column. If it is detected that the machine has become occupied while in an "Available" state 930, the state is updated via transition 936 to the "In Use" state 932. See also Table 5 "->In Use" column. If an abnormal condition is detected or flagged while in an "Available" state 930, the state is updated via transition 931 to the "Alert" state 934. See also Table 5 "->Alert" column. At 932, the state is "In Use." If it is detected that the machine has become free/unoccupied while in an "In Use" state 932, the state is updated via transition 938 to the "Available" state 930. See also Table 5 "->Available" column. If an abnormal condition is detected or flagged while in an "In Use" state 932, the state is updated via transition 931 to the "Alert" state 934. See also Table 5 "->Alert" column. At 934, the state is "Alert." In the "Alert" state 934, the observer 100 causes an appropriate action to be taken. See also Table 5 "[Alert]" column. If it is detected that the machine has been placed back into a normal condition or if the state is reset, the state is updated to the "Available" state 930 via transition 933. Additional examples of states and transitions for various observed items are provided in Tables 5.1 and 5.2.

Figure 9E:
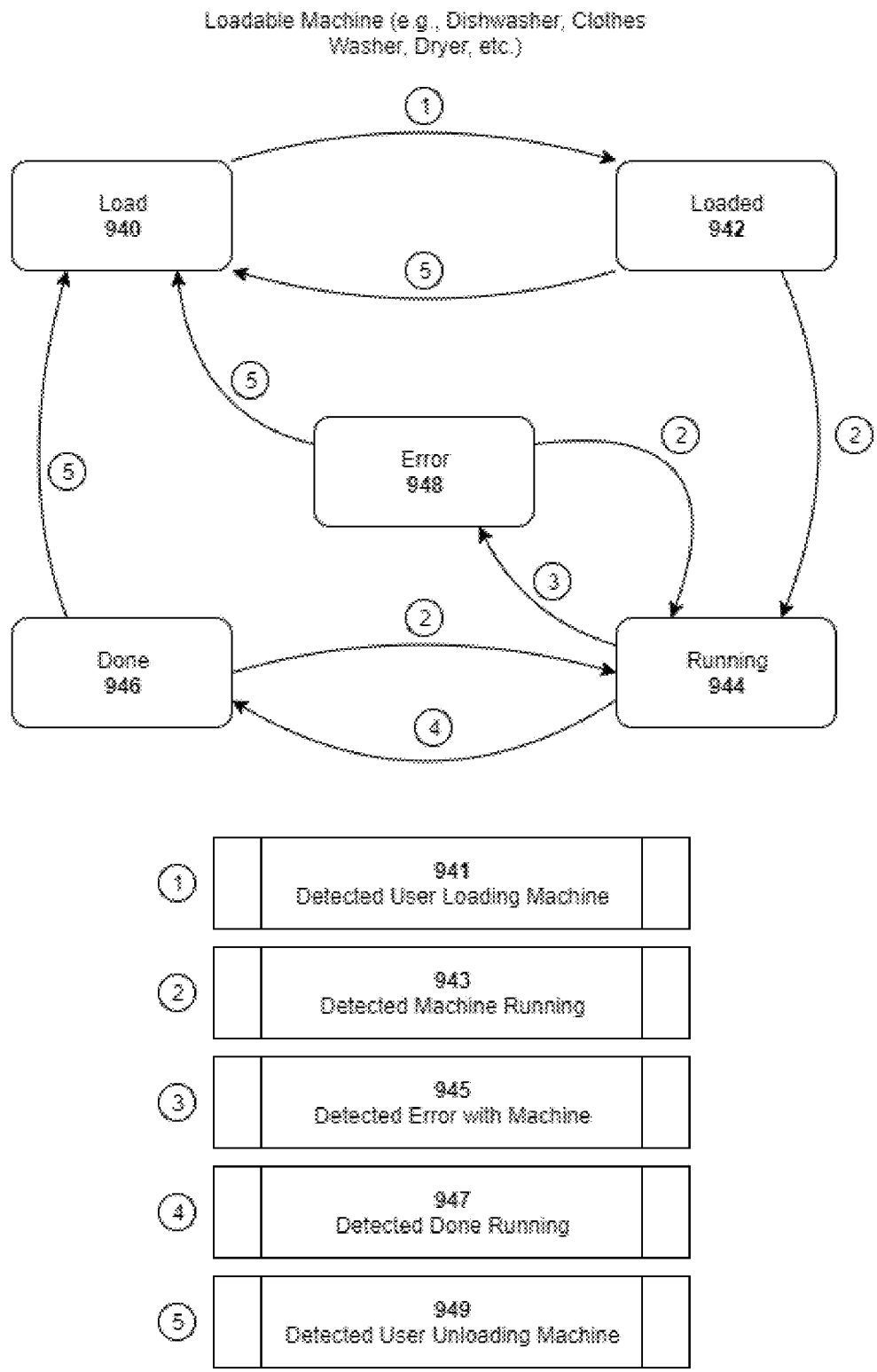
FIG. 9E depicts a loadable machine state diagram.

With reference to FIG. 9E, an exemplary loadable machine state diagram is depicted. A loadable machine state machine may be used with an observer 100 in conjunction with any person, machine, appliance, object, etc. but it is particularly suited for machines that are loaded, run and then must be unloaded such as a dishwasher, washing machine, or dryer. At 940, the state is "Load" or "Load." See also Table 6 [Load] column. If it is detected that the machine is being loaded by a user, the state is updated via transition 941 to the "Loaded" state 942. See also Table 6 "->Loaded" column. At 942, the state is "Loaded." If it is detected that the machine has started to run, the state is updated via transition 943 to the "Running" state 944. See also Table 6 "->Running" column. If it is detected that the machine is being unloaded by a user, the state is updated via transition 949 to the "Load" state 940. See also Table 6 "->Ready to Load" column. At 944, the state is "Running." If it is detected that the machine has finished running, the state is updated via transition 947 to the "Unload" state 946. See also Table 6 "->Ready to Unload" column. If an abnormal condition is detected or flagged while in an "Running" state, the state is updated via transition 945 to the "Alert" state. See also Table 6 "->Alert" column. At 948, the state is "Error" or "Alert." In the "Alert" state 948, the observer 100 causes an appropriate action to be taken. See also Table 6 "[Alert]" column. If it is detected that the machine has started to run, the state is updated via transition 943 to the "Running" state 944. See also Table 6 "->Running" column. If it is detected that the machine is being unloaded by a user, the state is updated via transition 949 to the "Load" state 940. See also Table 6 "->Ready to Load" column. At 946, the state is "Done" or "Unload." If it is detected that the machine has started to run, the state is updated via transition 943 to the "Running" state. See also Table 6 "->Running" column. If it is detected that the machine is being unloaded by a user, the state is updated via transition 949 to the "Load" state 940. See also Table 6 "->Ready to Load" column. Additional examples of states and transitions for various observed items are provided in Tables 6.1 and 6.2.

Figure 9F:
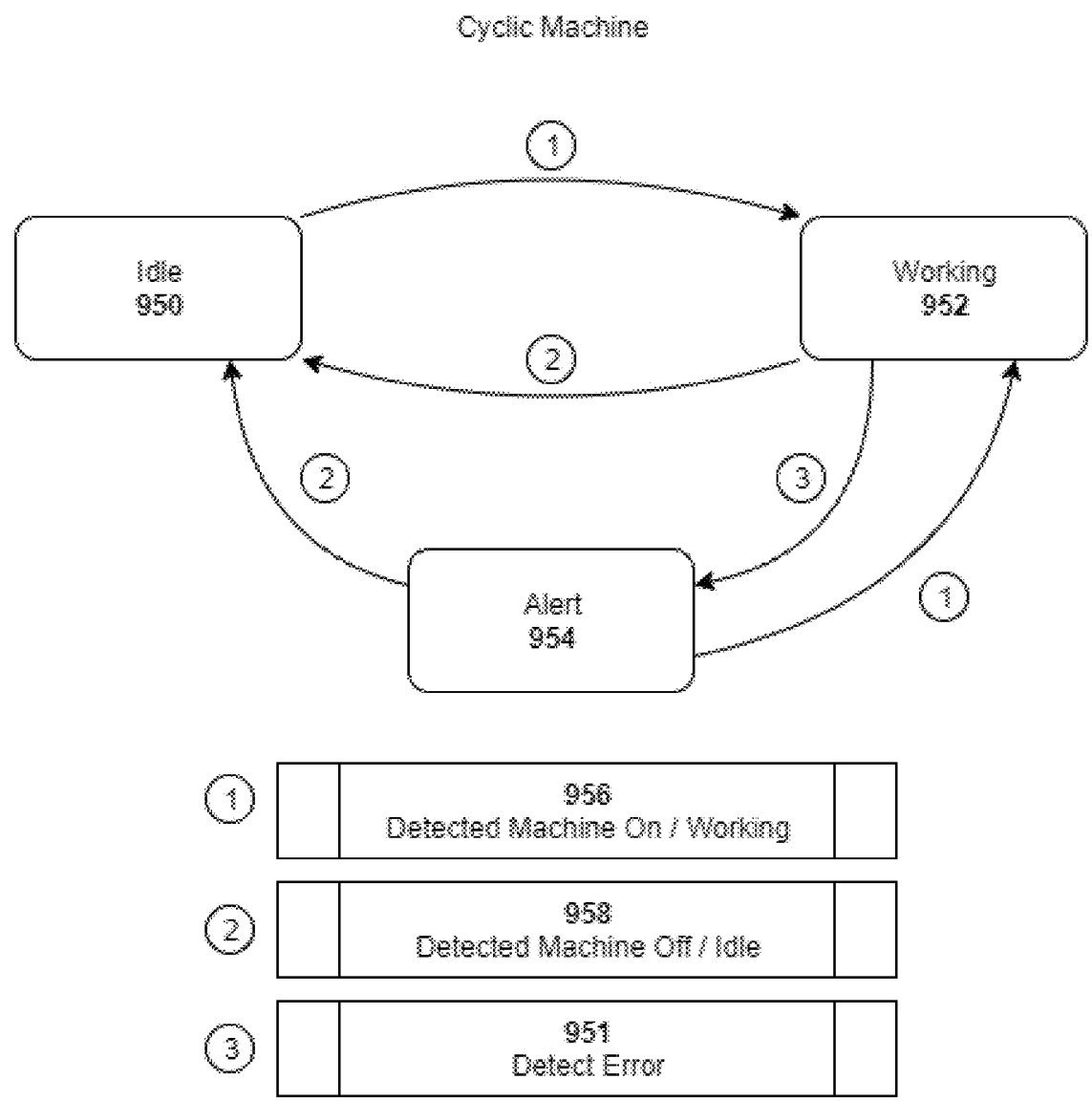
FIG. 9F depicts a cyclic machine state diagram.

With reference to FIG. 9F, an exemplary cyclic machine state diagram is depicted. A cyclic machine state machine may be used with an observer 100 in conjunction with any person, machine, appliance, object, etc. but it is particularly suited for machines that are to be monitored to ensure that they are operating efficiently. At 950, the state is "Idle." See also Table 7 [Idle] column. If it is detected that the machine has begun working, the state is updated via transition 956 to the "Working" state 952. At 952, the state is "Working." See also Table 7 [Working] column. If it is detected that the machine has completed a task and is idle again, the state is updated via transition 958 to the "Idle" state. See also Table 7 "->Idle" column. If an abnormal condition is detected while in a "Working" state, the state is updated via transition 951 to the "Alert" state 954. See also Table 7 "->Alert" column. For example, a cycle is taking longer than normal or some other event occurs that is not typical. At 954, the state is "Alert." See also Table 7 [Alert] column. In the "Alert" state 954, the observer 100 causes an appropriate action to be taken. See also Table 7 "[Alert]" column. If it is detected that the machine has begun working again, the state is updated via transition 956 to the "Working" state 952. If it is detected that the machine has completed a task and is idle again, the state is updated via transition 958 to the "Idle" state 950. See also Table 7 "->Idle" column. Additional examples of states and transitions for various observed items are provided in Tables 7.1 and 7.2.

There are several examples of applications of the above types of state machines discussed in Tables 3-7. For example, at least the following different types of machines, objects, and people can be observed in a home or office environment:

Mailbox (e.g., Loadable Machine)
Garage Door (e.g., Neglectable Machine)
Oven (e.g., Neglectable Machine)
  May use IR or visual light
  Example States:
    Off
    On/Preheating
    On/Ready to Use
    On/Cooking
    On/Empty
    On/Alert (user forgot something was cooking, left on while empty)
Stove (e.g., Neglectable Machine)
  May use IR or visual light
  Each individual burner may be monitored, or the whole stove can be treated as one appliance.
  Example States:
    Off
    On/Preheating
    On/Ready to Use
    On/Cooking
    On/Empty
    On/Alert (user forgot something was cooking, left on while empty)
Refrigerator (e.g., Neglectable Machine)
  Example States:
    Closed
    Open/Loading
    Open/Alert (open and user forgot to close for an extended period of time)
Sink (e.g., Neglectable Machine)
Coffee Maker (e.g., Loadable Machine)
Blender (e.g., Loadable Machine)
Microwave (e.g., Loadable Machine)
Dish Washer (e.g., Loadable Machine)
Washing Machine (e.g., Loadable Machine)
Dryer (e.g., Loadable Machine)
Hot Water Heater (e.g., Generic Machine)
Sink (e.g., Neglectable Machine)
Curling Iron (e.g., Neglectable Machine)
  When neglected, alert and turn off power if the observer is interfaced with an actuator for the curling iron.
Bathroom Generally (e.g., Single User Machine)—To maintain privacy, monitors door—user entering and exiting. However, in instances where privacy is not a concern could monitor individual fixtures in the bathroom.
Toilet (e.g., Single User Machine)
Shower (e.g., Single User Machine)
TV (e.g., Neglectable Machine)
  Example States
    Off
    On/Someone Watching
    On/Nobody Watching
Lights (e.g., Neglectable Machine)
  Example States
    Off
    On/People There
    On/People Away
Saw (e.g., Generic Machine)
Drill press (e.g., Generic Machine)
Other In addition, in a retail or industrial application, the following objects, machines and people may be observed:

Queue management (e.g., Single User Machine, Cyclic Machine).
  Detect that a register is available/cashier is idle.
  Use image processing on front of queue to vocalize description of next customer and instruction to go to the available register.
    "Man in green shirt, please proceed to register number 5."
Employee metrics
  Register cashier state monitoring (e.g., Cyclic Machine)
    Example States:
      Ready for Customer
      Serving Customer
      Abnormal State (taking too long, customer appearing to have issue, etc.)
Security Systems
  Recognizing "stealing" or opening product in store. (e.g., Abnormal State Detector).
Escalator (e.g., Neglectable Machine)
Parking Spaces (e.g., Single User Machine)
Seating (e.g., Single User Machine)
Dispenser (e.g., Generic Machine—Abnormal when out of soap.)
  Paper Towel Dispenser (e.g., Generic Machine—Abnormal when out of soap.)
  Soap Dispenser (e.g., Generic Machine—Abnormal when out of soap.)

In addition to the above, more complex state machines and combinations of state machines may be created to represent and track observed objects.

II.2 Hierarchical (Nested) State Machines

Hierarchical or nested state machines may also be implemented.

Figure 9G:
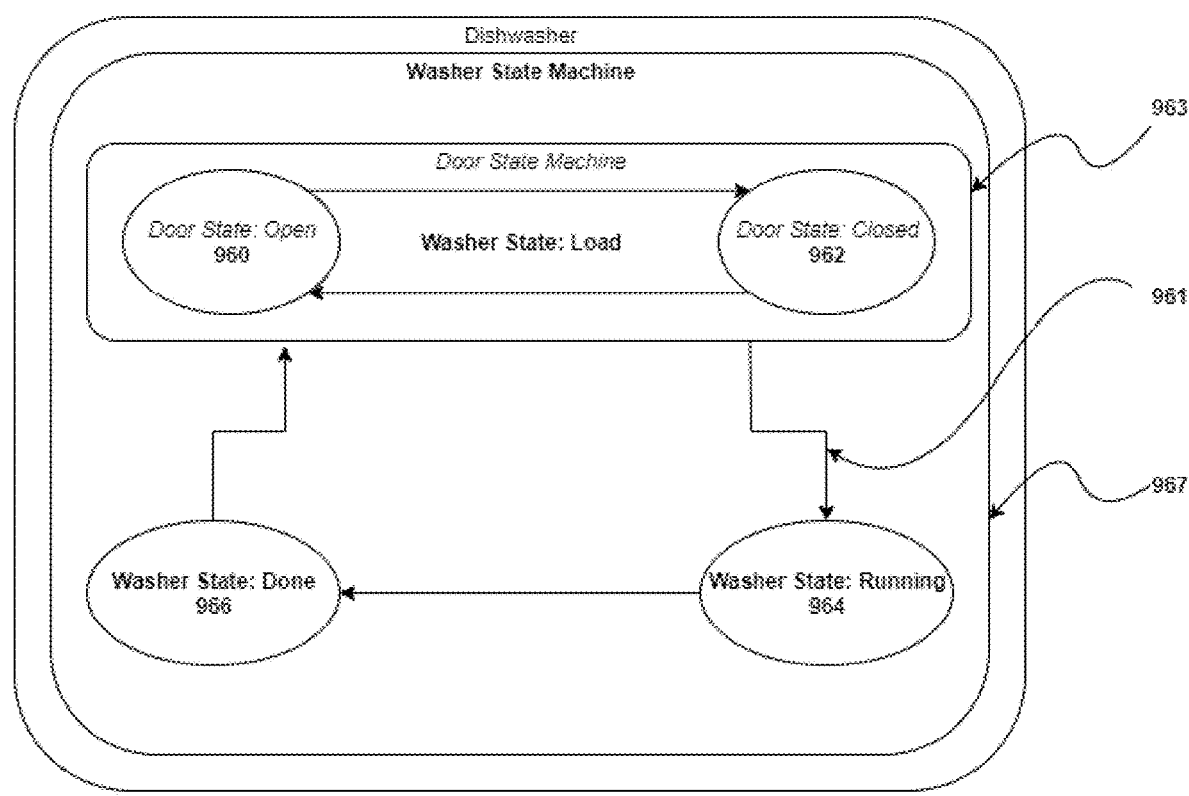
FIG. 9G depicts an exemplary nested state machine diagram for an observed dishwasher.

For purposes of illustration and without limitation, with reference to FIG. 9G, an observed dishwasher may be associated with a hierarchal (nested) state machine 967. The dishwasher may be associated with a cyclic machine (or similar) state machine, and the "load" state 963 may further have a two-state (or similar) state machine that tracks whether the dishwasher door is open 960 or closed 962 nested within. The transition 961 from the "Load" state 963 to the "Running" state 964 may also only be allowed to trigger when the two-state machine for the "Load" state 963 is in the "Closed" state 962.

II.3 Parallel State Machines

Parallel state machines may be implemented. For example, a single observer may track multiple observed objects in parallel, or multiple different states associated with a single observed object.

Figure 9H:
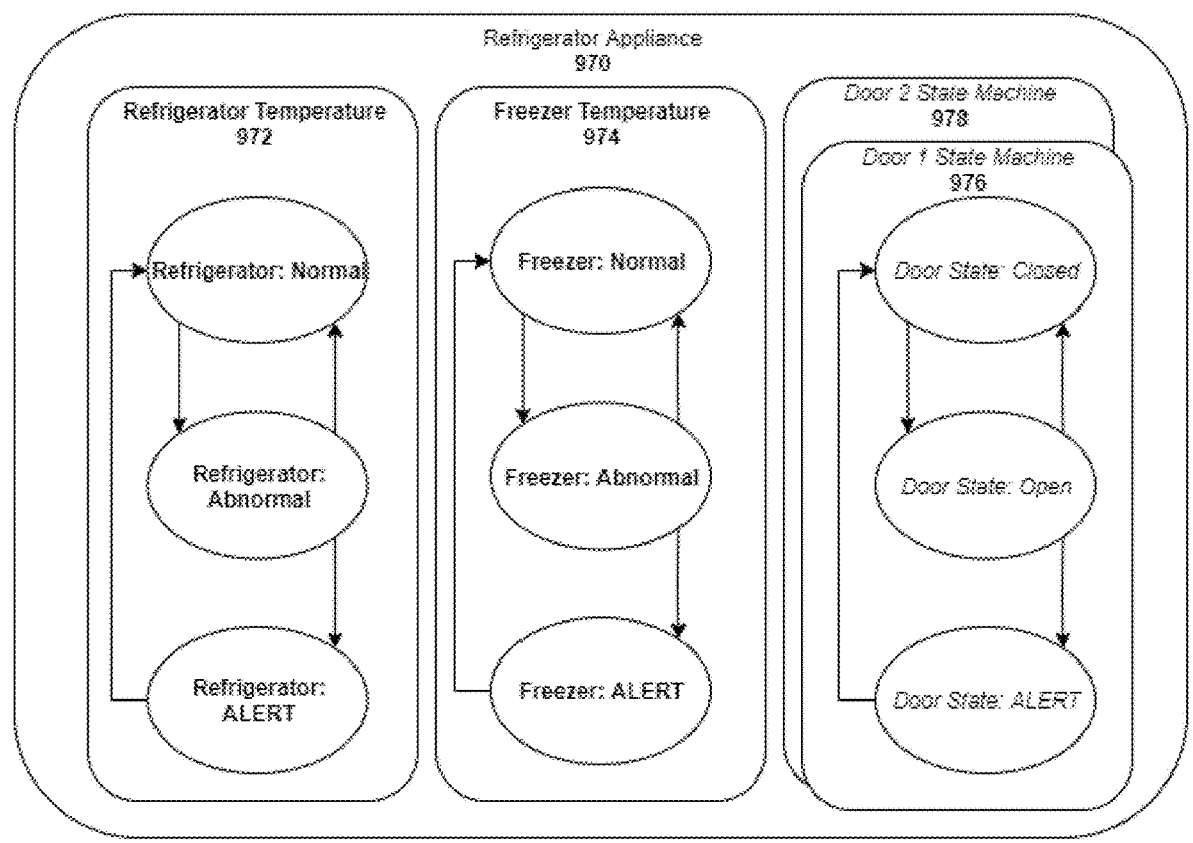
FIG. 9H depicts an exemplary parallel state machine diagram for an observed refrigerator.

For purposes of illustration and without limitation, with reference to FIG. 9H, an observed refrigerator 970 may be associated with multiple parallel state machines such as: (1) Refrigerator Temperature: Abnormal State Detector 972, (2) Refrigerator Door: Neglectable Machine 976, (3) Freezer Temperature: Abnormal State Detector 974 and/or (4) Freezer Door: Neglectable Machine 978. The refrigerator and freezer temperature abnormal state detectors may be configured to monitor the temperature of the respective portions of the appliance using any methods discussed herein or otherwise apparent. For example, sensors in the freezer and refrigerator portions of the appliance, sensors mounted on the exterior of the freezer and/or refrigerator doors of the appliance, a thermal camera trained on the appliance with knowledge of what portion of the thermal image corresponds to each compartment of the appliance, etc. may be used in conjunction with the freezer and refrigerator abnormal state detectors. Similarly, the state of the doors may be tracked using motion sensors or video and used in conjunction with the freezer and refrigerator door neglectable machines.

As another example, a stacked washer and dryer may be observed in a similar manner utilizing two cyclic machine state machine models (or similar).

II.4 History States

A memory may also be associated with the state machine in the form of, for example, a history state. The history state may be utilized to story any type of information.

For example, for purposes of illustration and without limitation, a history state that keeps a count of the number of times a machine has run may be utilized to determine when new consumables (e.g., dishwasher tablets, etc.) should be ordered. Upon reaching a certain count, this history state may trigger an alert to be sent. If it is determined, via a linked purchase history or API, that new consumables have been obtained, the history state may be reset. Alternatively, the history state may be reset after the notification is sent.

II.5 Situational State Machines

In various forms of the invention, different state machines may be implemented based on varying conditions. For example, a state machine may always be active; a state machine may only be active if a condition is met (e.g., X==Y, etc.); and/or a state machine may only be active if another state machine state is in a specific state.

For purposes of illustration and without limitation, if a user is stopped at a stop light an observer in an automobile may observe the stop lights. A state machine associated with a stop light may be activated to determine when to start an internal combustion engine or get the electric motor ready for a green light.

As another example, in forms of the invention implementing a pan/tilt camera sensor as part of an observer, the observer may keep track of regions to which to apply rules and state machines to based on orientation of camera view. A pan/tilt camera (or any other camera capable of having different orientations or views) may be configured to observe different objects at different azimuth and elevation values relative to the camera. Based on the object in view of the camera (e.g., as determined by the current approximate camera azimuth and elevation, image recognition, etc.) the system may apply a different state machine to the images received from the camera.

For example, at azimuth 0 elevation 0, the pan/tilt camera observer 100 may observe a refrigerator. At azimuth 90 elevation 0 the pan/tilt camera may observe an oven. At azimuth 90 elevation 45, the pan/tilt camera may observe a kitchen light fixture. The pan/tilt camera observer may vary its view by changing azimuth and elevation as to scan the room. When approximately at the azimuth and elevation values for the various machines and appliances, it may supply the images and sound received via the camera to a state machine assigned to the appliance within the pan/tilt camera's view. For example, when at azimuth 90 and elevation 0, the oven state machine (e.g., a neglectable machine, etc.) state machine may be consulted and/or updated based on the new images and video received by the pan/tilt camera.

In various forms of the invention, state machines may be activated and deactivated based on a location-based state machine lookup. For example, while out in the world a mobile device may determine its location and lookup state machines that are associated with nearby physical observed objects. The state machine may be located based on any one or combination of:

location altitude image recognition of an imaged object category selection from list ownership and permissions etc.

For example, a user may want to know about a state machine associated with a particular hospital room door. The location of the phone in the hospital may be determined based on latitude and longitude, a spatial depth map, Wi-Fi location, or other means. The state machine server may be querieid with this information to return the status of the hospital room(s) near the user.

Other examples include:

State machine tracks if a nurse has been into the room in the last hour, if not an alert is triggered (neglectable machine);

Can pull up a list based on location (and optionally altitude) to get the state machine associated with nearby machines, and query the status of the machine;

In some forms of the invention state machines and observer devices can be grouped into projects. These projects' can be tagged with location or other information so that they can be accessed by third-party mobile devices that can look up these state machines/projects. Projects may have observers associated with them and the mobile device may simply request state information from, or otherwise interacts or manages, the project/state machines.

In some forms of the invention, mobile devices may also be able to turn into an observer for the state machine based on a location-based lookup.

Example, different autonomous cars being an observer for a location-based state machine at different times.

Example, different drones being an observer for a location-based state machine at different times.

II.6 All Possible State Machine Configurations

Any possible combination, permutation, nesting, parallel or other form of state machines may be crafted and associated with any type of observer and for any observed object. See Source Tables 8 and 9.

III. Classifiers

State machine states and/or transitions may be determined or triggered with a classifier that acts on data that is collected from the observer 100. Classifiers take information and assign a classification to the information based on shared characteristics or features of the information. The information, once classified, can be the basis for causing a transition from one state to another state of a state machine.

III.1 Non-Neural Network Classifiers

In many instances, programming logic can be used to classify information in order to determine if a transition from one state to another state should occur. For example, sensor data can be read and compared to threshold values. As another example, functions can be performed on a collection of sensor data (e.g. a Fast Fourier Transform on a time series of sensor data, etc.) and the result, or several results, may be used in order to classify the information or activity.

For purposes of illustration and without limitation, with reference to FIG. 5A, some example sensor- or accelerometer-based observer device data for a loadable machine (e.g., dishwasher, washer, dryer, etc.) is shown. With respect to graph 502, a |Vibration| value is graphed over time. The |Vibration| value may be based on at least one axis of an accelerometer and a signal processing algorithm such as a Fast Fourier Transform. With respect to graph 504, a |Temp.| value is graphed over time. The |Temp.| value may be based on at least a temperature sensor and optionally an algorithm to compute a temperature value or smooth a temperature reading value over time. With respect to graph 506, a |Delta Gyro/Mag.| value is graphed over time. This value may be based on at least one axis of a gyroscope and/or magnetometer and optionally an algorithm to compute a temperature value or smooth a temperature reading value over time.

With respect to the example data graphs 502, 504, and 506, time period 508 represents a period of time where the door of the loadable machine is observed to be in an open orientation as indicated by "Device Orientation 2", the relatively low value of |Vibration|, the relatively low value for |Temp.|, and/or the spike in |Delta Gyro/Mag| at the beginning and end of the period. From this data, the observer may conclude that the observed appliance is "Ready to Load" or that the door is open.

With respect to the example data graphs 502, 504, and 506, time period 510 represents a period of time where the loadable machine is observed to be in a running state indicated by "Device Orientation 1", the increased value of |Vibration|, the increased value for |Temp.|, and/or the spike in |Delta Gyro/Mag| at the beginning of the period. From this data, the observer may conclude that the observed appliance is "Running."

With respect to the example data graphs 502, 504, and 506, time period 512 represents a period of time where the loadable machine is observed to be done running and in a "clean" or "ready to unload" state indicated by "Device Orientation 1", the decreased value of |Vibration|, the decreased value for |Temp.|, and/or the spike in |Delta Gyro/Mag| at the end of the period. From this data, the observer may conclude that the observed appliance is "Done."

With respect to the example data graphs 502, 504, and 506, time period 514 represents a period of time where the door of the loadable machine is observed to be in an open orientation as indicated by "Device Orientation 2", the relatively low value of |Vibration|, the relatively low value for |Temp.|, and/or the spike in |Delta Gyro/Mag| at the beginning of the period. From this data, the observer may conclude that the observed appliance is "Ready to Unload" or that the door is open.

Figure 5C:
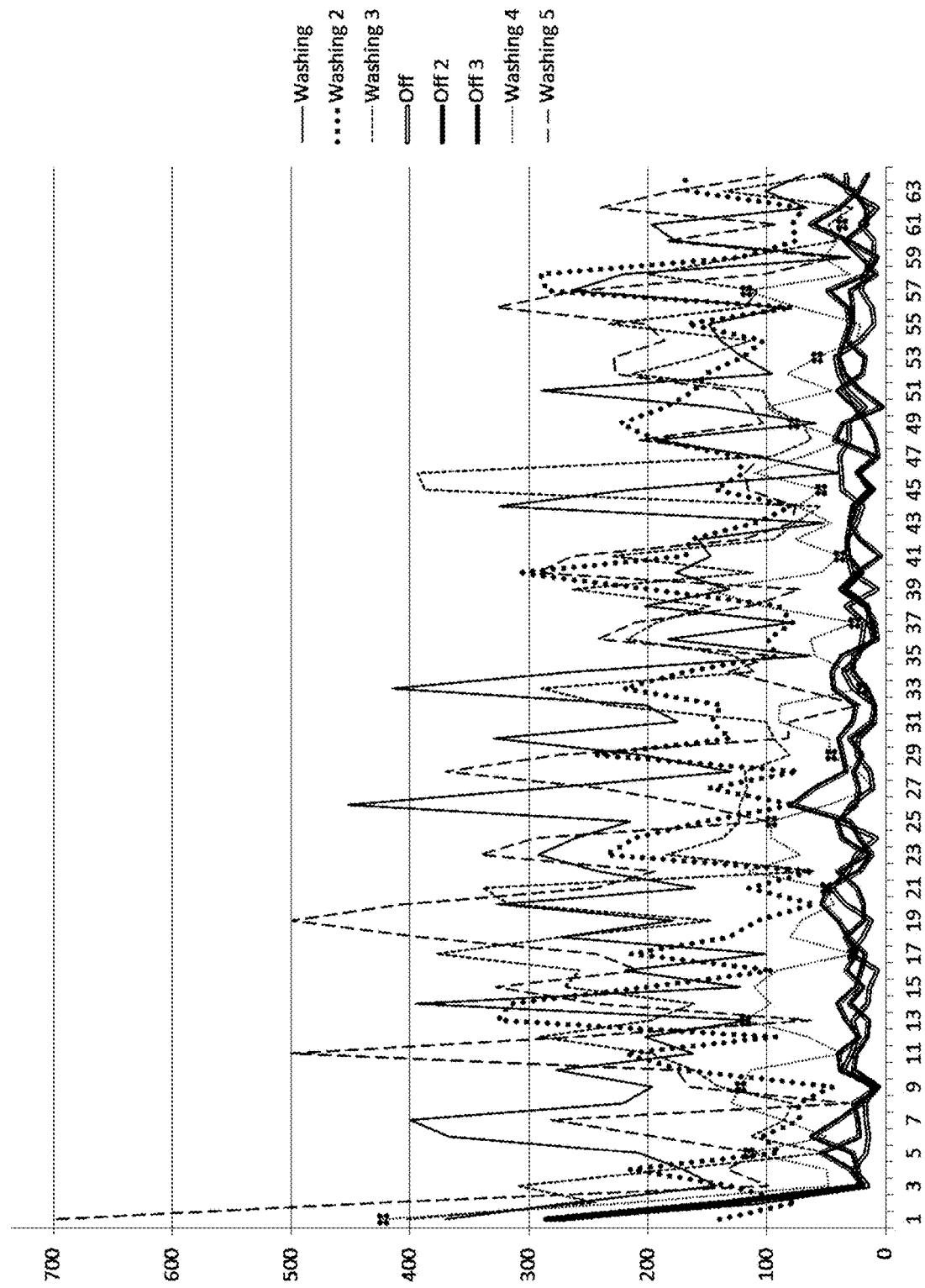
FIG. 5C depicts a graph of the data presented in FIG. 5B.

With respect to FIG. 5B, experimental Fast Fourier Transform data collected using an accelerometer for five dishwasher washing cycles and three dishwashers off cycles is shown. The columns represent different data sets, and the rows represent the output of the Fast Fourier Transform. The "Average" row at the bottom is the average of the values produced by the Fast Fourier Transform. Values obtained for a dishwasher in the washing state are shown in Cols B, C, D, H, and I. Values obtained for a dishwasher in the off state are shown in Cols E, F, and G. In this particular example, the "Average" values for the "washing" states are about: 197, 147, 166, 74, and 201; the "Average" values for the "off" states are about: 28, 34, and 31. While these values will be different for different variations of the observer hardware and choices made in implementing the FFT algorithm, the FFT Average for off cycles is typically much lower than for washing cycles. From this information, threshold values for classifying whether a machine is "Running" or "Not Running" can be determined for a particular implementation or form of the observer device. FIG. 5C is the FIG. 5B data in a line chart format. This method can be implemented on any hardware with accelerometer and processor such as ESP32, RPi, etc.

For purposes of illustration and without limitation, with reference to FIG. 6A, a flow chart for a process for taking sensor measurements, processing the sensor measurements, and determining whether a state change should occur is depicted.

At act 620, a series of numerous measurements are taken over a short period of time. For example, perhaps 100 measurements of the Z axis of the accelerometer over the course of a second are taken and recorded. This information is then processed using a signal processing algorithm such as a Fast Fourier Transform (FFT). A result, such as the average value of the FFT output, may be obtained.

At act 622, the result is compared to a threshold value. If the result is less than the threshold value, the flowchart proceeds to act 624. If the result is greater than the threshold value, the flowchart proceeds to act 626. If the result is equal to the threshold value, the system can proceed to one or the other state depending on the particular implementation.

At act 624, it is determined that it is unlikely that the current state is X (e.g., "running," etc.) or likely that the current state is Y (e.g., "done," etc.) after comparing the result to the threshold. At act 626, it is determined that it is likely that the current state is X (e.g., "running," etc.) or unlikely that the current state is Y (e.g., "done," etc.) after comparing the result to the threshold. The specific state determination may be dependent on the type of machine being observed and the current state of the machine. At act 628, the observation is added to a measurement history. At act 630, if the past M results (e.g., 2 results) indicate that a state transition should occur, then the state machine model is instructed to move to the appropriate state. At act 632, a delay is implemented, the microcontroller is instructed to go to deep sleep (e.g., to conserve battery power, etc.) and wake up after a period of time (e.g., 1 minute, etc.) before proceeding back to act 620. For purposes of further illustration and without limitation, at least one if not more possible implementations of a process as outlined above in FIG. 6A is provided as Source Tables 1, 2, 3, 4, 5, 6, 9, and 10.

III.2 Neural Network Classification

In various forms of the invention, neural networks can be used as classifiers in order to detect states, or state transition trigger events. The neural networks can be used on their own, or in conjunction with other programming techniques such as the above described signal processing techniques or algorithms, and/or finite state machines in order to track the state of an observed machine, and trigger state transitions between tracked states.

For purposes of illustration and without limitation, with reference to FIG. 6B, input data 604 ins fed into neural network classifier 602, and a likely state 606 probability is output. This output value can be used on its own to determine a state or trigger event, or the output value can be used as the "result" (or the basis of a value that is turned into a "result", etc.) that is fed into the act 622 comparison of FIG. 6A. Neural networks can be trained to classify information, with numerous different features, based on examples and tags. Data, such as the data illustrated in FIGS. 5A-C, may be utilized to train the neural network 602.

For purposes of further illustration and without limitation, at least one if not more possible implementations of a process as outlined above to train a neural network based on sensor data for a microcontroller is provided as Source Tables 11, 12 and 13.

Alternatively, other data types such as image data, depth information, point cloud information, thermal imaging information, sound data, accelerometer data, other sensor data, video data, or any other or combination of data may be utilized to train a neural network classifier.

Figure 10:
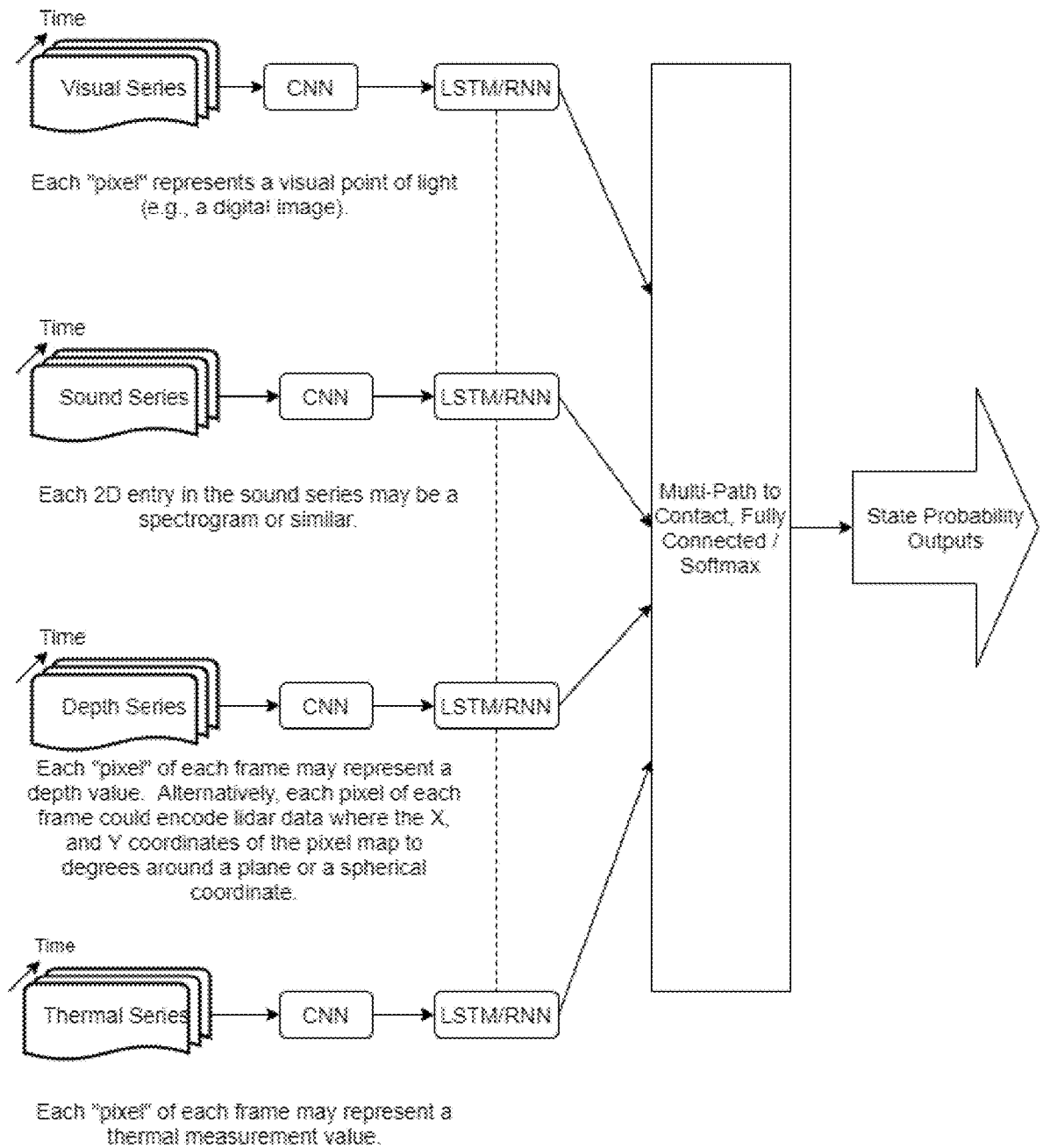
FIG. 10 depicts one possible example of a Neural Network (e.g., CNN LSTM Multi-Path, etc.) that may be used in various forms of the invention.

For example, various types of neural networks may be implemented in different forms of the invention. Depending on the type of data to be processed, different neural network designs, data sets, or pre-trained models may be used to construct a neural network from the following models and datasets, or the like:
Image Data
  Convolutional Neural Networks (CNNs)
  ImageNet
  MobileNet
  Inception
Red Green Blue Depth (RGB-D) Image Data
  RGB-D (Kinect) Object Dataset
PointCloud Data
  PointNet
Thermal Image Data
  ThermalNet
Sound Data
  Conversion of Sound Data to a Spectrogram and then processing with an imaged-based neural network.
Accelerometer Data
Video Data/Human Activity
  ResNet
  UCF 101—Action Recognition Data Set
  Continuous Video Classification
Other Datasets
Combinations of Above and/or Other Data Types Any of the neural network types can be utilized independently or in conjunction with one another; for example, as part of a multi-path neural network. For purposes of illustration and without limitation, with reference to FIG. 10, one possible example of a CNN LSTM Multi-Path Neural Network that may be used in various forms of the invention is depicted. Any other neural network design or topology may be utilized with the invention.

Figure 11:
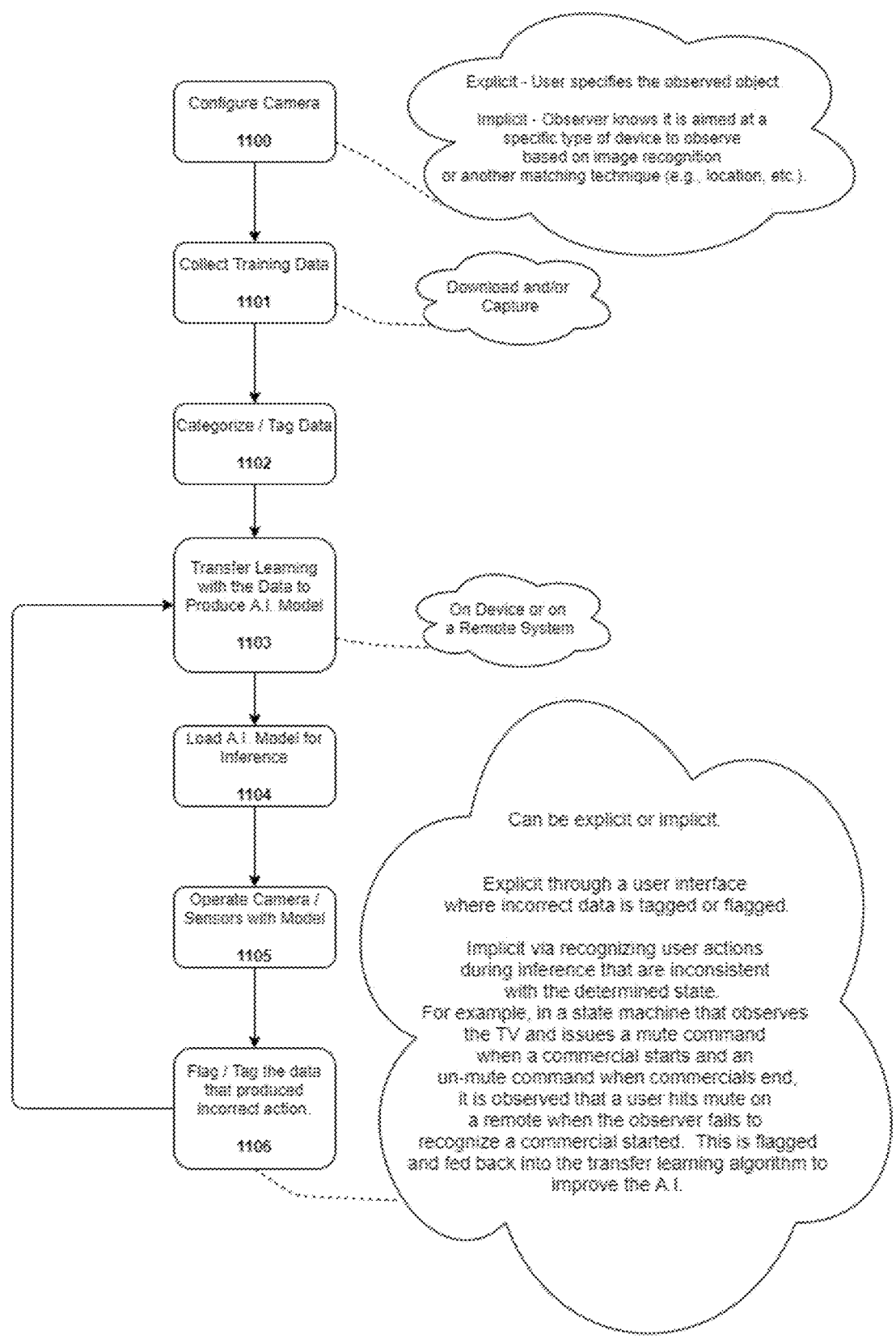
FIG. 11 depicts one possible process used in various forms of the invention for obtaining training data, training the neural network, operating the neural network and refining the neural network over time.

The neural network may be trained from scratch, or transfer learning techniques can be used to refine a pre-trained neural network. For purposes of illustration and without limitation, with reference to FIG. 11, one possible process used in various forms of the invention for obtaining training data, training the neural network, operating the neural network and refining the neural network over time is depicted. At act 1100, the camera or observer device is configured. At act 1101, training data is collected; it may be downloaded or captured from sensors and/or imaging devices. At act 1102, data is categorized and/or tagged. At act 1103, a neural network machine learning model is trained (optionally via transfer learning). At act 1104, the neural network machine learning model is loaded into an observer device. At act 1105, the model is used with new input information. At act 1106, input data that produces an incorrect action or output can be re-tagged or flagged. Then, using the corrected information, the process may re-start at act 1103 to improve the deep neural network model.

III.2.A Transfer Learning

It can be expensive and time consuming to train a neural network from scratch. Transfer learning allows pre-trained deep neural networks to be re-trained using significantly less data then would be needed to train the deep neural network from scratch. With transfer learning, the "knowledge" that is already contained within the deep neural network is transferred from the prior learning task to the current task. The two tasks are not disjoint, and as such whatever network parameters that model has learned through its prior extensive training may be leveraged without having to do expend time and resources performing that training again.

In various forms of the invention, pre-trained image recognition neural networks (e.g., ImageNet, etc.), or other types of neural networks, are used as the basis for a neural network and are re-trained via transfer learning and data collected by the observer device and tagged. This type of process may be used to economically crate a custom classifier that is able to be used as the basis to determine the state of a machine model, and/or a transition trigger event.

For purposes of further illustration and without limitation, at least one if not more possible implementations of a process to perform transfer learning on a neural network based on image data for a single board computer is provided as Source Tables 14, 15 and 16.

III.2.A.i A User Friendly Interface for Transfer Learning

In some forms of the invention, an interface (e.g., website, app, etc.) is provided that allows a user to upload data to tagged buckets or tagged data (e.g., text, picture, video, sound, point cloud data, a combination of different data types, other data types, etc.), and select an appropriate pre-trained classifier as a basis to perform transfer learning on to add the desired classifications. This can be used to generate a custom classifier economically and in a end-user-friendly manner. The available classifiers to train may be filtered based on the type of tagged data supplied by the user. The interface may be a website, application (desktop or mobile device). The interface may ask for the data and an associated tag (e.g., "loading appliance", "appliance running", "appliance error", "appliance done", "unloading appliance") or it may provide different "buckets" in which the data can be uploaded via drag-and-drop (e.g., drag images for classification 1 to area 1, for classification 2 to area 2, etc.). The user may be asked to provide state names for the different classifications. The website or application may provide a model file that the user can download, that the user can send to a specific observer (or group of observers) via a reference code or user ID and device ID, or an API endpoint that can be used to submit information and receive a classification or trigger event determination.

III.2.B Training a Sensor-Based Neural Network Classifier

For a particular machine condition that one desires to classify (e.g., "machine running normally," "machine running irregularly," "machine off," "machine door open," any state listed in any table or paragraph listed herein, etc.), data can be collected and tagged. This data can then be used to train or refine a neural network classifier.

1. Training Data Collection.

For purposes of illustration and without limitation, a microcontroller can be put into a data collection and tagging mode. Training data may be collected from a 3-axis accelerometer, 3-axis gyroscope, 3-axis magnetometer, or any combination thereof. The sensors may be sampled for a period of time (e.g., 1 second, etc.) to obtain numerous samples. The collected data can be (pre-)processed before further use to train a neural network. For example, a fast Fourier transform may be performed on any of the above data. As one example for purposes of illustration and without limitation, a fast Fourier transform may be performed on one axis of the 3-axis accelerometer. The total of the FFT components, the average of the FFT components, the maximum FFT component and the standard deviation of the FFT components may be obtained. Any or all of the above data may be recorded and tagged to associate the data with the known state of the appliance (e.g., running, idle, unloading, etc.) when the data was collected. This data collection and tagging process may be repeated any number of time for the same state (e.g., running, done, loading, etc.) in the same or different conditions, or may be repeated for different states under varying conditions. Source Table 11 provides example C source code that will produce a CSV file of training data from an accelerometer on an Arduino compatible microcontroller. The CSV file can be saved with a file name representing the state of the appliance during the data collection process (e.g., "running.csv," "done.csv," etc.)

2. Training a Neural Network.

The tagged data CSV is uploaded to a computer or network with sufficient processing power to train the model or may be trained on the observer 100 device if sufficient computing power is available. Source Table 12 for a Google Colab Python notebook that will take the training data discussed above and produce a neural network classifier C header file for use on the Arduino compatible microcontroller. Once the model is trained, then the trained neural network is then downloaded from the remote computer and may be used on a microcontroller.

3. Using the Trained Neural Network Model on a Microcontroller.

The downloaded neural network is loaded on the microcontroller, and then may be used to classify the sensor data for use with the state machine models. Source Table 13 provides example C source code that will classify newly observed accelerometer data into a state such as "running," "done," "unloading," etc. based on the neural network created from the training data.

4. Re-Training.

To the extent that additional data is collected, the neural network model from step 2. Above can be improved by re-training with additional data, or transfer learning with the additional collected and tagged data.

5. Sharing Trained Models.

For "internet of things" devices, this training data may be uploaded to a central repository of tagged information, so that all users of similar devices may benefit from the data as it is incorporated into trained models for similar devices.

III.2.C Training an Imaged-Based Neural Network Classifier with Mobile ImageNet and Transfer Learning Similarly to the above sensor-based example, for a particular machine condition that one desires to classify (e.g., "machine running normally," "machine running irregularly," "machine off," "machine door open," any state listed in any table or paragraph listed herein, etc.), image data can be collected and tagged. This data can then be used to train or refine a neural network classifier.

1. Training Data Collection.

For purposes of illustration and without limitation, a microcontroller or single board computer observer device can be put into a data collection and tagging mode. Training data may be collected from an imaging device such as a camera, other sensors or imaging devices, or any combination thereof. The camera may be used to take numerous pictures of the observed object for a known state in varying conditions. This data collection and tagging process may be repeated any number of times for the same state (e.g., running, done, loading, etc.) in the same or different conditions, or may be repeated for different states under varying conditions. Source Table 14 provides example Python source code that will use a camera to take pictures in order to on a Raspberry Pi single board computer. Similarly, Source Table 6 provides depth camera image capture code. The image files can be saved in a folder with a name representing the state of the observed object when the picture was taken (e.g., "./running/," "./done/," "./loading/," etc.)

2. Training a Neural Network.

The saved tagged image data is used train the observer 100 device using its local processor, or optionally a remote server. Source Table 14 provides example Python source code that will perform transfer learning on a pre-trained Mobile ImageNet neural network in order to add new classifications based on the saved tagged images. Once the model is re-trained, the neural network can be used to classify new images taken by the camera on the observer device.

3. Using the Trained Neural Network Model on a Microcontroller.

The neural network can be used on the single board computer observer, and then may be used to classify the new image data for use with the state machine models. Source Table 15 provides example Python source code will perform inference using the re-trained neural network to classify newly observed image data into an image category etc. based on the neural network created from the training data.

4. Re-Training.

To the extent that additional data is collected, the neural network model from step 2. Above can be improved by re-training with additional data, or transfer learning with the additional collected and tagged data.

5. Sharing Trained Models.

For "internet of things" devices, this training data may be uploaded to a central repository of tagged information, so that all users of similar devices may benefit from the data as it is incorporated into trained models for similar devices.

IV. User Applications

Once the state is observed by an observer 100 device, the state is communicated to either a mobile device or an observer backend. In either event, the state information can be made available to a user's or their family members other devices in many ways.

For example, the state determination for an observed device may be transmitted to a television, set-top box, smart watch, mobile device, computer, or any other screen-based device. The observed device state information can be presented as a notification or provided in a notification panel area or other easily accessible menu or widget that is accessible to the user.

For purposes of illustration and without limitation, observed device state may be provided via an device (e.g., Apple TV, iPhone, Apple Watch, FireTV, etc.) widget that lists devices and current status information, or may be presented as a toast-style (or any other style, etc.) notification message that appears momentarily on the screen around the time the state of the machine changes or if there is a reminder event about a "stale" state that requires attention (e.g., "your clothes washer is done don't let your wet clothes continue to sit", etc.).

As another example, the state determination for an observed device may be provided via an application or website with observation and/or control panel. Some example applications and/or website user interfaces are shown in FIGS. 12B-12J and Source Tables 17 and 18, discussed further below.

As another example, the state determination for an observed device may be provided via an application programming interface (API) such as "RESTFUL" API that allows third party services to easily query the status or state of a device. Alternatively, new input information may be submitted via an API and an updated state may be determined and returned obviating the need to have the neural network model present on the edge observer device.

As another example, the state determination for an observed device may be provided via a voice assistant notification or user query and response. An example voice notification and voice skill to retrieve observed device information illustrated in FIGS. 13A-13I and Source Tables 19 and 20, discussed further below.

IV.A Mobile Device Applications and Notifications

In various forms of the invention, the observer 100 devices can be coupled to other systems that allow users to query and observe the current state of the appliances observed by the observer. Any of the notifications can be used in any of the different contexts (app, push notification, voice assistant query, voice assistant notification, etc.). The below examples are provided for illustration without limitation as to the platform used.

Figure 12A:
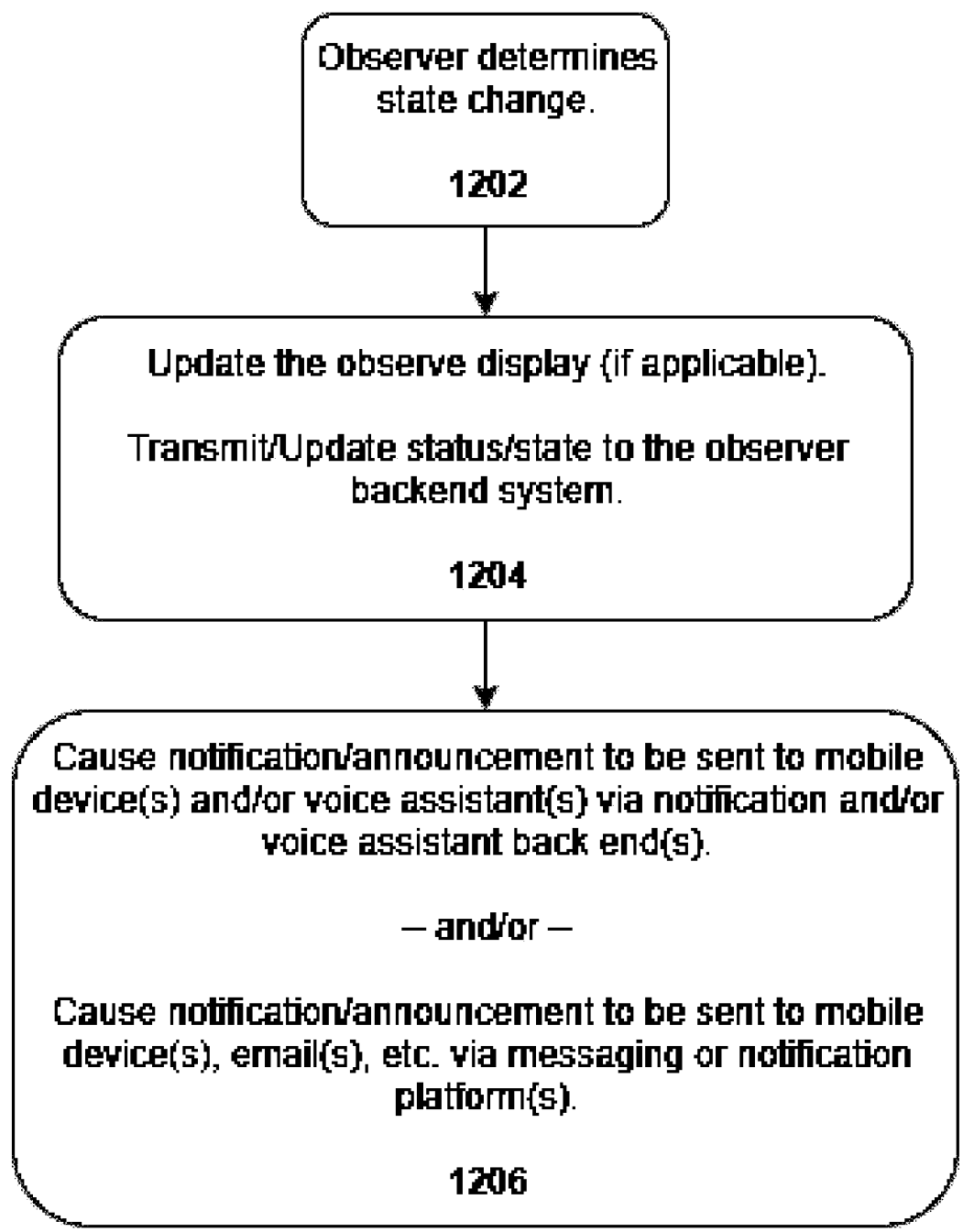
FIG. 12A depicts a flowchart for causing notifications or announcements to be transmitted to mobile devices or voice assistants based on an observation from an observer device.

For purposes of illustration and without limitation, with reference to FIG. 12A, the observer 100 experiences a state change at act 1202. At act 1204, observer 100 causes its display to update (if applicable) and transmits updated state information via a radio interface (e.g., BLE Beacon/Advertisement, Bluetooth communication session, Wi-Fi, cellular, etc.). At act 1206, the transmission causes either a notification or announcement to be sent to a mobile device, email, or messaging platform, or voice assistant back-end.

Mobile Device Applications.

In various forms of the invention, mobile applications are provided that allow users to retrieve the current state of observed devices and/or manage observer devices. Generally, the applications may provide the following features: add observer devices, configure observer devices, and view and/or set the current status of observer devices/observed machines.

Figure 12B:
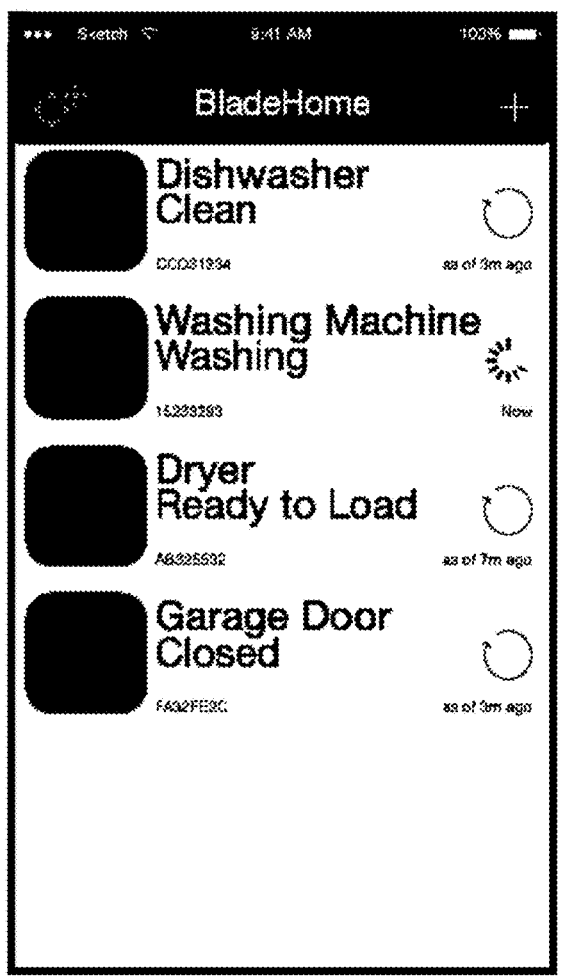
FIG. 12B depicts a main screen of one example mobile application.

For purposes of illustration and without limitation, with reference to FIG. 12B, a main screen of a Bluetooth Low Energy (BLE) connected observer mobile application is shown. However, the mobile application may also be used with other forms of the devices including Wi-Fi, cellular, or other connected observer devices. The main screen shows a listing of the observer devices such as an address or identifier of each device (e.g., CCD31234, 15233293, AB325532, FA32FE2C, etc.) along with an indication of the type of machine or a friendly name that is observed (e.g., Dishwasher, Washing Machine, Dryer, Garage Door, etc.) and the status of each known device (e.g., Clean, Washing, Ready to Load, Closed, etc.). Color icons may also be used to show the state (e.g., Green is Clean or Closed, Blue is Washing, Orange is Ready to Load, etc.). Furthermore, a battery icon can be applied to the information in order to indicate a low battery that needs to be replaced or a last known battery level. For BLE connected observers, or any observer that is periodically asleep, a "last heard from" indication may be presented (e.g., (approximately) "Now", "as of 3m ago," etc.). A refresh button may also be provided in order to attempt to force an update from a particular observer. The refresh button may poll the device or pull current device information from a central server. Furthermore, in BLE connected observers, a distance from appliance/observer may be provided using BLE ranging. To the extent the mobile app receives new information from a BLE connected device, the mobile application may relay this information to a server so that other mobile phones with permission to access the observer state may obtain the most up-to-date state for the observer via the Internet even thought he observer is only able to beacon or communicate with short range Bluetooth signals. The mobile application may also provide a settings button such as the gear button shown in the top left corner of FIG. 12B, and/or a button to add a new observer device as shown by the + icon in the top right corner of FIG. 12B. Pressing the + button presents the add new device view controller dialog shown in FIG. 12C.

Figure 12C:
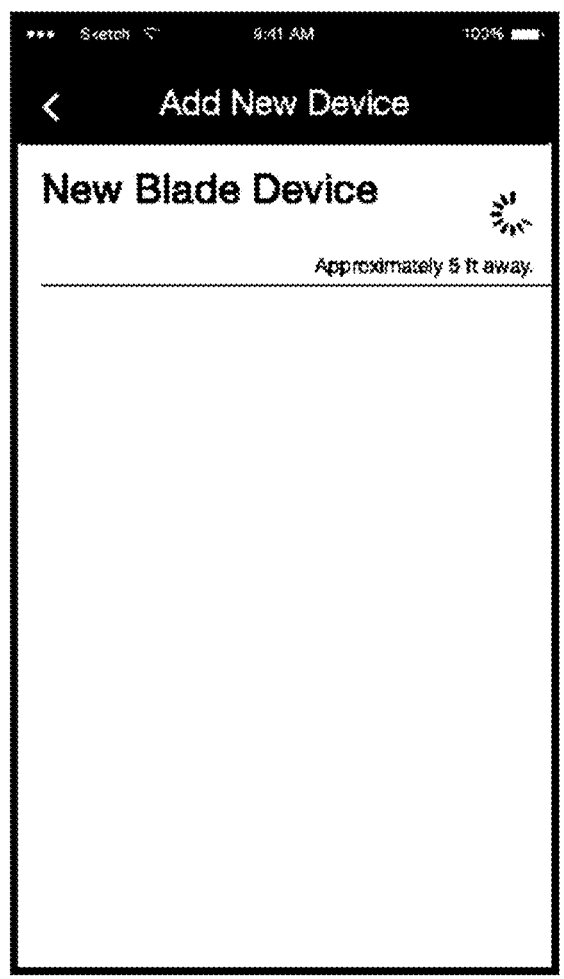
FIG. 12C depicts an add new device screen of one example mobile application.

For purposes of illustration and without limitation, with reference to FIG. 12C, an add observer device screen of a Bluetooth Low Energy (BLE) connected observer mobile application is shown. However, the mobile application may also be used with other forms of the devices including Wi-Fi, cellular, or other connected observer devices. This view controller searches for unknown devices and allows them to be added to the main screen. The view controller may also show the physical distance to the unknown device and optionally sort the device list from closest to furthest or vice versa for example in order to help the user find the device that they desire to setup in the case there are multiple unknown devices that need to be configured.

Once a device is selected to be set up, the user may specify the type of machine that the observer will be associated with and observing; and the user may provide a friendly name for the device (e.g., "Home Dishwasher", etc.). Optionally, the firmware can be updated on the device. In some forms of the invention, the devices are generic devices and their functionality can be changed simply by choosing the correct firmware. The firmware can be updated to change the function of the device. Firmware for any application can be loaded on to the device. For example, if the device is going to monitor a dishwasher one firmware may be installed. If the device is going to monitor a garage door, other firmware may be installed. In other instances, one firmware version may provide the functionality for numerous observed devices and a setting in the observer determines the applicable software settings to use. For purposes of further illustration, Source Table 17 provides Objective-C iOS code that corresponds with the application shown in FIGS. 12B and 12C. Source Table 1 provides Bluetooth Low Energy connected Arduino compatible observer device software.

For purposes of illustration and without limitation, with reference to FIG. 12D, an example device detail screen of a Wi-Fi connected observer mobile application is shown. Similarly, for purposes of illustration and without limitation, with reference to FIG. 12E, another example device detail screen of a Wi-Fi connected observer mobile application is shown. However, the mobile application shown in FIGS. 12E and 12D may also be used with other forms of the devices including BLE, cellular, or other connected observer devices. At the top of the application screen is an option to select the observer device in order to view details about that device. There is a drop down menu to select the type of device that is being observed. Next, there is a display readout to provide arbitrary information such as the name of the device being observed, the state information, and debugging information such as a "run count" (e.g., the number of times the main loop has run since resetting the observer device, etc.). Below that, there are numerous indicator icons such as those that correspond to a device state or a low battery warning. Below that, there is a graph that can be configured to provide additional detailed information about different device parameters including state, type of device, and the measured FFT Average value; the scale of the graph can be changed with the control below the graph. Below that, there are sliders to set the FFT Average running threshold value, and a value to determine how long the "Not Running" determination must persist before the state updates to an appropriate state (e.g., "Running"→"Done", etc.).

For purposes of illustration and without limitation, with reference to FIG. 12F, a main screen of a Wi-Fi connected observer mobile application is shown. However, the mobile application may also be used with other forms of the devices including BLE, cellular, or other connected observer devices. The main screen shows a listing of the observer devices in tile or row user interface elements along with an indication of the type of machine or a friendly name that is observed (e.g., Concorda Dryer, Concorda Washer, New Dryer, Concorda Dishwasher, New Dishwasher, etc.) and the status of each known device (e.g., Done [Low Battery Icon], Done, Load, Load, Load, etc.). Furthermore, a battery icon can be applied to the information in order to indicate a low battery that needs to be replaced or a last known battery level. Touching the user interface element associated with a device will present a device detail dialog such as the dialog shown in FIGS. 12I and 12J. The mobile application may also provide a settings button such as the hamburger menu button shown in the top right corner of FIG. 12F. Pressing the hamburger menu button presents the add new device dialog shown in FIG. 12G. The mobile application may also provide a Reports button such as the button shown in the bottom left corner of FIG. 12F. Pressing the Reports button presents the Reports dialog shown in FIG. 12H.

For purposes of illustration and without limitation, with reference to FIG. 12G, a device management screen is shown. The screen allows for the observation, renaming and addition of observer devices. A "last connected" or "offline since" time may also be provided for each observer device. Observer devices may appear offline during their frequent deep sleep cycles for battery power management. Observer devices may awaken without connecting to the backend server unless a status update or other server update is required. Pressing the "+ Add New Device" button will launch a dialog that will prompt the user to connect to the Wi-Fi hotspot name created by a new observer device in setup mode, and then transfer the household Wi-Fi access point credentials (e.g., SSID and password, etc.) to the new observer device in order to connect the new observer device to join the home Wi-Fi network and provision the new observer device with the observer back-end. Once the new observer device is successfully provisioned, a friendly name will be requested from the user and the device added to user application.

Figure 12H:
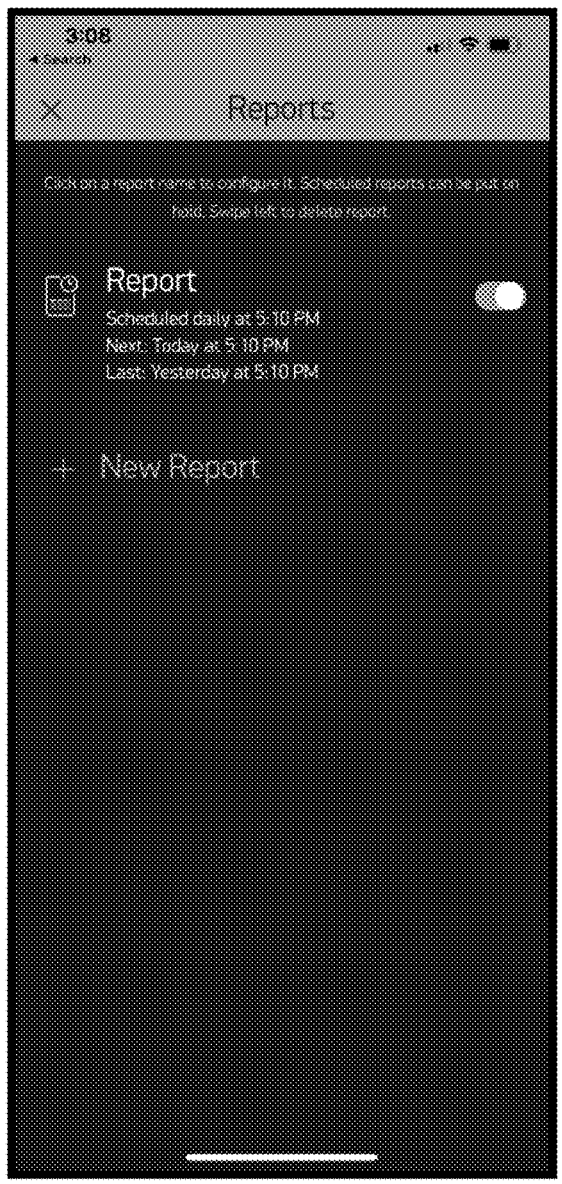
FIG. 12H depicts a report management screen of the third example mobile application.

For purposes of illustration and without limitation, with reference to FIG. 12H, a report management screen is shown. A listing of scheduled or recurring reports is provided with information such as the report name, the scheduling frequency, the date and time of the next scheduled report, the date and time of the last report that was generated, and an enable/disable selector to enable or disable the particular report. There is also a "+ New Report" button that allows for the generation of a new report task including the selection of what observer devices, and "virtual pins" or other device parameters are included as well as the frequency and generation time of the report. The data obtained via reports may be used as training data for the initial training or transfer learning training of a neural network classifier as discussed elsewhere herein.

Figure 12I:
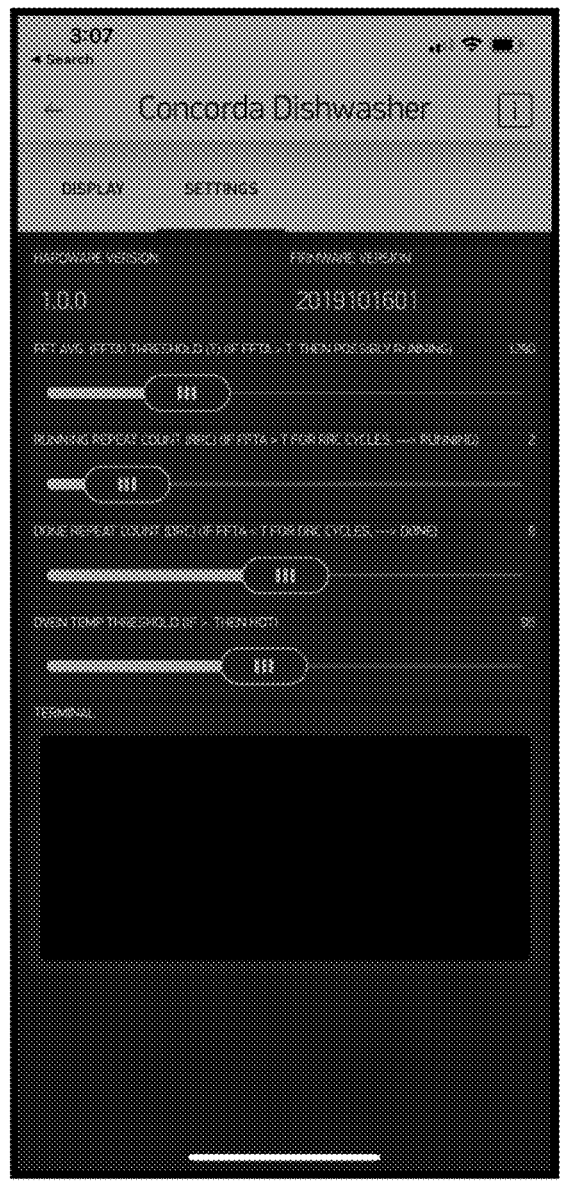
FIG. 12I depicts a device detail settings screen of the third example mobile application.

For purposes of illustration and without limitation, with reference to FIG. 12I, a device detail settings screen is shown. This screen provides the hardware version and firmware version reported by the selected observer device, as well as the FFT. Average threshold value, Running Repeat Count to determine how long the FFTA>Threshold before a "Running" determination is made, a Done Repeat Count to determine how long the FFTA<Threshold for a "Done" determination, and an Oven Temp Threshold to determine, in the case the observer device is configured to observe an oven, if the oven is hot. There is also a data terminal to display arbitrary debugging information.

For purposes of illustration and without limitation, with reference to FIG. 12J, a device detail display screen is shown. At the top of the application screen is a drop-down menu to select the type of device that is being observed. Next, there are numerous indicator icons such as those that correspond to a device state or a low battery warning, and a numerical battery voltage readout. Below that, there is a graph that can be configured to provide additional detailed information about different device parameters including state, the measured FFT Average value, the FFT Standard Deviation value, and the measured Temperature; the scale of the graph can be changed with the control below the graph. Below that, there is another graph that can be configured to provide additional detailed information about different device parameters including battery voltage, and the current orientation of the device (e.g., a 1-6 value, etc.); the scale of the graph can be changed with the control below the graph. Source Table 18 provides information about the virtual pins that correlate the observer hardware to various parameters stored in the observer backend that are available to the observer mobile phone application.

Push Notifications to Mobile Devices.

In various forms of the invention, when a state change is detected a push notification may be sent to one or more users associated with the observer device, or within the proximity of the observer device. For example, if a household dishwasher transitions to the "Done" state, a push notification, SMS, or other notification message (e.g., "The dishwasher is done.", etc.) may be sent to users associated with the household dishwasher.

In addition, in various forms of the invention, reminder notifications (e.g., "The dishwasher has been done for a while, time to unload it.", etc.) may be sent if a specific state persists for a period of time. The notifications may be sent through a push notification system, or they may initiated locally on a user-device based on the initial notification of state change an a lack of further updates about the state of the observed device.

In addition, in various forms of the invention, a notification may be sent to a specific user that was recorded as having last interacted with the observed machine. For example, a user that loads a loadable machine may be recognized (e.g., via image recognition, via Bluetooth proximity, via entry of a user ID into the observer device, etc.) and recorded in the system. When the state changes from "running" to "done," the system can direct the notification message to the recorded user. For purposes of illustration and without limitation, the observer may utilize Bluetooth Low Energy or Wi-Fi to determine who loaded a loadable machine, and send a notification directed to them when the loadable machine is ready to unload. Alternatively, the observer may utilize facial recognition to determine the last user to load a loadable machine, and send a notification directed to them when the loadable machine is ready to unload. For purposes of illustration and without limitation, observers may also use BLE or facial recognition to determine last person near a neglectable machine to send them an alert to turn the machine off if it is in the neglected state. See Source Tables 2 and 3 ("Blynk.notify( . . . )").

Voice Assistant Notification.

In various forms of the invention, when a state change is detected an announcement or notification may be sent to one or more voice assistant devices or remote speaker devices.

For purposes of illustration and without limitation, upon an appliance completing cycle, a smart speaker or speaker group (e.g., an Alexa or Google Home device, etc.) may provide an announcement (e.g., "the dishwasher is now clean.", etc.).

For purposes of illustration and without limitation, after an appliance has completed a cycle, a smart speaker or speaker group (e.g., an Alexa or Google Home device, etc.) may provide an announcement or reminder (e.g., "The washing machine finished a while ago and hasn't been unloaded. Do not forget to move the close to the dryer!", etc.).

For purposes of illustration and without limitation, upon an appliance completing a cycle but where a dependency is not met (e.g., a washer is done, the dryer is done but not ready to load because the last load hasn't been removed, etc.), a smart speaker or speaker group (e.g., an Alexa or Google Home device, etc.) may provide an announcement or reminder (e.g., "Don't forget to unload the dryer. The clothes in the washer are ready to be dried.", etc.).

With reference to FIG. 13A, the observer 100 experiences a state change at act 1302. At act 1304, observer 100 causes its display to update (if applicable) and transmits updated state information via a radio interface (e.g., BLE Beacon/Advertisement, Bluetooth communication session, Wi-Fi, cellular, etc.) to an observer backend system accessible to voice assistant.

For purposes of further illustration and without limitation, upon determining a state change, an audio file (e.g., wav, mp3, etc.) may be generated with the notification or announcement message. This audio may be generated on the observer device, on another device, or via an API over the Internet. The audio file is then uploaded to an internet accessible URL (e.g., an AWS S3 bucket, etc.). The observer, or another device, may then initiate a command to one or more smart speakers to play the audio file. See, e.g., Source Table 19 providing Python source code that causes a Google Home smart speaker to play an audio file.

IV.B Voice Assistant Device Query

With reference to FIG. 13B, voice assistant receives a voice query relating to the observer at act 1312. At act 1314, the voice assistant backend selects the appropriate voice assistant action to take and queries the observer backend for relevant observer state or status information. At act 1316, the voice assistant backend receives relevant observer status information from the observer backend. The voice assistant backend then formulates a response and transmits the response to the voice assistant thereby causing voice assistant to annunciate the response at act 1318.

Figure 13C:
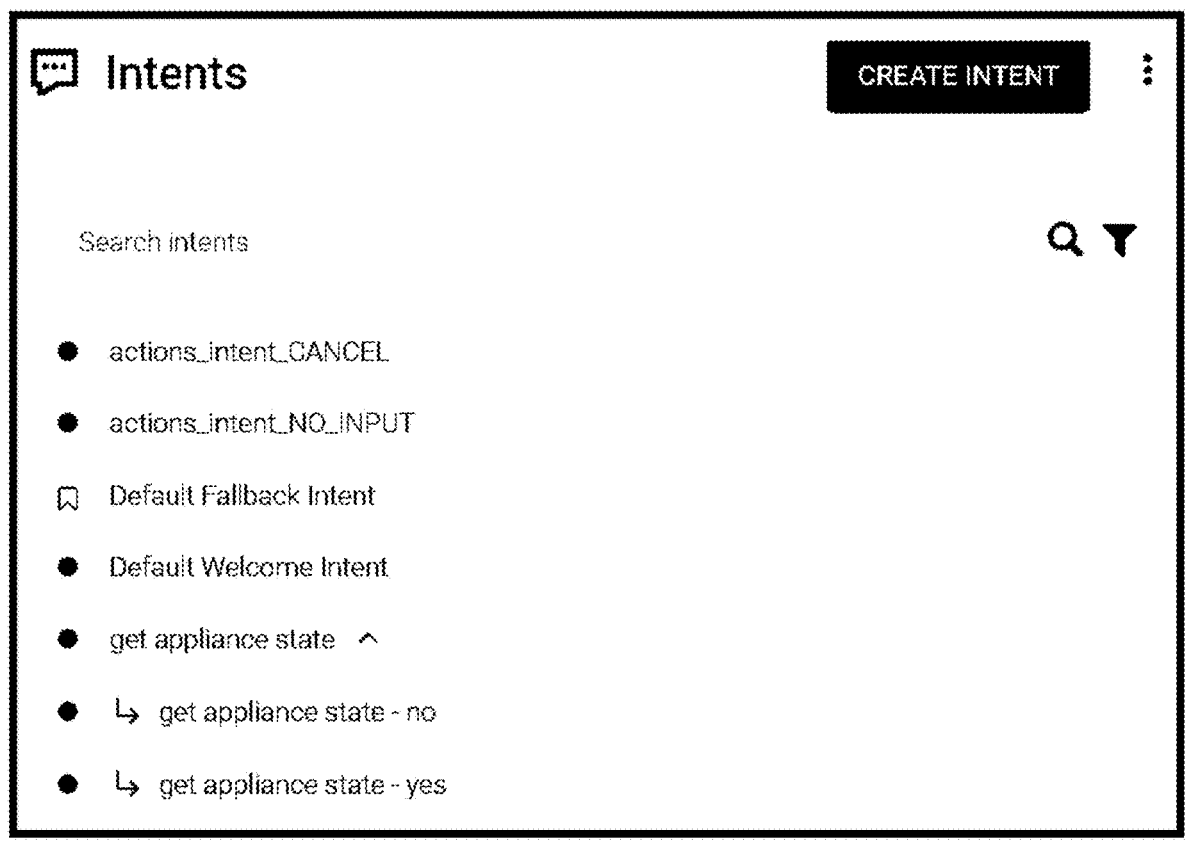
FIG. 13C depicts an intent listing associated with a voice assistant agent.

For purposes of illustration and without limitation, with reference to FIGS. 13C through 13I, an example voice assistant agent is illustrated. With reference to FIG. 13C, an Intent listing associated with a Google DialogFlow for Assistant Agent is shown. An intent "get appliance state" has been created. With reference to FIG. 13D, the "get appliance state" intent details are shown. The parameters of appliance and state are defined. Training phrases such as "ask mr. wiggle about the dishwasher," "is the oven hot?," "is the dishwasher clean," etc. have been added as example phrases associated with the intent, and the action and parameters in the training phrases are highlighted. When these phrases, or phrases like these are recognized by the agent, the action and parameter values will be extracted. This information will then be fed to the response. The Response is defined as a webhook that is enabled for the event.

Figure 13E:
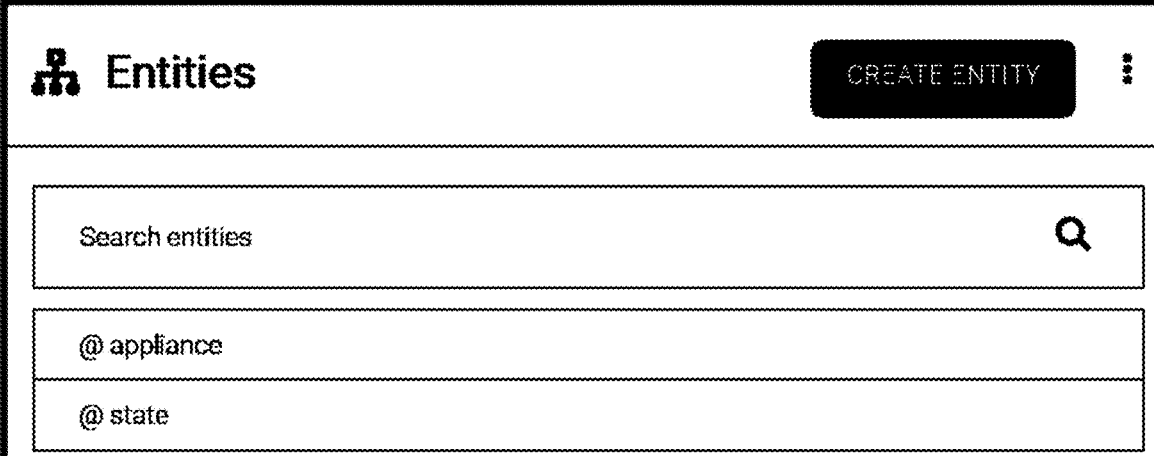
FIG. 13E depicts an entities listing associated with the voice assistant agent.
Figure 13F:
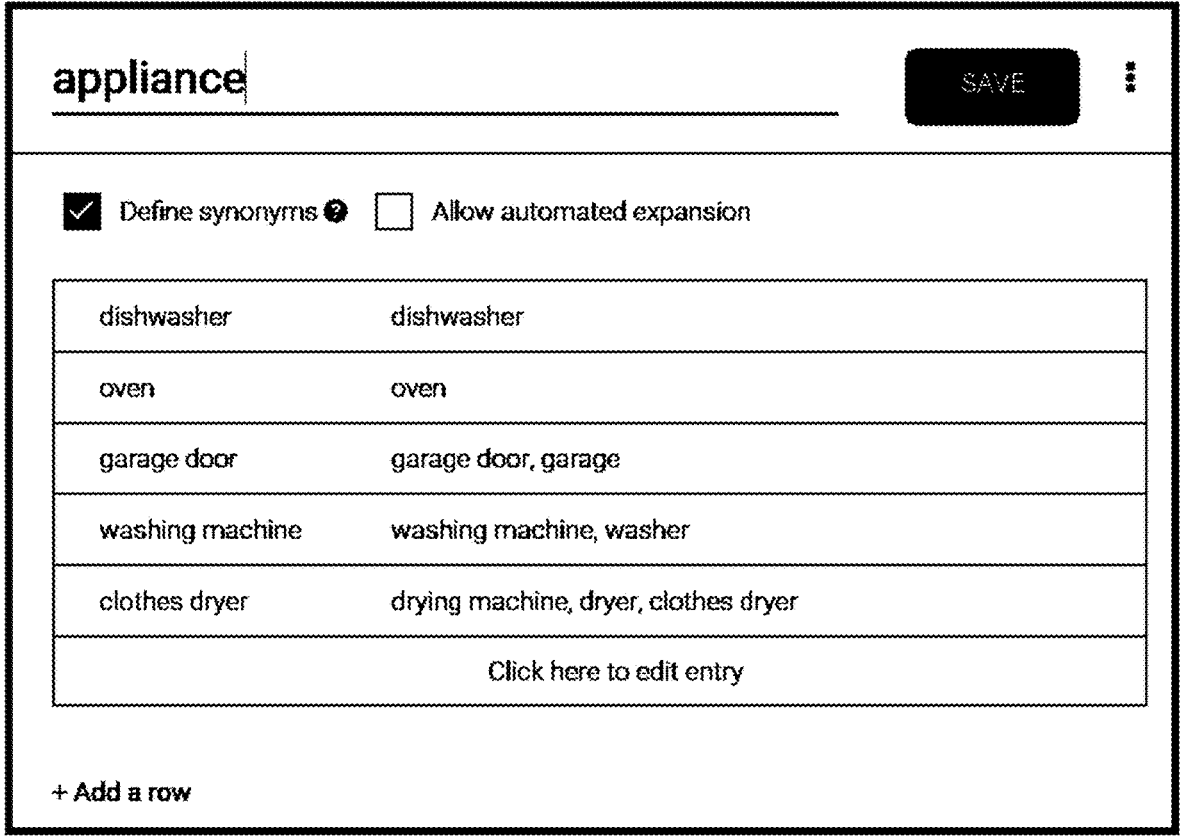
FIG. 13F depicts details for the appliance entity associated with the voice assistant agent.

With reference to FIG. 13E, the Entities associated with the agent are shown. These are "@appliance" and "@state." The entity details for "@appliance" are shown in FIG. 13F where appliance names, types and synonyms are provided. Similarly, the entity details for "@state" are shown in FIG. 13G where state names, types and synonyms are provided. With reference to FIG. 13H, the fulfillment of the response is indicated to be via webhook (e.g., a URL that provides the response based on input).

Figure 13I:
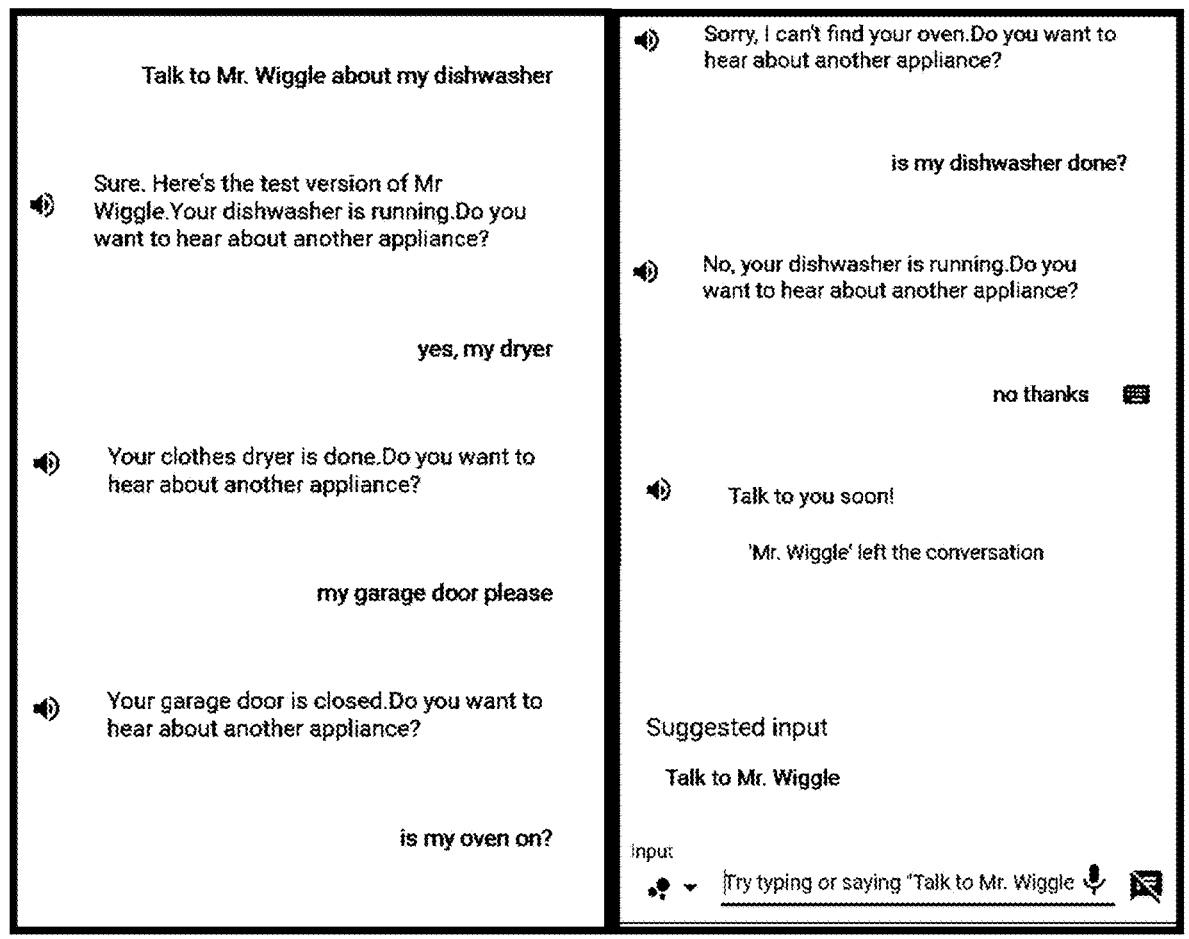
FIG. 13I depicts an example conversation with the voice assistant agent.

For purposes of illustration and without limitation, with reference to FIG. 13I, an example conversation with the voice assistant agent is provided. As another example of a voice assistant query, an interaction is dynamically generated based on the state of the observed appliance that is the subject of the query:

Q: "[Alexa/Google/etc.], is the dishwasher done?"

A (If "Load"): "No, the dishwasher is ready to load."

A (If "Running"): "The dishwasher is still running. I will let you know when it's done."

A (If "Done"): "Yes, the dishwasher is done and ready to unload."

Source Table 20 provides a source code listing for the webhook utilized with the voice skill agent illustrated in FIGS. 13C through I, above.

In various forms of the invention, to set up a voice assistant skill for use with their observer devices, a user will initiate a dialog in the relevant voice assistant app (e.g. Amazon Alexa, Google Home, etc.) and select the relevant Agent or Skill associated with the home observer system. The user will then provide login credentials for the home observer system in order to provide access to the voice assistant system. The voice assistant skill will then receive a list of the user's observer devices, device names, and/or device ID's. Then, the skill will be invoked when a relevant query is received. The skill will use the retrieved device IDs, etc., associated with the user in order to formulate an API request to the observer backend to obtain the then-current state information associated with the machine that is the subject of the user's query. Upon receiving the information from the observer backend, the skill can then formulate an audio response that is provided to the user's smart speaker. Still further, in various forms of the invention, the observer backend can initiate notification or announcement to voice assistant backend for the user when an observer reports a state change.

Location Based Notifications.

In various forms of the invention, location-based notifications may be provided. For purposes of illustration and without limitation, when a user is leaving their house, they may receive a notification from the system if a device is in a vulnerable or other state that is not typically appropriate when the user is leaving the house. For example, if the oven is on and a user is detected to be leaving the house, then the user may get a notification that the oven is on. As another example, when leaving the house, the user may get a notification that the garage door was left open.

A user's phone can be configured to place a geofence their house. The phone can then taken an action when it is detected the user is leaving the geofence area. The phone can contact the observer backend and determine if any devices are in a state that is not appropriate. Alternatively, the phone can monitor the visit to home and be notified when the user is leaving/the visit ended. As another alternative, the phone may monitor its proximity to observer devices known to be present at the house via BLE ranging or Wi-Fi ranging techniques.

There may be different geofences or geographic settings for different types of devices. For example, the geofence for the oven may be smaller than the geofence for the garage door. This can give additional time for the garage door to close. Some devices may rely on geofence ranging while others rely on radio-based ranging, etc.

The system may also only alert the last person to leave a house. For example, the system can track the members of each household with a mobile device.

| Member | Location State |
|---|---|
| Father | Home |
| Mother | Home |
| Child | Not Home |

If the father leaves home while the oven is on, the system may elect not to send an alert because the Mother is also still home. However, the system still may elect to send a garage door alert to the father to the extent the garage door is not closed after he leaves. The system may also send a garage door alert to a voice assistant at the house to alert (optionally directed specifically to the Mother that is still at home) that the garage door was left open (and that it should be closed). Once the door is closed, a follow up alert can be sent to the Father.

| Member | Location State |
|---|---|
| Father | Not Home |
| Mother | Home |
| Child | Not Home |

However, if the mother also leaves the house while the oven is on, the system may send a notification to the Mother. If the Mother also forgets to close the garage door a notification can also be sent.

In systems with actuator or interface to light control system (or garage, etc.), the observer system can trigger the actuator or turn off lights only when the last person leaves home (or close the garage to the extent there is a garage left open alert). The system may also turn on lights when the first person arrives home.

Interface with Service Availability System.

Observer 100 devices may be interfaced with a service availability system. Home and businesses may place observer 100 devices to monitor equipment. When an abnormal state is detected, the observer 100 can cause a service availability system associated with the home or business to reflect that the device is offline.

For purposes of illustration and without limitation, a Starbucks location may install an observer 100 device to observe any of its various machines. If, for example, the nitrogen cold brew system was inoperative, the observer 100 would detect the issue or an employee could provide input to the observer to change the state of the machine to Alert/Out of Service. The Starbucks back-end server could then reflect the state of this particular machine and associated product offering at the particular location in its consumer facing systems. When information about the particular location was requested by a potential customer from the Starbucks system through for example the Starbucks app or website, the potential customer can be informed that nitrogen cold brew coffee is temporarily not available at the particular location. An alternative nearby location can be suggested by the Starbucks application.

Interface with Procurement System. Observer 100 devices may be interfaced with procurement systems (e.g., Amazon, WalMart, Grocery Stores, etc.). For example, a user purchases consumable items for an appliance from a procurement system (e.g., Amazon.com, etc.). The particular detergent or tablets are known to work for a specific number N runs of the dishwasher (e.g., for a 100 pack of detergent pods N=100, etc.).

The observer 100 device and/or system may count the number of appliance cycles locally and/or on the observer backend. In addition, the observer device or observer system or may optionally also report the appliance runs to a procurement system. Alternatively, the observer device or system may only contact the procurement system to place an order for more consumables at the appropriate time.

Just in Time Shipping. When the observer 100 reports N (or N−lead_runs) runs have been completed, the procurement system can cause a new order for the consumable product to be placed. The value for lead_runs may be calculated based on the shipping time of the product (given a shipping speed level) and a computed number of average runs per day by the user for the appliance or the actual number of runs of the appliance during that time.

For purposes of illustration and without limitation:
On Jan. 1, 2019, user purchased 92 dishwasher tablets.
The observer 100 detects the dishwasher runs after the tablets are ordered or delivered (based on tracking history of the package).
On Apr. 1, 2019, 80 runs of the dishwasher have been tallied since the tablets were delivered. The procurement system infers that there are 12 tablets left and that the user may be running low. On average, the user does 5 loads of dishes a week and there are just over two weeks left before the user will run out.
The procurement system suggests that the user purchase additional tablets by placing a suggestion in the user's shopping cart, by creating an order and allowing the user time to cancel the order before it ships, or by including the item in a pending bulk shipment.

Bulk Shipping.

Alternatively, the shipments of consumable products can be batch shipped monthly. If a consumable product is believed to be in reserve based on reported usage, that product can be excluded from the batch monthly shipment. For purposes of illustration and without limitation (pods are used for ease of discussion, but volumes of liquid or other measures could similarly be utilized):

A 10-pack of dishwasher detergent tablets are sent to a user. After the new tablets arrive, the dishwasher observer device records 2 runs a week (once every 3.5 days). There is a 10-day lead time between ordering the tablets and delivery, and the user is set up on a monthly shipment plan. After about 20 days (e.g., monthly minus 10-day lead time), it is determined that the user has used 5 tablets and has 5 tablets remaining. The next monthly shipment will be allotted a new 10-pack of dishwasher detergent tablets.

A 50-pack of washing machine detergent tablets are sent to a user. After the new tablets arrive, the washing machine observer device records 5 runs a week. There is a 10-day lead time between ordering the tablets and delivery, and the user is set up on a monthly shipment plan. After about 20 days (e.g., monthly minus 10-day lead time), it is determined that the user has used 10 tablets and has 40 tablets remaining. The next monthly shipment will not be allotted a new 10-pack of washing machine detergent tablets because the user still has 40 tablets remaining and at this rate will have enough to last until the subsequent shipment at which time the determination to include/exclude washing machine tablets from the monthly shipment will be reassessed.

A 20-pack of coffee pods are sent to a user with 2-day shipping time. After the new pods arrive, the coffee machine observer records each time the machine is run. On average, the machine records 1 coffee a day for the first week (7 coffees consumed, 13 left), then two coffees a day each subsequent day (9,11,13,15,17 consumed, 11,9,7,5,3 left). When the number of pods remaining minus the product of the consumption rate times the lead time is less than or equal to a threshold, a signal to place a replacement order can be initiated. The threshold may be greater than or equal to 1 or alternatively the consumption rate times the shipping time. For example, the following table shows that on at least day 11, a new order for 20 coffees will be placed (e.g., surplus/deficit threshold is at least 1) so that on day 12 there will be 3 coffees remaining which will satisfy the consumption rate for that day, but that a replenishment will also arrive that day so that there will not be a shortage on day 13.

| Day # | Coffees/Day | Consumed | Remaining | Rate/Day | Surplus/Deficit (accounting for Rate and Shipping Time) |
|---|---|---|---|---|---|
| 1 | 1 | 1 | 19 |    | 19 |
| 2 | 1 | 2 | 18 | −1 | 16 |
| 3 | 1 | 3 | 17 | −1 | 15 |
| 4 | 1 | 4 | 16 | −1 | 14 |
| 5 | 1 | 5 | 15 | −1 | 13 |
| 6 | 1 | 6 | 14 | −1 | 12 |
| 7 | 1 | 7 | 13 | −1 | 11 |
| 8 | 2 | 9 | 11 | −2 | 7 |
| 9 | 2 | 11 | 9 | −2 | 5 |
| 10 | 2 | 13 | 7 | −2 | 3 |
| 11 | 2 | 15 | 5 | −2 | 1 |
| 12 | 2 | 17 | 3 | −2 | −1 |

In some forms of the invention, the procurement system may report the number of runs from last consumable purchase to observer system, or just the date or delivery date of the last consumable purchase. This may be based on a date range or other input. The observer system can then complete the calculations and initiate orders based on a run count.

Time Based Reminders.

In some forms of the invention, reminders may be set or sent based on the time since the last purchase of a consumable and a recommended frequency. For example items certain items (e.g., rock salt, air filters etc.) typically have a suggested replacement interval (e.g., a month, etc.). These reminders can be set manually in a user interface of the application, added automatically based on an order history and recommended interval from a procurement system, and form the basis for reminder alert notifications or voice assistant reminders to change these or similar items.

API to Query Projects or State Machines.

In some forms of the invention, an Application Programming Interface (API) to retrieve and/or locate, query, set, or otherwise manage state machines is provided. For example, some features that may be available via the API might include:

Get current state from a state machine (e.g., by state machine ID, etc.)
Set current state on a state machine
Get history of states from a state machine
Get/subscribe to notifications of a state transition from a state machine
Get state machine ID by location (e.g., lat/lon, zip code, etc.) and machine type (e.g., dishwasher, parking meter, etc.).
Get state machine ID by location and image of machine (e.g., using image recognition)
. . . etc.

Interaction with Third-Party APIs. The API may be used to provide an interface to systems like "If This Then That"

(IFTTT) that bridge the observer backend API with APIs provided by other services, or the observer backend may interface directly with other APIs. This allows for triggers to execute on state change or arrival/departure/dwell on state. For purposes of illustration and without limitation, some example triggers are:

If _OBSERVER DEVICE_ transitions to state _SELECT STATE_, then _ACTION PROVIDED BY ANOTHER API.

If _OBSERVER DEVICE_ transitions from state _SELECT STATE_, then _ACTION PROVIDED BY ANOTHER API.

If _OBSERVER DEVICE_ is in state _SELECT STATE_ for at least time TIME PERIOD, then ACTION PROVIDED BY ANOTHER API. For purposes of illustration and without limitation, if the dishwasher observer transitions to state done, a Phillips HUE light may be configured to change its color to green momentarily, or persistently until the dishwasher is again ready to load. As another example, if the garage door observer transitions to an open state, a smart speaker device can be instructed to play a sound. If the garage door observer transitions from the open state or to the closes state, the sound can be instructed to stop. As yet another example, if the oven observer device is in the hot state for more than 6 hours, then an SMS message can be configured to be sent to the home owner.

V. State Machine and Neural Network Model Training and Editing Tools

In various forms of the invention, a graphical editing tool may be used to create a project, add state machine(s) to the project, and map classifier(s) to various parts of the state machine(s). The tool may also be used to deploy, manage, debug, and retrain observers and classifiers.

Figure 14:
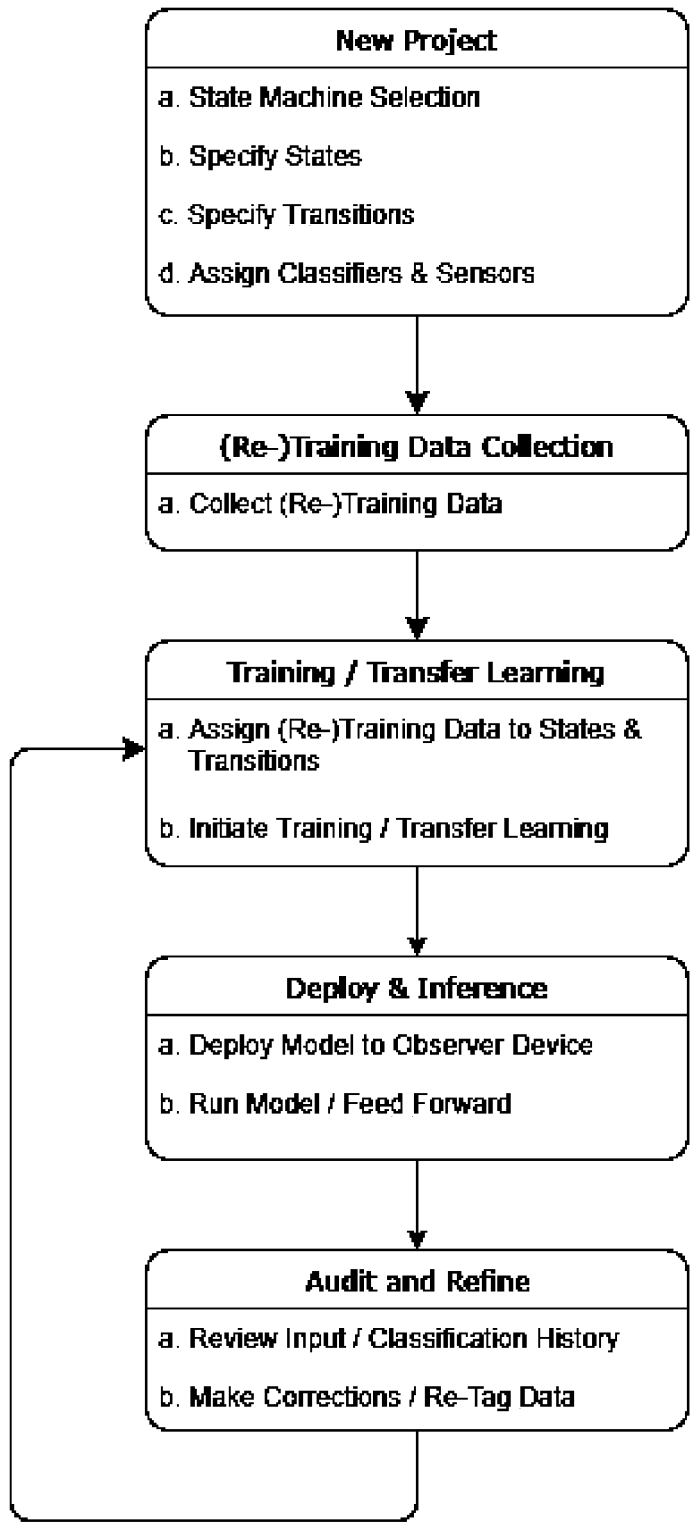
FIG. 14 depicts an exemplary flowchart for the creation, training, running, and refining of a machine learning or AI state machine model.

FIG. 14 depicts an exemplary flowchart for the creation, training, running, and refining of a machine learning or AI state machine model.

Figure 15A:
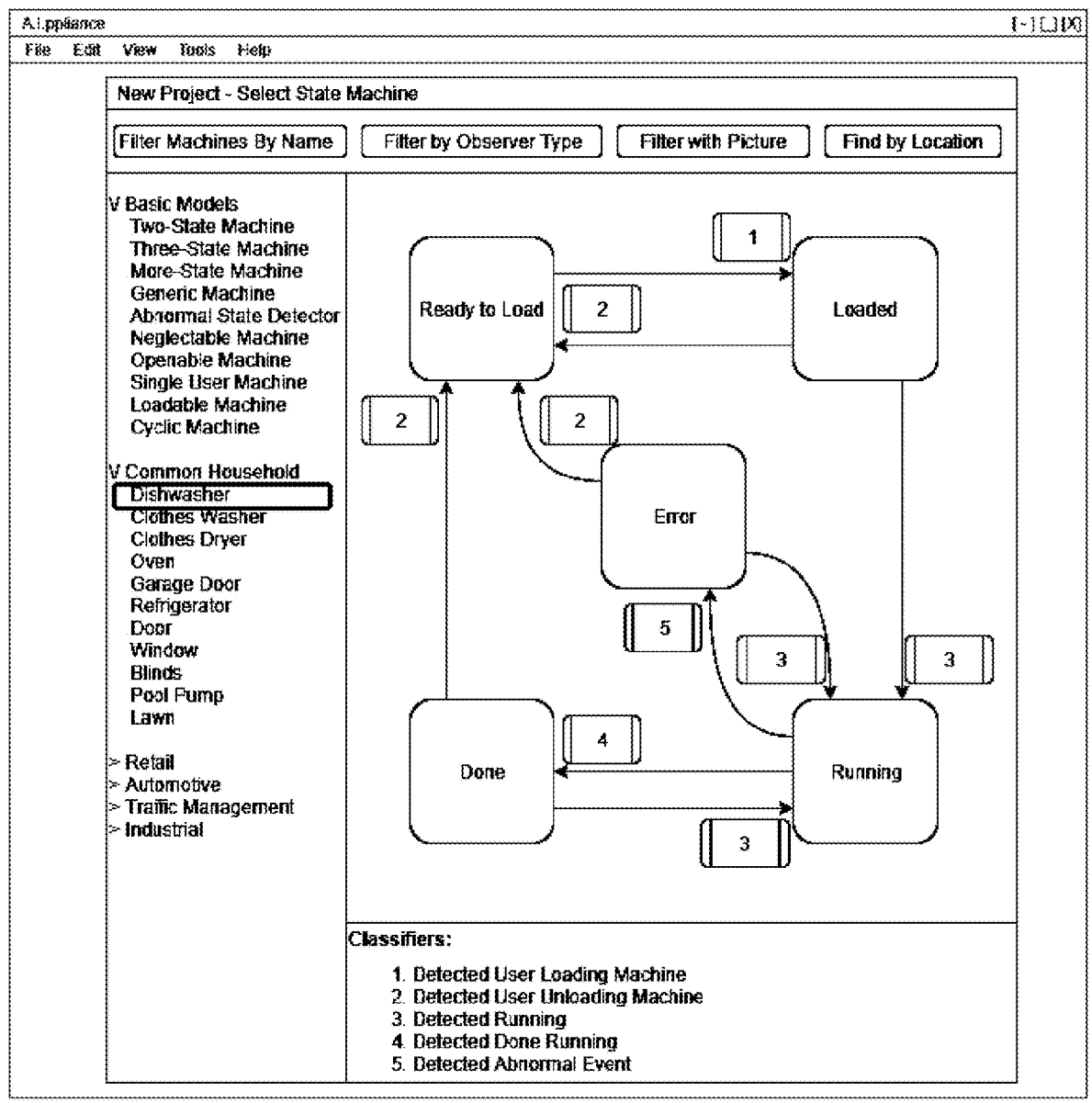
FIG. 15A depicts an exemplary Graphic User Interface (GUI) for creating a new state-machine model project for an observer device using AI classifiers.

FIG. 15A depicts an exemplary Graphic User Interface (GUI) for creating a new state-machine model project for an observer device using AI classifiers.

Figure 15B:
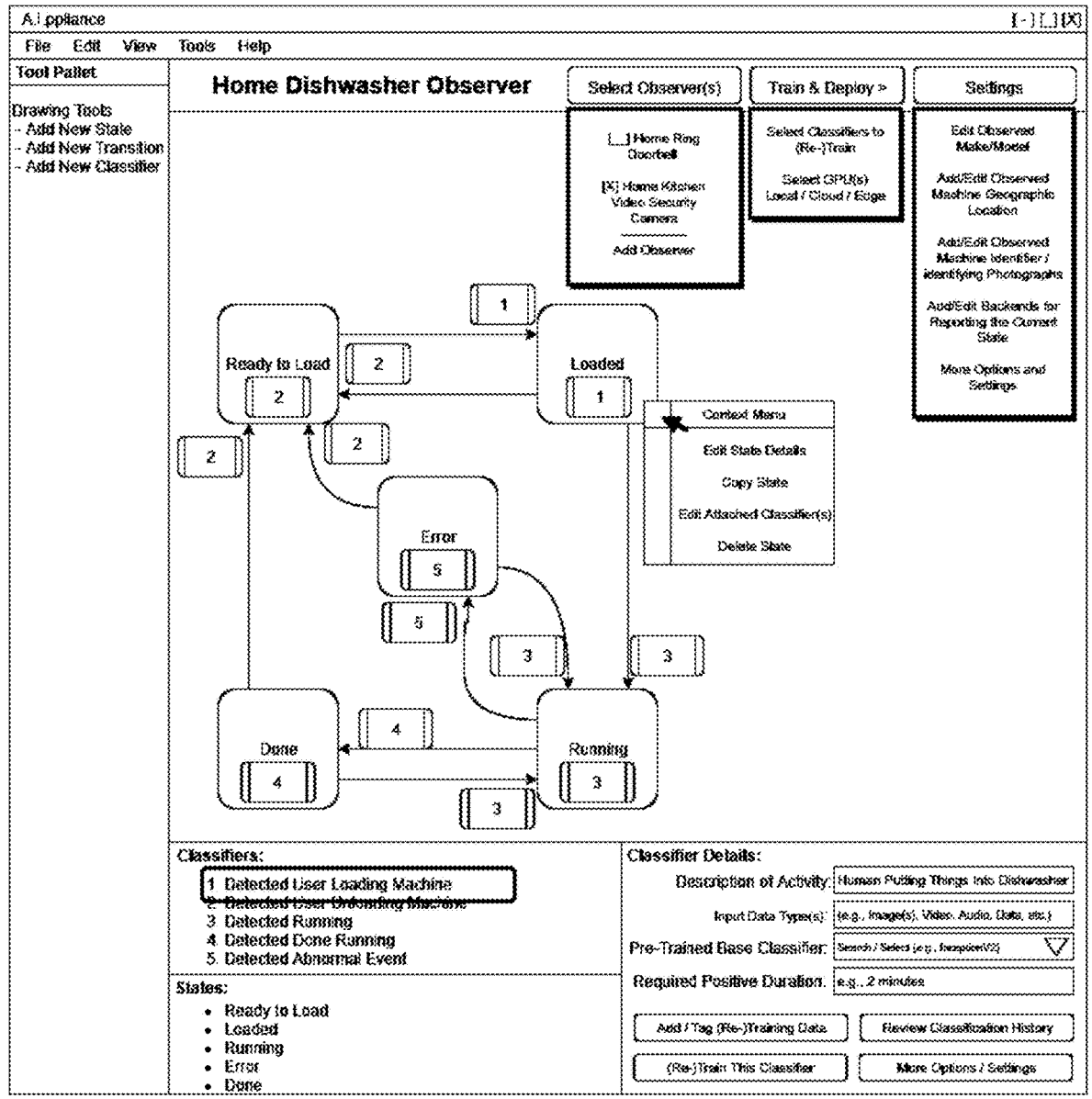
FIG. 15B depicts an exemplary Graphic User Interface (GUI) for editing, training, running, and refining a state-machine model for an observer device using AI classifiers.

FIG. 15B depicts an exemplary Graphic User Interface (GUI) for editing, training, running, and refining a state-machine model for an observer device using AI classifiers.

V.1 Create a New Project

V.1.A State Machine Selection

After a project is created, a state machine model is created.

Manual State Machine Creation.

A user may draw a state machine or complex state machine from scratch using a pallet of tools including: states, transitions, arrows, memory states, etc.

State Machine Library.

A user may select a state machine from a library of pre-defined templates or prototypes to insert into the project working area. These state machines may be generic types such as those described above (e.g., two-state, three-state, neglectable machine, cyclic machine, abnormal state detector, etc.), or they may be more-specific pre-defined machines associated with common types of machines (e.g., dishwasher, washer, dryer, refrigerator, oven, garage, etc.).

Table of known objects and prototype state machines
Look up objects to get relevant state machine prototypes Prototypes may be simple state machines that need to have classifiers added, or may have suggested classifiers already attached to at least one state or transition Automatically associate state machine models with known objects (e.g., a specific model of machine associated with a specific state machine, etc.).

Using image recognition to assign a state machine to a recognized object type

Image recognition determines machine

Looks up associated state machine

Assigns default state, or determines "initial" state based on observed activity

Reports location, machine, state to remote server where the information is stored in a database and may be used by other devices to identify the particular machine.

Automatic Identification of State Machine for a Specific Machine

Lookup based on location, image, etc.

May get last reported state as an initial state

Run classifiers to determine if still accurate.

V.1.B Specify States

Pre-Loaded from Library
Add States with Tool Pallet/Menus/Drawing
Delete States
State Details
Attached Classifiers.

V.1.C Specify Transitions

Pre-Loaded from Library
Add Transitions with Tool Pallet/Menus/Drawing
Delete Transitions
Transition Details
Attached Classifiers.

V.1.D Assign Classifiers and Sensors

Pre-Loaded from Library
Add Classifier with Tool Pallet/Menus/Drawing
   Selection of Classifier
      From classifier library
      Filter based on sensor type available
      Filter based on observer device type (e.g., available edge compute power, etc.)
   Selection of sensor data to provide to classifier.
      Pre-filtered based on sensor type available.
      Select options for sensor data.
         Frequency
         Filters on the data
         Video bounds for the classifier (e.g., only portion of captured image).
         Audio filters for audio data, etc.
Delete Classifier
Classifier Details
   Define Transitions/Classification Using NLP.
   In some forms of the invention, the states and transitions have may classifiers attached to them using natural language processing. The classifiers may be defined based on a user editing a dialog, and selecting any or a combination of the features to input into the classifier, any preprocessing that needs to be done to the input, and a standard classifier (e.g., ImageNet, UCF-101, etc.), a custom classifier, a combination of classifiers (e.g., ImageNet, and UCF-101, etc.), or any other information.

The classifier may also be selected automatically based on the type of input expected and a sentence describing the action that will define the state or trigger the transition.

"a person loads a dishwasher"
"the dishwasher is running"
"the dishwasher stops running"
"a person unloads a dishwasher"
"a doctor or nurse enters the room"
"a doctor or nurse exits the room"

Using Natural Language Processing (NLP), a lookup table, or any other method, the appropriate classifier or combination of classifiers can be selected in order to define the state or transition.

For purposes of illustration and without limitation, a classifier that is based off UCF-101 using transfer learning may be generated based on information that contains "loading", "running", "unloading", "entering room", "exiting room", "appliance turned on" classifications. A user may only need to specify in the transition arrow in the GUI that the "appliance turned on" and the application will find the best available classifier to use as a basis. This classifier may be improved with transfer learning.

V.2 (Re-)Training Data Collection

For each classifier as needed.
Collect data for each possible classification.
For each state as needed.
Collect data for each possible state.

V.3 Training or Transfer Learning

Assign (Re-)Training Data to States/Transitions. If not already done as part of 2, assign the (re-)training data to the classifiers associated with transitions and states in the GUI.

Initiate Training/Transfer Learning. For each classifier, training or (re-training such as transfer learning) will be initiated.

The classifiers can be trained independently from one another.

May be done on device or may be done remotely on a server.

V.4 Deploying and Inference (with or without the GUI Application)

Deploying the State Machine and Classifiers to Observer Devices.

The state machines and classifiers can be deployed together or separately and may be deployed to the same or different portions of the observer system network.

|  | State Machine on Cloud/Remote Server | State Machine on Local Server | State Machine on Edge Device |
|---|---|---|---|
| Classifier on Cloud/Remote Server | The Classifier and State Machine may both be deployed to a Remote Server. | The Classifier can be deployed to a Remote Server while the State Machine is hosted on a Local Server. | The Classifier can be deployed to a Remote Server while the State Machine is hosted on an Edge Device. |
| Classifier on Local Server | The Classifier can be deployed to a Local Server while the State Machine is hosted on a Remote Server. | The Classifier and State Machine may both be deployed to the Local Server. | The Classifier can be deployed to a Local Server while the State Machine is hosted on an Edge Device. |
| Classifier on Edge Device | The Classifier can be deployed to an Edge Device while the State Machine is hosted on a Remote Server. | The Classifier can be deployed to an Edge Device while the State Machine is hosted on a Remote Server. | The Classifier and State Machine may both be deployed to the Edge Device. |

Deploying Classifiers.
May deploy to cloud
   Observers merely send sensor data to server where it is classified.
May deploy to local server (e.g., a home router, hub, raspberry pi, mobile device, phone, etc.) on which the classifiers are run.
May deploy to edge devices (i.e., the observer device, mobile device, phone, etc.).
Deploying State Machines.
Cloud
Local Server
Edge Device/Observer Device
   Getting state machine onto observer:
Take state machine, converted to code that is compiled and then loaded onto observer device; or
Send state machine definition to observer device; or
Other methods
   Deploy to cloud system server
   Push to fleet of devices
   Push to specific device
   Directly load onto device
b. Model Runs/Feed Forward
Model runs
   For each classifier collect a history of inputs and associated determinations, resulting states and transitions for later auditing, flagging/tagging, and re-training.
Observer Memory Management.
Switching out classifiers in memory based on state (this may be used in any deployment, not just those through the GUI). State machine on observer device may cause a classifier(s) to be loaded into a neural network processor, or another processor on the observer device.

When on a first state, only the classifiers that are relevant to that state, or transitioning from that state may be evaluated on the device.

Alternatively, more classifiers or all classifiers may be evaluated at any time in order to ensure that the state machine is in the proper state and is not "lost."

Publish/Broadcast State

The instructions for where the state is published to (what backends, what protocols) may be edited so that the relevant systems can be notified on state change.

Instructions relating to publishing other identifying information about the observed object so that other third parties may look up the state when they encounter the object in the real world. Password protect/privacy so that only authorized people can examine the information relating to the observed device

V.5 Audit and Refine

Input History (e.g., Images, Sound Clips, Video, Video (Motion Detection))

History saved with whether or not it triggered the transition

User can audit/review the input and the result,

If there are false positives or negatives for any transition, then the tags can be updated and the classifier re-trained or refined based on the user-feedback Feed re-tagged data back into classifier training portion
Re-train/transfer learning
a. Review Input/Classification History
b. Make Corrections/Re-Tag Data

V.6 GUI Use Case Example: Crop Observer View to Focus on Specific Area of Image or Sensor Input In the case of an observer that is observing multiple machines, the observer input can be cropped, masked, or otherwise filtered in order to define multiple observed items.

For purposes of illustration and without limitation, a video observer positioned in a hospital hallway may be watching several patient room doors and monitoring several features with each room:

Is the room occupied by a patient?
Is the room ready for a patient?
Has a doctor or nurse checked on the patient recently?
Is a patient being visited by guests?

In this example, the observer has at least a video feed, that has at least one (but possibly multiple) patient room doors. For each patient room watched by the observer, the hallway and door for the room may be masked and associated with a project, a state machine, or a group of state machines. The project may be given a name or identifier (e.g., "Patient Room 102") so that it can be remotely located and monitored by hospital staff, a quality assurance department, an Application Programming Interface, etc.

A state machine may be associated with the project to answer the question "is the room occupied by a patient?". This may create, for example, a "neglectable machine" or a "single user machine." A custom state machine may also be defined. In the case of a "single user machine," an "in use" transition defined by whether a "patient" has been detected "entering a room." Similarly, the "Available" transition may be defined by whether the "patient" has been detected "leaving a room".

The transitions may be determined based on a custom AI classifier, or a combination of custom or semi-custom transfer learning trained classifiers such as ImageNet (or a modified ImageNet or similar network) and UCF-101 (or a modified UCF-101 or similar network).

There may be several different "Alert" transitions or additional state machines assigned to the room. (Second observer piggy back on to the same state machine/project as an additional input. A camera in the room. Alert if the patient is flailing arms/in distress/machine beeping/etc.)

Wrap Entire State Machine in Conditional Statement

Enable state machine only if another state machines state is (not) a specific state or set of states.

At least one "Alert" transition of the "single user machine" may be defined by the output of an "abnormal state detector" state machine, or the alert may be part of another state machine, such as a separate "generic machine" or "abnormal state detector" state machine.

The abnormal state detector may have its normal state be defined as whether a "doctor or nurse" has "entered the room" "within the last hour." Again, this can be manually specified with a custom classifier, or a combination of pre-trained or transfer-learning trained modified classifiers. The time component may be defined by a timer and an observation history of the observer or project. To the extent that the condition is not determined to have happened by the classifier, the state machine will transition to its alert state. Alerts may be sent to hospital staff and the family of the patient, for example. While in the alert state, once a "doctor or nurse" "enters the room", the state machine may transition back to its normal state.

A state machine may be associated with the project to answer the question "is the room ready for a patient?"

V.7 State Machine Store or Exchange

Good state machines for various use cases can be exchanged or sold

Move to Situational/Location Based area: Can be placed on mobile robot that roams building and checks on appliances and updates the state diagram for each appliance.

VI. Use Cases

Countless types of observer hardware devices may be implemented in various environments, to observe any imaginable object. The observed objects can be modeled using state machines that are driven with appropriate classifiers created as described herein. Some of the possible applications in different environments are illustrated below.

VI.1 Home Applications

VI.1.A Washer/Dryer Example

Camera in utility room aimed at washer and Dryer.
Recognizes the state of each machine (state machine diagram)
Uses AI image recognition (LSTM with Convolutional neural network) to determine state of each machine by looking at people interacting with the machines and the indications on the control panels of each machine.
May have database of common machines that it recognizes/has been trained on.
Sends notification to users when the machine state changes/if there is an error/upon request:
"Washing machine is off balance"

"Washing machine is ready to unload"
"Washing machine is empty"
"Washing machine is currently running. Estimated completion in 5 minutes."
Can recognize the user that interacted with the machine last, and direct notifications to that user.
Recognized James loaded the washing machine, and it has become off balance due to an "OFB" indication on the control panel. Notification sent to James' phone to check washer balance and re-start.
Similar examples for Dryer.
Also can detect unknown errors or other issues:
Unexpected water on floor.
Unknown issue—for example if something fell over in the utility room and it was not something the AI was used to detecting.

VI.1.B Saw Example

Computer coupled to camera which is aimed at an area of interest (e.g., saw blade).
Convolutional neural network (or other type of computer algorithm) trained (or configured) to recognize a dangerous situation (e.g., hand too close to saw blade, etc.)
Configured to activate the actuator in the danger condition to reduce risk of accident (eg open relay to take power away from saw)

VI.1.C Pool Pump Machine/Legacy Meter Example

An image-based observer may be trained on a legacy meter or other device with dials or other analog or digital readouts. The observer can be trained to correlate the display of the legacy device with states and transitions to provide an alert to a user if the machine needs attention. For example, with an observed pool pump, an abnormal state detector may be associated with a state transition from normal to abnormal when the observed pool pump pressure needle is outside of normal ranges.

VI.1.D Home Chore/Task Assignment

System can delegate tasks to various household members on a random, sequential, assigned or any other basis.
For example, a list of household members may be kept in the system. For a dishwasher that is ready to load, a household member can be assigned to always load the dishwasher, or one can be assigned randomly or in a sequence so that everyone shares the responsibility. The same can be done for unloading the dishwasher.
The setting for each appliance can be set and the information stored in the system.
When the observer transitions to a state that calls for user intervention of a specific appliance, a user is determined and the specific user may be notified that it is their responsibility to perform the action. For example, a dishwasher cycle completes, the system determines it is a husband's turn to unload the dishwasher. A push notification is sent to the husbands phone and/or a voice assistant message or notification is posted to the husband's voice assistant account.
Industrial/retail/quick service restaurant applications.

VI.1.E Television Emotion Tracking

Intelligent observer can be mounted on television to obtain user emotional feedback about the shows that are being watched.
Can identify the television show being watched based on sub audible tones in the show or other sound recognition.
Can identify the emotion on observers faces and correlate with various aspects of the show to determine engagement

VI.1.F Advertising/Purchase on Device

In some forms of the invention, advertisements may be placed on the observer screen associated with appliance. These may be directed to a new product for the user (with optional discount for buying it now), or a product that the user has used in the past or has indicated is a preferred product. A user may make a purchase by pressing a button or otherwise indicating that they would like to purchase the advertised item through a voice assistant or application interface.
For example:
favorite dishwasher detergent advertisement, or advertisement for a new detergent, may be displayed on the device. Pressing a button may cause the item to be purchased or added to a shopping cart.
For washer, could be clothes pods or detergent, fabric softener, etc.
For dryer, could be dryer sheets to prevent static electricity.
For oven, may be cooking tins or other consumable or cookable products.
If an advertisement for a new product is provided, it may also provide an option to purchase established product instead.
May also be free samples, etc.:
Press Button to Try
New _____ Dishwasher Tabs!
Rated Five Stars on Amazon.

VI.1.G Advertising Based on Machine State

Machines associated with an account
Ads can be provided to a user based on the observed states or a history of observed states associated with machines that the user is associated with or is known to manage or own
Ad for dishwasher detergent based on state (or state history of dishwasher)
Ad for paper towels based on state (or state history) of an observed paper towel holder
Based on an observed brand of paper towel wrapper
Based on a purchase history of paper towels associated with the user
Nearby machines
Ads can be provided based on the observed state of nearby machines
Advertising may be provided to any device associated with the user
Computer
Phone
TV
Observer devices with display
Watch/wearable computers

VI.1.H PIR Sensor

In some forms of the observer devices, a PIR sensor may be incorporated so that it can sense when a human is nearby. The PIR sensor can signal an interrupt that wakes the observer. The observer can cause a push notification or announcement when human nearby as to status change for the observed appliance (e.g., as a human approaches a washing machine the human can be alerted audibly of the washing machine state if there has been a state change e.g., "this washing machine is now clean", etc.). When everyone is out of the house, each observer can also become a motion/burglar detector (e.g., abnormal state machine, etc.).

VI.1.I Trick or Treat

Example: Create state machine for new trick or treater and to operate an actuator that deploys a serving of candy per trick-or-treater.

VI.2 Virtual Reality/Augmented Reality/Mixed Reality Applications

VI.2.A AI Observer—Virtual Input Devices

Use the exterior cameras to do image recognition on feet to determine input.

A virtual object state machines is created based on real world input as detected by observer For example, a virtual set of rudder pedals (virtual) can be created and associated with a state machine, with foot (real) determining input to the virtual object state machine.

Can be based on for example the inside out tracking cameras of the oculus quest, or an external camera or depth sensor like a Kinect device.

VI.2.B 3D Telepresence

Device or set of devices that is put in a room (e.g. conference room) that creates a 3D video model of the participants The 3D video model can be streamed or otherwise sent to a remote device over a network such as an oculus The 3D video model can be generated from multiple photo angles using techniques such as.

Use image recognition techniques to highlight person talking etc. and annotate participants.

VI.2.C Remote Telepresence Devices

Telepresence devices, observers, placed in the world in various locations (e.g., like scooter share scooters, etc.)

May be control them from afar with smartphone app to see what is happening somewhere etc.
  for a conference or meeting that cannot get to can send a drone
  get a drone near a friends house and have it fly to you with small item from friend
  power pads that the drones land on and are based from people sign up to host a power pad Deploy a state machine to a remote observer device for a fee to rent the time on the observer.

Rent a video feed from an observer device to run an observer state machine model remotely (e.g., rent feed from a red light camera to monitor an intersection for an event, etc.)

VI.2.D Capacative Keyboard

Problem—Hard to Type in VR because cannot see keyboard

Solution—Keyboard that senses hand position independently of key presses so that a virtual display of hands can be placed on display in VR Keyboard with:
  Microcontroller
  Wireless or wired interface to computer/VR headset, preferably wireless (Bluetooth or ISM)
  Battery/power distribution circuitry
  capacitive keys so that finger proximity can be sensed independently of key press
    Inverse Kinematics for determining how to display hand on keyboard
  Keys depress to activate as expected to type a character
  Circuitry to locate device in space relative to headset, 6DOF/9DOF sensors, and/or
    IR Light emitters to assist with tracking of the position and orientation of the keyboard

VI.3 Automotive Applications

Observer trained to recognize dangerous behaviors (texting while driving)
  Leaving infant or pet in a car
  Sensor in car seat
Camera/spherical camera etc. in car
State machine to track baby placed in seat, removed from seat
  Rear facing car seats may shield baby from camera view
  Tracking the baby being placed in the car seat and then being removed (or not) parent can be alerted if the car is stopped and shut down without baby being removed from the car seat
  Detect baby crying sound-->Alert.

VI.4 Traffic Applications

VI.4.1 AI Traffic Light

Light interfaced with cameras or lidar etc. Determines where pedestrians are relative to the intersection. Sensors may be placed anywhere on the stoplight system. One sensor or more may be utilized to obtain full sensor coverage of the environment.

Sense Environment
Determine
  Pedestrian Locations
  Automobile Locations
Anticipate
  Pedestrian Movement
  Traffic Movement
Actuate/Modify
  Modify the normal operation of the light.
  Actuate the signals to optimize safety and traffic flow.
Enforce
  If pedestrians try to take advantage of the system to cut the line/block traffic, then their picture can be recorded, and facial recognition used to issue tickets/citations.
  If cars cause an issue, pictures of the car, driver and license plate can be recorded, and tickets/citations issued if necessary.

The system can orchestrate the lights accordingly to ensure that cars do not inadvertently conflict with pedestrian traffic.

For example, bike waiting at an intersection to cross street.

Light would normally signal for cars to go straight or turn left. Bike/pedestrian may also be told to walk at that point as well. A car turning left would potentially conflict with the bike/pedestrian.

With the AI light system, the system would recognize that a car should not turn left until the bike/pedestrian is at least halfway across the street, and will ensure that the light for left turn remains red until there is no conflict with the pedestrian traffic.

VI.4.2 Wrong Way Driver Prevention

Detect someone driving the wrong way onto a freeway onramp (abnormal state detector).
Deploy tire shredders.

VI.4.3 Smart Gated Community Gate

Recognizes authorized cars and opens gate, records access, notifies appropriate individuals.
Recognizes service vehicles: checks schedule, if authorized opens gate, records access, notifies appropriate individuals; if not authorized, notifies appropriate individuals to request access

VI.5 Industrial Applications

Monitor factory machines.
Monitor factory workers.
Monitor batch processes.

VI.6 Retail Applications

In various forms of the invention, observer devices may be used in retail establishments.

VI.6.A Facial Recognition for Entry to Places During Rush Hour

Facial Recognition for Entry to Places During Rush Hour
Popular places/coffee/food/store.
Charge for premium times to control crowd.
Card, app on mobile device, facial recognition controls entry or ability to purchase items during those times.

VI.6.B Facial Recognition for Customer Relation Management

Intelligent observer(s) with a camera is placed in a commercial setting (e.g., store, café, department store, government office). It is paired with an application on a mobile device (optional) with location tracking reports location to a central server (e.g., Facebook) that also has facial image data for the user (e.g., Facebook). The intelligent observer utilizes facial recognition on the images it is receiving from the camera to identify the customers or users in the store. Intelligent observer can determine the locations in the store that the user is interested in (e.g., in the case of a department store). Retail location can then:
Offer prioritized service
Pull up the customer file
Push notifications to the identified customer's phone
Collect data about the locations the user goes to in the store, and the time spent in those locations.

VI.6.C Facial Recognition for Emotion/Survey of Employee Effectiveness

Device to correlate facial expressions to level of satisfaction
At point of sale terminal—correlated to server or employee;
Mobile device associated with user—location tracked to correspond to establishment

VI.6.D Queue Management

Video recognition of people with textual description of person coupled with instructions: "Man in black shirt with glasses and beard, please proceed to register 15."

VI.6.E Rating Button Box that Uses Video Camera and Facial Recognition Instead of Buttons Observer is trained to observe people and obtain a video thumbs up/thumbs down rating or a sentiment value based on facial expression. Intelligent observer device placed outside of business or room with sign to rate their experience with thumbs up/down or smile/frown. Facial and hand expression recognition is used to determine mood of people exiting or response to sign as a positive or negative response. If someone speaks directly at the box, then voice recognition can be used to transcribe text spoken directly to the box as a comment. Data regarding the response is made available via the internet so that quality assurance people can be dispatched as needed.

VI.6.F Room Occupied Detector for Lighting Control

Motion sensor for lighting control. Keeps count of people in the room. If 0 people, lights off

CONCLUSION

As those skilled in the art will appreciate, many aspects of the invention, and the various forms of the invention, can beneficially be practiced alone and need not be coupled together. Unless specifically stated otherwise, no aspect of the invention should be construed as requiring combination with another aspect of the invention in practice. However, those skilled in the art will also appreciate that the aspects of the invention may be combined in any way imaginable to yield one of the various forms of this invention.

I claim:
1. A device comprising:
a) a processor;
b) a triple-axis accelerometer; and,
b) a wireless communication interface;
wherein the processor is configured to:
   i) periodically record a series of measurements from at least one axis of the triple-axis accelerometer over a period of time,
   ii) process those measurements using a Fourier transform,
   iii) compute the average value of the Fourier transform result,
   iv) compare the average value to a threshold value, v) determine, based on the comparison, whether the device should cause a transition in a state machine model of an observed machine, and vi) if the determination is yes, cause the state machine transition to occur.

2. The device of claim 1, wherein the processor is further configured to transmit the current state of the state machine to a remote system via the wireless communication interface.

3. The device of claim 2, wherein the transmission of the current state of the state machine to the remote system is configured to cause a notification to be sent to a wirelessly linked personal mobile device.

4. The device of claim 2, wherein the transmission of the current state of the state machine to the remote system is configured to cause a notification to be presented on a wirelessly linked personal mobile device if it is determined that the personal mobile device is leaving the vicinity of the observed machine that is in a state that may require human attention.

5. The device of claim 2, wherein the remote system is service availability system configured relay information about the availability of products and services associated with the observed machine to potential customers.

6. The device of claim 2, wherein the remote system is a consumable item procurement system configured to send consumable products associated with the observed machine based on the state history of the observed machine.

7. The device of claim 2, wherein the remote system is a voice assistant service configured to respond to questions about the current state of the observed device.

8. The device of claim 2, wherein the remote system is a voice assistant service configured to provide voice announcements about state changes of the observed device via linked voice assistant devices.

9. The device of claim 1, further including a display screen and wherein the processor is further configured to update the display screen to show a user interface representing the state of the state machine.

10. The device of claim 1, wherein the state machine model includes:
a) a first state, and a second state; and,
b) a first to second state transition, and a second to first state transition.

11. The device of claim 10, wherein:
a) the first state is an idle state;
b) the second state is a running state; and
c) the first to second state transition is based on the average value of the Fourier transform result being above the threshold value for a second period of time.

12. The device of claim 10, wherein:
a) the first state is a normal state;
b) the second state is an abnormal state; and
c) the first to second state transition is based on the average value of the Fourier transform result being above the threshold value for a second period of time.

13. The device of claim 10, wherein the processor is further configured to:
a) determine, using the accelerometer, a change in the gravitational direction relative to the device; and after determining the change has occurred:
  i. if the current state is the first state, cause the first to second state transition to occur; or,
  ii. if the current state is the second state, cause the second to first state transition to occur.

14. The device of claim 1, wherein the state machine model includes:
a) a first state, a second state, and a third state; and
b) a first to second state transition, a second to third state transition, and a third to first state transition.

15. The device of claim 14, wherein:
a) the first state is a ready to load state;
b) the second state is a running state;
c) the third state is a done state;
d) the ready to load state to running state transition is based on the average value of the Fourier transform result being above the threshold value for a second period of time; and,
e) the running state to done state transition is based on the average value of the Fourier transform result being below the threshold value for the second period of time or a third period of time.

16. The device of claim 14, wherein:
a) the first state is a ready to load state;
b) the second state is a running state;
c) the third state is a done state;
d) the ready to load state to running state transition is based on the average value of the Fourier transform result being above the threshold value for a second period of time;
e) the running state to done state transition is based on the average value of the Fourier transform result being below the threshold value for a third period of time; and
f) the done state to ready to load state transition is based on a detected change in the gravitational or magnetic direction that persists for a fourth period of time indicating that the observed machine has been opened for a period of time sufficient to be unloaded.

17. The device of claim 14, wherein:
a) the first state is a closed state;
b) the second state is an open state;
c) the third state is an alert state;
d) the closed to open state transition is based on a detected change gravitational or magnetic direction indicating that the observed machine has been opened;
e) the open to closed and alert to closed state transitions are based on a detected change gravitational or magnetic direction indicating that the observed machine has been closed; and
f) the open to alert state transition is based on the open state persisting for an alert trigger period of time.

18. The device of claim 14, wherein:
a) the first state is an available state;
b) the second state is an unavailable state;
c) the third state is an alert state;
d) the available state to unavailable state transition is based on the average value of the Fourier transform result being above the threshold value for a second period of time indicating that the observed machine is in use; and,
e) the unavailable state to available state transition is based on the average value of the Fourier transform result being below the threshold value for the second or a third period of time indicating that the observed machine is in no longer in use.

19. The device of claim 14, wherein:
a) the first state is an idle state;
b) the second state is a working state;
c) the third state is an alert state;
d) the idle state to working state transition is based on the average value of the Fourier transform result being above the threshold value for a second period of time indicating that the observed machine is running;

e) the working state to idle state transition is based on the average value of the Fourier transform result being below the threshold value for the second or a third period of time indicating that the observed machine is in no longer running; and, f) the working state to alert state transition is based on sensor data indicating an error with the observed machine.

20. The device of claim 1, wherein a neural network is used to determine a state transition probability based on the average value of the Fourier transform, and wherein the processor is configured to compare the state transition probability to the threshold value.

* * * * *